(12) United States Patent  (10) Patent No.: US 8,240,836 B2
Morohoshi et al.  (45) Date of Patent: Aug. 14, 2012

(54) RECORDING INK, INK MEDIA SET, INK CARTRIDGE, INK RECORDED MATTER, INKJET RECORDING APPARATUS, AND INKJET RECORDING METHOD

(75) Inventors: Naoya Morohoshi, Numazu (JP); Michihiko Namba, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 361 days.

(21) Appl. No.: 12/670,980

(22) PCT Filed: Sep. 12, 2008

(86) PCT No.: PCT/JP2008/066926
§ 371 (c)(1),
(2), (4) Date: Jan. 27, 2010

(87) PCT Pub. No.: WO2009/035158
PCT Pub. Date: Mar. 19, 2009

(65) Prior Publication Data
US 2010/0302326 A1 Dec. 2, 2010

(30) Foreign Application Priority Data
Sep. 14, 2007 (JP) .................................. 2007-238669

(51) Int. Cl.
*G01D 11/00* (2006.01)
*C09D 11/00* (2006.01)
(52) U.S. Cl. ................... 347/100; 106/31.13; 523/160
(58) Field of Classification Search .............. 347/95, 347/100, 101, 102, 105; 106/31.6, 31.13, 106/31.27, 31.72; 428/32.1, 195.1; 523/160, 523/161
See application file for complete search history.

(56) References Cited

U.S. PATENT DOCUMENTS

| 5,415,964 | A  | * | 5/1995 | Hayashi et al. | ........... 430/137.17 |
| 6,864,302 | B2 | * | 3/2005 | Miyabayashi | ................ 523/160 |
| 7,490,930 | B2 |   | 2/2009 | Morohoshi et al. | |

(Continued)

FOREIGN PATENT DOCUMENTS
EP 1811002 A2 7/2007
(Continued)

OTHER PUBLICATIONS

Dec. 2, 2011 European search report in connection with counterpart European patent application No. 08 83 0147.

(Continued)

*Primary Examiner* — Anh T. N. Vo
(74) *Attorney, Agent, or Firm* — Cooper & Dunham LLP

(57) ABSTRACT

A recording ink containing: a solid component containing a colorant, and a resin, and being solid in ink at 25° C., a liquid component having a boiling point higher than that of water and being liquid in ink at 25° C., and water, wherein the total amount of the solid component contained in the recording ink is equal to 8.5% by mass or higher and less than 15% by mass, a ratio (A/B) of the total amount of a water-soluble organic solvent (A), which is contained in the liquid component and has a high-boiling point of 280° C. or higher (A), to the total amount of the solid component (B) contained in the recording ink is 1.1 to 2.5, and a ratio (C/B) of the total amount of the liquid component (C) in the recording ink to the total amount of the solid component (B) in the recording ink is 1.85 to 3.10.

12 Claims, 16 Drawing Sheets

U.S. PATENT DOCUMENTS

| | | | |
|---|---|---|---|
| 7,810,919 B2 * | 10/2010 | Kojima et al. | 347/100 |
| 2006/0279621 A1 | 12/2006 | Morohoshi | |
| 2007/0197685 A1 | 8/2007 | Aruga et al. | |
| 2008/0273045 A1 | 11/2008 | Morohoshi et al. | |
| 2011/0057981 A1 | 3/2011 | Aruga et al. | |

FOREIGN PATENT DOCUMENTS

| | | |
|---|---|---|
| JP | 60-34992 | 8/1985 |
| JP | 4-18462 | 1/1992 |
| JP | 5-230409 | 9/1993 |
| JP | 6-145570 | 5/1994 |
| JP | 6-171072 | 6/1994 |
| JP | 7-292302 | 11/1995 |
| JP | 8-109343 | 4/1996 |
| JP | 2002-67473 | 3/2002 |
| JP | 2002-69346 | 3/2002 |
| JP | 2002-301857 | 10/2002 |
| JP | 2003-201427 | 7/2003 |
| JP | 2003-313474 | 11/2003 |
| JP | 2004-67861 | 3/2004 |
| JP | 2004-115551 | 4/2004 |
| JP | 2004-203903 | 7/2004 |
| JP | 2004-224910 | 8/2004 |
| JP | 2005-220352 | 8/2005 |
| JP | 2006-45351 | 2/2006 |
| JP | 2006-247971 | 9/2006 |
| JP | 2006-291174 | 10/2006 |
| JP | 2007-106109 | 4/2007 |
| JP | 2007-106997 | 4/2007 |
| JP | 2007-144975 | 6/2007 |
| JP | 2007-146135 | 6/2007 |
| JP | 2007-216664 | 8/2007 |
| JP | 2007-223112 | 9/2007 |
| JP | 2007-230021 | 9/2007 |
| JP | 2008-69327 | 3/2008 |
| JP | 2008-69332 | 3/2008 |
| JP | 2008-100511 | 5/2008 |
| JP | 2008-101192 | 5/2008 |
| JP | 2008-137369 | 6/2008 |

OTHER PUBLICATIONS

Japanese official action dated May 31, 2012 in a corresponding Japanese patent application.

* cited by examiner

RECORDING INK, INK MEDIA SET, INK CARTRIDGE, INK RECORDED MATTER, INKJET RECORDING APPARATUS, AND INKJET RECORDING METHOD

TECHNICAL FIELD

The present invention relates to a recording ink suitably used for inkjet recording, an ink media set using the recording ink, an ink cartridge, an ink recorded matter, an inkjet recording apparatus, and an inkjet recording method.

BACKGROUND ART

Inkjet recording methods are methods of printing by jetting ink droplets to make them adhere on a recording medium such as paper. As inks used in the inkjet recording methods, generally, a solution or dispersion liquid is used in which various colorants such as dyes and pigments are dissolved or dispersed in water or a mixture of water and a high-boiling point organic solvent, and to maintain moisture retention, a large amount of a wetting agent composed of a high-boiling point organic solvent is further contained therein. Such a wetting agent composed of a high-boiling point organic solvent contributes to prevention of drying of nozzle ports because of its low-volatility (evaporativity) and water-retention ability. When such an ink is used for recording on paper having high-ink permeation, for example, with regular paper, however, the wetting agent contained in the ink is hardly volatile, resulting in frequent ink strike through.

Meanwhile, when a conventional ink containing a large amount of wetting agent is used for recording on paper which has low liquid absorbability such as offset printing coated paper (hereinafter, may be referred to as "coated paper"), ink beading and ink bleeding are liable to occur in portions with a large amount of the ink, such as solid parts, due to its low-permeation rate of the ink provided on a surface of the coated paper thereinto, it takes some time to dry a recorded image because the wetting agent is hardly likely to evaporate, causing offset smear due to spurs, smear during conveyance, and paper stain and/or paper-sticking at paper stacked section in a paper-feed unit, etc. Thus, such a conventional ink is inappropriate in practical use.

In order to solve the problems, it has been desired to provide an inkjet recording method that allows ink bleeding to hardly occur even with the use of printing coated paper, allows ink to dry quickly, allows for high-image density and high-image quality even when an ink is printed on regular paper, and allows nozzle clogging to hardly occur even during long-time stoppage of printing operation.

For example, Patent Literature 1 proposes an inkjet ink containing an extremely small amount of a wetting agent. According to the proposal, it is possible to obtain high-quality image with high-image density without substantially causing ink strike through even when regular paper is used. However, in this proposal, no resin is contained in the ink, and particularly when a pigment ink is used, the fixing ability of image is poor. Further, improvements in drying rate of ink when the ink is printed on offset coated paper are not disclosed nor suggested in the proposal.

Patent Literature 2 proposes a quick-drying dye ink. In Examples of this proposal, however, the amount of a wetting agent is contained 6 times the amount of a colorant used with no addition of resin; high-quality paper is used, and printing coated paper, which extremely hardly absorbs liquid, is not intended for use.

Patent Literature 3 proposes a quick-drying ink relating to inkjet recording based on energization heat generation. However, the ink provided in this proposal contains a large amount of electrolyte with no addition of resin, the fixing ability of image is poor, and an ink-flying method is employed which is essentially different from piezo-type inkjet method.

Further, each of Patent Literature 4 and Patent Literature 5 proposes a combination of a micro-capsulated pigment and printing paper. However, in these proposals, the inks have generally used ink compositions. Thus, in order to improve the drying properties thereof, heating by microwave energy is required.

Patent Literature 6 proposes an ink containing wax fine particles and resin fine particles. In this proposal, the wax fine particles are used in place of a wetting agent, in terms of capability of imparting moisture retention. However, the wax fine particles having moisture retention tend to be poor in fixing property and dryness.

Patent Literature 7 proposes an ink containing a resin emulsion, a polymer dispersant and a pigment. The ink provided in this proposal contains a small amount of a wetting agent, but the total dissolved solid content is low. Therefore, sufficient image density and sufficient color-development may not be obtained.

Patent Literature 8 proposes as an ink suitable for non-porous recording media, such as film, an ink resin emulsion which contains an aqueous liquid vehicle with an acid function polymer colloid particle dispersed therein, and a pigment colorant in which polymer molecules are bonded to each other, and proposes an ink containing a polymer dispersant and a pigment. In the Examples of this proposal, a high-boiling point wetting agent (water-soluble organic solvent) is contained about 3.5 times the solid component, and in drying process of image recorded with the ink by leaving it under normal environments, it becomes necessary to heat and dry the ink by means of a heat gun due to its slow drying.

Further, Patent Literature 9 describes a pigment ink in order to simultaneously achieve two opposed objects of an object of preventing nozzle clogging and another object of quick drying of ink on a recording medium after recorded. In the pigment ink, the amount of glycerine contained (X), which is effective in to preventing nozzle clogging, and the amount of isopropanol contained (Y), used as a high-volatile solvent, which is effective in drying a recoded image, are specified within the ranges, $1 \leq X \leq 40$, $1 \leq Y \leq 20$, and $5 \leq X+Y \leq 50$, respectively. This technique does not disclose a recording ink allowing for obtaining highly sharp images that are close in quality to recorded matters produced by commercial printing or printed matters for publication without substantially causing ink beading and without any problems with the drying rate of ink even when the ink is printed on printing coated paper which has low liquid absorbability, in view of adjustments of the ratio of three components of the colorant amount, the amount of solid contents and the amount of the water-soluble organic solvent having a high-boiling point of 280° C. or higher, besides additive amounts, and the contents. Patent Literature 10 discloses an inkjet ink in which a difference in weight ratio between nonvolatile components contained in a recording liquid (including resin and wax) and coloring material components falls in the range of from 0.1 to 10 at 25° C. for the purpose of improving the image density when printed on non-coated paper and improving abrasion resistance of printed matters. Patent Literature 11 discloses an ink containing as essential components a dye and a solvent for dissolving the dye and further containing a fluorochemical surfactant for exhibiting quick-drying properties by decreasing the surface tension of the ink so as to improve the wettability of the ink to a target recording medium and a large amount of an organic solvent for improving solubility of the fluorochemical surfactant in the ink, and described that the surface tension of the ink at 25° C. and the ink viscosity thereof at 20° C. are reduced to improve the frequency responsiveness of discharge ink by making uniform dispersibility of the components in the ink responsive to high-speed printing, thereby ejecting small droplets of ink. Patent Literature 12 describes an ink in which a pigment and a micro emulsion are contained in an aqueous medium, the micro emulsion has an average particle diameter of 50 nm or less, the amount of the micro emulsion contained is 0.5% by mass to 10% by mass based on the total mass of the ink, and with the use of the ink, the density of printed matters, when printed on non-coated paper, is increased, thereby improving abrasion resistance of the printed matters. However, these proposals do not disclose a technique allowing for obtaining highly sharp images that are close in quality to recorded matters produced by commercial printing or printed matters for publication without substantially causing ink beading and without any problems with the drying rate of ink even when printed on printing coated paper which has low liquid absorbability, in view of adjustments of the ratio of three components of the colorant amount, the 1.0 amount of solid contents and the amount of the water-soluble organic solvent having a high-boiling point of 280° C. or higher, besides additive amounts, and the contents.

Thus, it has not been intended to apply such conventional inkjet recording inks to recording media which have low-liquid absorbability, like printing coated paper such as offset printing coated paper, and in the conventional inkjet recording media, such a technique has not yet been developed that reduces the amount of a liquid component(s) (primarily, wetting agent) which has a boiling point higher than that of water and is liquid in ink, with focusing on the ratio with the amount of solid components in the ink to thereby improve the permeation property of the ink, and determines the amount of the liquid component(s) so as to fall in the range where troubles such as a change in the orbit of the ejected ink (ejection curve) and non-ejection of ink during printing or during short-time stoppage of printing operation, and nozzle clogging during long-time stoppage of printing operation can be avoided.

Patent Literature 1 Japanese Patent Application Laid-Open (JP-A) No. 2004-115551
Patent Literature 2 Japanese Patent Application Publication (JP-B) No. 60-34992
Patent Literature 3 Japanese Patent Application Laid-Open (JP-A) No. 8-109343
Patent Literature 4 Japanese Patent Application Laid-Open (JP-A) No. 2002-67473
Patent Literature 5 Japanese Patent Application Laid-Open (JP-A) No. 2002-69346
Patent Literature 6 Japanese Patent Application Laid-Open (JP-A) No. 2002-301857
Patent Literature 7 Japanese Patent Application Laid-Open (JP-A) No. 6-171072
Patent Literature 8 Japanese Patent Application Laid-Open (JP-A) No. 2005-220352
Patent Literature 9 Japanese Patent Application Laid-Open (JP-A) No. 2003-201427
Patent Literature 10 Japanese Patent Application Laid-Open (JP-A) No. 07-292302
Patent Literature 11 Japanese Patent Application Laid-Open (JP-A) No. 05-230409
Patent Literature 12 Japanese Patent Application Laid-Open (JP-A) No. 04-018462

DISCLOSURE OF INVENTION

The present invention is provided in view of the present situation in the art and aims to solve the aforementioned various problems in the prior art and to achieve the following objects. Specifically, the present invention aims to provide a recording ink allowing for obtaining highly sharp images that are close in quality to recorded matters produced by commercial printing or printed matters for publication without substantially causing ink beading and without any problems with ink drying rate of ink even when printed on printing coated paper which has low liquid absorbability; an ink media set using the recording ink; an ink cartridge, ink recording matters; an inkjet recording apparatus that allows for preventing a change in the orbit of the ejected ink (otherwise referred to as "ejection curve") and non-ejection of ink during printing or during short-time stoppage of printing operation, and also allows nozzle clogging to hardly occur even during long-time stoppage of printing operation; and an inkjet recording method.

The present invention is based on the findings made by the present inventors, and means for solving the above-mentioned problems are as follows:

<1> A recording ink containing:
 a solid component containing a colorant and a resin, and being solid in ink at 25° C.,
 a liquid component having a boiling point higher than that of water and being liquid in ink at 25° C., and
 water,
 wherein the total amount of the solid component contained in the recording ink is equal to 8.5% by mass or higher and less than 15% by mass, a ratio (A/B) of the total amount of a water-soluble organic solvent (A), which is contained in the liquid component and has a high-boiling point of 280° C. or higher (A), to the total amount of the solid component (B) contained in the recording ink is 1.1 to 2.5, and a ratio (C/B) of the total amount of the liquid component (C) in the recording ink to the total amount of the solid component (B) in the recording ink is 1.85 to 3.10.
<2> The recording ink according to the item <1>, wherein the liquid component contains a wetting agent, and the wetting agent is at least one selected from glycerine, 1,3-butanediol, 3-methyl-1,3-butanediol, 2-pyrrolidone, and N-methyl-2-pyrrolidone.
<3> The recording ink according to any one of the items <1> and <2>, wherein the liquid component contains a penetrant, and the penetrant is a polyol compound having 8 to 11 carbon atoms.
<4> The recording ink according to any one of the items <1> to <3>, wherein the liquid component contains a surfactant, and the surfactant contains a fluorochemical surfactant.
<5> The recording ink according to any one of the items <1> to <4>, wherein the resin contains resin fine particles.
<6> The recording ink according to the item <5>, wherein the resin fine particles contain an acrylic silicone resin, and the acrylic silicone resin has a glass transition temperature of 25° C. or lower.
<7> The recording ink according to any one of the items <5> to <6>, wherein the resin fine particles have a volume average particle diameter of 10 nm to 1,000 nm in a resin emulsion.

<8> The recording ink according to any one of the items <1> to <7>, wherein the colorant is a polymer emulsion pigment in which a water-insoluble or substantially water-insoluble coloring material is contained in polymer fine particles.

<9> The recording ink according to any one of the items <1> to <8>, wherein the colorant is a pigment which has an anionic hydrophilic group on its surface.

<10> The recording ink according to any one of the items <1> to <9>, having a surface tension of 35 mN/m or lower at 25° C.

<11> An ink media set containing: the recording ink according to any one of the items <1> to <10>, and
a recording medium having a support and a coating layer applied onto at least one surface of the support,
wherein the amount of pure water transferred to the recording medium for a contact period of 100 ms measured by a dynamic scanning absorptometer is 2 mL/m² to 35 mL/m², and the amount of pure water transferred to the recording medium for a contact period of 400 ms is 3 mL/m² to 40 mL/m².

<12> An ink cartridge including:
a container to accommodate the recording ink according to any one of the items <1> to <10>.

<13> An inkjet recording method containing: jetting the recording ink according to any one of the items <1> to <10> onto a recording medium so as to record an image on the recording medium, by applying a stimulus to the recording ink.

<14> The inkjet recording method according to the item <13>, wherein the recording medium has a support and a coating layer applied onto at least one surface of the support,
wherein the amount of pure water transferred to the recording medium for a contact period of 100 ms measured by a dynamic scanning absorptometer is 2 mL/m² to 35 mL/m², and the amount of pure water transferred to the recording medium for a contact period of 400 ms is 3 mL/m² to 40 mL/m².

<15> The inkjet recording method according to any one of the items <13> and <14>, wherein the stimulus is at lest one selected from heat, pressure, vibration and light.

<16> The inkjet recording method according to any one of the items <13> to <15>, wherein an inkjet head for jetting the ink has an ink repellent layer on its plate surface where ink ejection ports are formed.

<17> The inkjet recording method according to the item <16>, wherein the ink repellent layer contains any one of a fluorine-based material and a silicone-based material.

<18> The inkjet recording method according to any one of the items <16> and <17>, wherein the ink repellent layer has a surface roughness (Ra) of 0.2 μm or less.

<19> The inkjet recording method according to any one of the items <16> to <18>, wherein near ink ejection ports of the inkjet head, the cross-section area of each of the ink ejection ports measured at a plane, which is perpendicular to a center line of each of the ink ejection ports, gradually becomes larger with distance from the surface of a plate base.

<20> The inkjet recording method according to any one of the items <16> to <19>, wherein the ink repellent layer has a thickness of 0.1 nm or more.

<21> The inkjet recording method according to any one of the items <16> to <20>, wherein the ink repellent layer has a critical surface tension of 5 mN/m to 40 mN/m.

<22> An inkjet recording apparatus including:
an ink jetting unit configured to jet a recording ink onto a recording medium so as to record an image on the recording medium, by applying a stimulus to the recording ink.

<23> The inkjet recording apparatus according to the item <22>, wherein the stimulus is at least one selected from heat, pressure, vibration and light.

<24> An ink recorded matter including:
an image formed on a recording medium, with the use of the recording ink according to any one of the items <1> to <10>.

<25> The ink recorded matter according to the item <24>, wherein the recording medium has a support and a coating layer applied onto at least one surface of the support, the amount of pure water transferred to the recording medium for a contact period of 100 ms measured by a dynamic scanning absorptometer is 2 mL/m² to 35 mL/m², and the amount of pure water transferred to the recording medium for a contact period of 400 ms is 3 mL/m² to 40 mL/m².

A recording ink of the present invention contains a solid component containing a colorant and a resin and being solid in ink at 25° C., a liquid component having a boiling point higher than that of water and being liquid in ink at 25° C., and water. By setting a ratio (A/B) of the total amount of a water-soluble organic solvent having a high-boiling point of 280° C. or higher (A) contained in the liquid component to the total amount of the solid component (B) contained in the recording ink to a value within the range of from 1.1 to 2.5, it is possible to provide an inkjet recording apparatus that allows nozzle clogging to hardly occur even during long-time stoppage of printing operation, and an inkjet recording method. By setting a ratio (C/B) of the total amount of the liquid component (C) in the recording ink to the total amount of the solid component (B) in the recording ink to a value within the range of from 1.85 to 3.10, it is possible to provide an inkjet recording apparatus that allows ink bleeding to hardly occur even with the use of printing coated paper which has low-liquid absorbability, allows for obtaining highly sharp images that are close in quality to recorded matters produced by commercial printing or printed matters for publication without substantially causing any problems with the drying rate and without substantially causing a change in the orbit of the ejected ink (otherwise referred to as "ejection curve") and non-ejection of ink during printing or during short-time stoppage of printing operation.

Further, by setting the total amount of the solid component in the recording ink to a value within the range of from 8.5% by mass to less than 15% by mass, it is possible to reduce the additive amount of the liquid component necessary for preventing nozzle clogging, making it possible for ink bleeding to hardly occur as well as to possible to further increase the drying rate.

The main constituent of the liquid component having a boiling point higher than that of water and being liquid in ink at 25° C. is a so-called wetting agent, however, when a conventional ink containing a large amount of wetting agent is used on printing coated paper such as offset printing coated paper, it results in occurrence of ink bleeding caused by insufficient ink absorbability and slow drying. According to the following Lucas-Washburn's equation, which is a basic equation for calculating the permeation constant of liquid into a porous material, it is known that a permeation distance "h" is proportional to one-half root of a time length "t" and minus one-half root of a viscosity η.

$$H = (R \gamma t \cos \theta / 2\eta)^{1/2}$$

However, in the equation, "h" represents a permeation distance, "t" represents a time length required for permeation, "R" represents a thin hole diameter, "θ" represents a contact angle, and "η" represents a dynamic viscosity.

This equation shows that when a recording medium is set, a time length required for absorption of a same quantity of liquid is proportional to the viscosity of the liquid and is inversely proportional to the surface tension of the liquid and cos θ. When the surface tension of an ink is not changed, there is a means of reducing the ink viscosity (to be exact, the viscosity of the liquid component in the ink).

In this case, the ink viscosity varies depending on the amount of a wetting agent used, and thus it is considered that the amount of the wetting agent is reduced within a reasonable range where the ink viscosity can be lowered. However, when the amount of the wetting agent is excessively reduced to the level where the function of the wetting agent cannot be sufficiently exhibited, the following troubles are liable to occur. The direction of ink ejection shifts (ejection curve or displacement of dropping position of ink droplets), non-ejection of ink occurs due to nozzle clogging during long-time stoppage of printing operation, and so on.

Meanwhile, the main constituent of the solid component in the ink is a colorant and a resin to be contained in the ink for improving the fixing ability. The main roll of the wetting agent in the ink is to prevent aggregation of the solid component and adhesion thereof onto a nozzle plate.

In an ink which adheres on a nozzle plate, the moisture content is reduced primarily due to evaporation of water with a lapse of time, however, a wetting agent having a high-boiling point and a small amount of water remain, and this makes it possible to prevent aggregation and contact of a particulate solid component in the ink, and thus the binding of the solid component can be prevented.

In an ink dropped on a recording medium, a liquid component is removed from the vicinity of the surface of the recording medium because of permeation of the liquid component into the medium. The main constituents of the liquid component of the ink are water and a wetting agent.

Even when a wetting agent having high-viscosity is used as the wetting agent, and the amount of the wetting agent used is small, the viscosity of the liquid component (containing water) is low. Therefore, water and the wetting agent are removed from the vicinity of the surface of the recording medium without separating each other, the solid content (a pigment and a resin as a fixing agent) of the ink remains in image area on the surface of the recording medium, a slight amount of the wetting agent remains, and thus sufficient fixing property can be exhibited.

Similarly to the required amount of a binder resin to the solid component in the ink, it is considered that the required amount of the liquid component (primarily, a wetting agent) having a boiling point higher than that of water, in the ink and being liquid in ink at 25° C. and used for preventing the binding of the solid component is substantially proportional to the additive amount of the solid component in the ink. In this way, when the amount of the solid component is small, the required amount of the liquid component becomes small, and when the amount of the solid component is large, the required amount of the liquid component becomes large.

Therefore, the recording ink of the present invention contains a solid component containing a colorant and a resin and being solid in ink at 25° C., a liquid component having a boiling point higher than that of water and being liquid in ink at 25° C. and water, wherein the total amount of the solid component contained in the recording ink is within the range of from 8.5% by mass to less than 15% by mass; a ratio (A/B) of the total amount of a water-soluble organic solvent having a high-boiling point of 280° C. or higher (A) contained in the liquid component to the total amount of the solid component (B) contained in the recording ink is set to a value within the range of from 1.1 to 2.5; and a ratio (C/B) of the total amount of the liquid component (C) in the recording ink to the total amount of the solid component (B) in the recording ink to a value within the range of from 1.85 to 3.10. By setting the value of the ratio (C/B) within the range, it is possible to obtain highly sharp images that are close in quality to recorded matters produced by commercial printing or printed matters for publication without substantially causing beading and without any problems with the drying rate of ink even when printed on printing coated paper which has low liquid absorbability.

An ink cartridge of the present invention includes a container to accommodate the recording ink of the present invention. The ink cartridge is suitably used in printers and the like base on inkjet recording system. When the ink accommodated in the ink cartridge is used and an image etc. is printed on printing coated paper having low liquid absorbability, it is possible to increase the drying rate of the ink and to record highly sharp images that are close in quality to recorded matters produced by commercial printing or printed matters for publication.

An inkjet recording apparatus of the present invention includes at least an ink jetting unit configured to jet the recording ink of the present invention so as to record an image, by applying energy to the ink. In the inkjet recording apparatus, the ink jetting unit applies energy to the recording ink of the present invention and jets the recording ink so as to record an image. As a result, when the recording ink is printed on printing coated paper which has low liquid absorbability, it is possible to increase the drying rate of the ink and to obtain highly sharp images that are close in quality to recorded matters produced by commercial printing or printed matters for publication.

An inkjet recording method of the present invention includes at least jetting the recording ink of the present invention so as to record an image by applying energy to the ink. In the ink jetting step of the inkjet recording method, the recording ink of the present invention is jetted by applying energy to the recording ink so as to record an image. As a result, when the recording ink is printed on printing coated paper which has low liquid absorbability, it is possible to increase the drying rate of recorded image and to obtain highly sharp images that are close in quality to recorded matters produced by commercial printing or printed matters for publication.

When the inkjet recording method of the present invention is employed, nozzle clogging is least likely to occur even during long-time stoppage of printing operation.

The phrase "long-time stoppage" means that a nozzle is left intact in a state where its nozzle section is capped with a capping unit and stopped for a day or longer time.

An ink media set of the present invention includes the recording ink of the present invention, and a recording medium which has a support and a coating layer on at least one surface of the support, wherein the amount of pure water transferred to the recording medium for a contact time of 100 ms measured by a dynamic scanning liquid absorptometer is 2 mL/m$^2$ to 35 mL/m$^2$, and the amount of pure water transferred to the recording medium for a contact time of 400 ms is 3 mL/m$^2$ to 40 mL/m$^2$.

In the ink media set of the present invention, the recording ink of the present invention is combined with a recording medium in which the transfer amount of pure water is within the predetermined range, whereby an image having glossiness and high-uniformity of density can be recorded without causing beading in solid portions.

An ink recorded matter of the present invention has an image that is formed on a recording medium by the use of the recording ink of the present invention. When the recording ink is printed on a substantially smooth printing paper having low liquid absorbability, the drying rate is increased, and a highly sharp image that is close in quality to recorded matters produced by commercial printing or printed matters for publication can be held on the recording medium as the ink recorded matter of the present invention.

In the present invention, "beading" means a phenomenon where in inkjet recording, during a time span from the time when a first ink droplet is dropped on a surface of a recording medium until the next ink droplet is dropped on the surface, the first droplet cannot be sufficiently absorbed into the recording medium and remains in a liquid state on the surface of the recording medium, part of the droplet remained is then mixed with droplets dropped thereafter, and a colorant in the ink (organic pigment, etc.) partially becomes a mass, resulting in nonuniform density. In recently generally used printers, this phenomenon has relationship to the amount of ink absorbed to a recording medium for a relatively short period of contact time up to 100 ms at the latest. For instance, in a green image portion, the beading level varies depending upon the amount of a yellow (Y) ink (or a cyan (C) ink) absorbed into a recording medium (transfer amount) during the time span from the time when the yellow (Y) ink (or the cyan (C) ink) is dropped on a surface of the recording medium until the C ink (or the Y ink) is dropped on the surface of the recording medium. Beading is likely to occur in secondary colors of green, red, and blue, however, when the amount of the ink absorbed into a recording medium is small, ink beading may occur in primary colors of cyan, magenta, yellow, and black.

The present invention can solve various conventional problems and provide a recording ink allowing for obtaining recorded matters produced by commercial printing or printed matters for publication without substantially causing ink beading and without any problems with the ink drying rate of image recorded with ink even when printed on printing coated paper which has low liquid absorbability; an ink media set using the recording ink, an ink cartridge, ink recorded matters, an inkjet recording apparatus that allows nozzle clogging to hardly occur even during long-time stoppage of printing operation, and an inkjet recording method.

Figure 1:
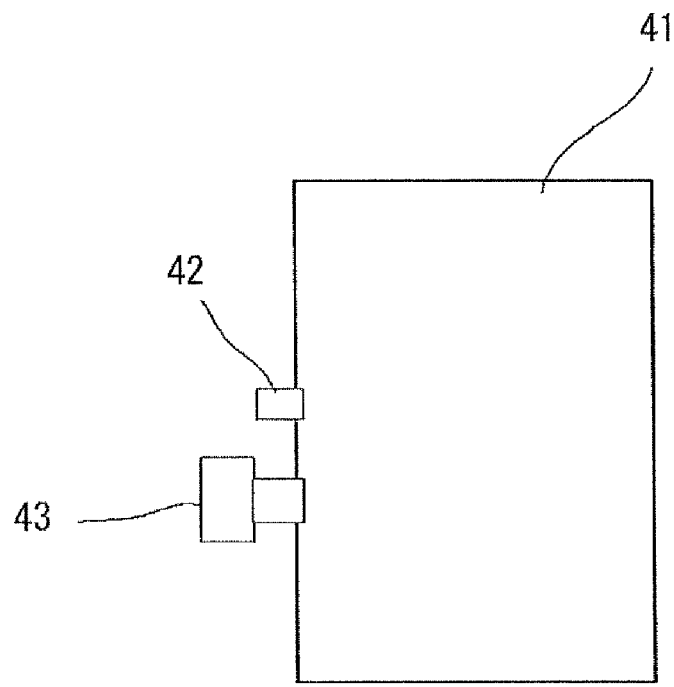
FIG. 1 is a schematic diagram showing one example of an ink cartridge of the present invention.

BEST MODE FOR CARRYING OUT THE INVENTION (Recording Ink)

A recording ink of the present invention contains at least a solid component containing a colorant and a resin and being solid in ink at 25° C. and a liquid component having a boiling point higher than that of water and being liquid in ink at 25° C., and water and further contains other components in accordance with the necessity.

In the recording ink of the present invention, the total amount of the solid component contained in the recording ink is within the range of from 8.5% by mass to less than 15% by mass, more preferably within the range of 9% by mass to 14% by mass, and particularly preferably within the range of 10% by mass to 12% by mass.

By setting the total amount of the solid component contained in the recording ink to less than 15% by mass, it is possible to reduce the additive amount of the liquid component required for preventing nozzle clogging, and thus it allows ink beading to hardly occur and the drying rate of recorded image can be further improved.

When the total amount of the solid component contained in the recording ink is more than 15% by mass, the amount of the liquid component (primarily, wetting agent) having a boiling point higher than that of water and being liquid in ink at 25° C. and required for preventing nozzle clogging becomes large, and thus the amount of the wetting agent remained in recorded image areas in the vicinity of the surface of the recording medium becomes large, and the drying rate becomes slow. This prevents binding of the solid component itself (a pigment and a resin as a fixing agent per se) and binding between the solid component and the recording medium, resulting in a degradation in fixing ability. In the meanwhile, when the total amount of the solid component contained in the recording ink is less than 8.5% by mass, the amount of the liquid component including water contained in the ink is large, and therefore, unfavorably, the drying rate becomes slow, and cockling and curling are liable to occur on the recording medium.

The ratio (A/B) of the total amount of a water-soluble organic solvent having a high-boiling point of 280° C. or higher (A) contained in the liquid component to the total amount of the solid component (B) contained in the recording ink is set to a value within the range of 1.1 to 2.5, preferably within the range of 1.2 to 2.0, and more preferably within the range of 1.4 to 1.8. By setting the value of the ratio (A/B) to 1.1 to 2.5, it is possible to provide an inkjet recording apparatus and an inkjet recording method each of which allows nozzle clogging to hardly occur even during long-time stoppage of printing operation (the long-time reliability is improved). When the ratio (A/B) is less than 1.1, nozzle clogging is likely to occur during long-time stoppage of printing operation, and even when actions for maintenance and recovery are carried out, the problem with nozzle clogging may not be sometimes resolved.

When the ratio (A/B) is more than 2.5, the ink absorbability (permeability) and the drying property of image degrade, and the fixing ability (abrasion resistance) degrades.

The ratio (C/B) of the total amount of the liquid component (C) in the recording ink to the total amount of the solid component (B) in the recording ink is set to a value within the range of from 1.85 to 3.10, and more preferably within the range of from 1.90 to 2.60. By setting the value of the ratio (C/B) to 1.85 to 3.10, it is possible to provide an inkjet recording apparatus and an inkjet recording method that allow for obtaining highly sharp images that are close in quality to recorded matters produced by commercial printing or printed matters for publication without substantially causing ink beading and without any problems with ink drying rate even when printed on printing coated paper which has low liquid absorbability, and without causing a change in the orbit of the ejected ink (otherwise, referred to as "ejection curve") and non-ejection of ink during printing or during short-time stoppage of printing operation (the short-term reliability is improved). When the ratio (C/B) is less than 1.85, a change in the orbit of ejected ink (otherwise, referred to as "ejection curve") is likely to occur during printing or during short-time stoppage of printing operation, although the drying rate of the ink is increased. When the ratio (C/B) is more than 3.10, ink beading is likely to occur due to a degradation in permeability of the ink, and the drying rate of recorded image becomes slow, resulting in a degradation in fixing ability (abrasion resistance).

<Liquid Component Having a Boiling Point Higher than that of Water and being Liquid in Ink at 25° C.>

As the liquid component having a boiling point higher than that of water and being liquid in ink at 25° C., the most part of the liquid component is a wetting agent having a high boiling point, and further, ink property controlling agents, such as penetrant and surfactant, also belong to the liquid component.

The ratio of the total amount of the liquid component having a boiling point higher than that of water and being liquid in ink at 25° C. to the total amount of the solid component in the recording ink is 1.85 to 3.10. The smaller the amount of the liquid component having a boiling point higher than that of water and being liquid in ink at 25° C., the shorter the drying rate of the ink becomes, however, to prevent a change in the orbit of ejected ink (also referred to as "ejection curve") and non-ejection of ink during printing or during short-time stoppage of printing operation, attributable to an increase in the ink viscosity caused by drying of ink in the vicinity of a nozzle, more strict control will be required.

Further, with the use of an ink less containing the total amount of the liquid component having a boiling point higher than that of water and being liquid in ink at 25° C. in the recording ink, the drying of recorded images quickly proceeds even when recorded on paper that hardly absorbs liquid, such as coated paper for offset printing, and it is possible to obtain images with high-glossiness and less conspicuity of beading.

When the total amount of the liquid component having a boiling point higher than that of water and being liquid in ink at 25° C. contained in the recording ink is more than 33% by mass, the drying rate of recorded image on printing coated paper such as offset printing coated paper lowers, and ink strike-through may frequently occur when printed on regular paper. However, the smaller the amount of the liquid component having a boiling point higher than that of water and being liquid in ink at 25° C. contained in the liquid component, the more the drying rate is increased.

Note that in the liquid component having a boiling point higher than that of water and being liquid in ink at 25° C., a wetting agent having a boiling point higher than that of water is contained, and a penetrant and a surfactant, if they have a boiling point higher than that of water and are liquid in ink at 25° C., are contained. In short, it aims to improve the permeability (absorbability) and the drying property of the ink so as to prevent the occurrence of beading and to shorten the drying rate even when printed on paper having low liquid absorbability like printing coated paper by reducing the amount of liquid which is more hardly dry than water as much as possible.

—Wetting Agent (Water-Soluble Organic Solvent and Solid Wetting Agent)—

A wetting agent typified by the liquid component having a boiling point higher than that of water and being liquid in ink at 25° C. is not particularly limited and may be suitably selected in accordance with the intended use, as long as it is liquid in ink at 25° C. Examples thereof include polyhydric alcohols, polyhydric alcohol alkyl ethers, polyhydric alcohol aryl ethers, nitrogen-containing heterocyclic compounds, amides, amines, sulfur-containing compounds, propylene carbonates, and ethylene carbonates. These may be used alone or in combination.

Examples of the polyhydric alcohols include ethylene glycol, diethylene glycol, triethylene glycol, polyethylene glycol, propylene glycol, dipropylene glycol, tripropylene glycol, polypropylene glycol, 1,3-propanediol, 1,3-butanediol, 2,3-butanediol, 1,4-butanediol, 3-methyl-1,3-butanediol, 1,5-pentanediol, 1,6-hexanediol, 2-methyl-2,4-pentanediol, tetraethylene glycol, polyethylene glycol, glycerine, 1,2,6-hexanetriol, 1,2,4-butanetriol, 1,2,3-butanetriol, and petriol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, triethylene glycol, triethylene glycol monomethyl ether, triethylene glycol monobutyl ether, triethylene glycol isobutyl ether, tertraethylene glycol monomethyl ether, propylene glycol monoethyl ether, dipropylene glycol monobutyl ether, tripropylene glycol monomethyl ether, and tripropylene glycol monobutyl ether.

Examples of the polyhydric alcohol aryl ethers include ethylene glycol monophenyl ether, and ethylene glycol monobenzyl ether.

Examples of the nitrogen-containing heterocyclic compounds include N-methyl-2-pyrrolidone, N-hydroxyethyl-2-pyrrolidone, 2-pyrrolidone, 1,3-dimethylimidazolidinone, and ε-caprolactam.

Examples of the amides include form amide, N-methylformamide, and N,N-dimethylformamide.

Examples of the amines include monoethanol amine, diethanolamine, triethanolamine, monoethylamine, diethylamine, and triethylamine.

Examples of the sulfur-containing compounds include dimethylsulfoxide, sulforan, thiodiethanol, and thiodiglycol.

Among these, from the perspective of the jetting stability of ink, glycerine, 2-pyrrolidone, diethylene glycol, thiodiethanol, polyethylene glycol, triethylene glycol, 1,2,6-hexanetriol, 1,2,4-butanetriol, petriol, 1,5-pentanediol, N-methyl-2-pyrrolidone, 1,3-butanediol, 3-methyl-1,3-butanediol are preferable. Of these, glycerine, 1,3-butanediol, 3-methyl-1,3-butanediol, 2-pyrrolidone, and N-methyl-2-pyrrolidone are particularly preferable.

In order to prevent such troubles with a change in the direction of ink ejected during printing (ejection curve or displacement of dropping position of ink droplets), non-ejection of ink due to nozzle clogging during long-time stoppage and the like, it is preferable that the liquid component having a boiling point higher than that of water and being liquid in ink at 25° C. be contained in a large amount in the ink, however, in particular, to prevent the occurrence of non-ejection due to nozzle clogging during long-time stoppage, it is preferable that the rate (A/B) of the total amount of the water-soluble organic solvent having a high-boiling point of 280° C. or higher (A) to the total amount of the solid component (B) in the recording ink be 1.1 to 2.5. As the water-soluble organic solvent having a high-boiling point, glycerin is particularly preferable because it has a high-boiling point (290° C.), hardly evaporates and has a high equilibrium moisture regain in low-humidity environment.

Note that in the present invention, the boiling point is a boiling point measured under a normal atmospheric pressure of 760 mmHg (1,013.3 hPa).

Examples of the solid wetting agent include sugars, sugar alcohols, hyaluronic acid salts, trimethylolpropane, and 1,2,6-hexanetriol.

By setting the ratio of the total amount of the liquid component having a higher boiling point and being liquid in ink at 25° C., containing a wetting agent as the main constituent, to the total amount of the solid component in the recording ink to a value within the range of from 1.85 to 3.10, the drying rate can be increased. As constituents being liquid in ink at 25° C. other than water and wetting agents, which are further added in accordance with the necessity, there are the following penetrant and surfactant. Note that the phrase "being liquid in ink at 25° C." means that it is liquid in an ink placed under the conditions of normal temperature and normal pressure (25° C., 1 atmosphere). However, when the additive amount of constituents other than wetting agent is small and when the total amount of the liquid component having a boiling point higher than that of water and being liquid in ink at 25° C. approximates the use amount of the wetting agent, it makes no difference.

—Penetrant—

The amount of the penetrant is calculated with the inclusion of it in the amount of the liquid component having a higher boiling point and being liquid in ink at 25° C., provided that the penetrant has a higher boiling point than that of water and being liquid in ink at 25° C.

For the penetrant, a polyol compound having 8 to 11 carbon atoms or a glycol ether compound is used. At least any one of the polyol compound and the glycol ether compound has effect of accelerating the penetration to paper and preventing the occurrence of ink bleeding and is a partially aqueous compound having a solubility of 0.1% by mass to 4.5% by mass in water at 25° C.

Examples of the polyol compound having 8 to 11 carbon atoms include 2-ethyl-1,3-hexanediol, and 2,2,4-trimethyl-1,3-pentanediol.

Examples of the glycol ether compound include polyhydric alcohol alkyl ether compounds, and polyhydric alcohol aryl ether compounds.

Examples of the polyhydric alcohol alkyl ether compounds include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether compounds include ethylene glycol monophenyl ether, and ethylene glycol monobenzyl ether.

The amount of the penetrant as the liquid component having a boiling point higher than that of water and being liquid in ink at 25° C. contained in the recording ink is preferably 0% by mass to 10% by mass, and more preferably 0.5% by mass to 5% by mass.

—Surfactant—

The surfactant is added in accordance with the necessity as described above, and is calculated with the inclusion of it in the amount of the liquid component having a higher boiling point and being liquid in ink at 25° C., provided that the surfactant has a higher boiling point than that of water and is liquid in ink at 25° C.

The surfactant is not particularly limited and may be suitably selected from among surfactants that will not impair the dispersion stability, in view of the combination of the type of colorant, wetting agent and penetrant etc. used, in accordance with the intended use. However, when printed on printing paper, it is preferable to use a surfactant having low surface tension and high leveling property, and at least one selected from silicone surfactants and fluorochemical surfactants is preferable. Of these, fluorochemical surfactants are particularly preferable.

As the fluorochemical surfactant, the number of fluorine-substituted carbon atoms is preferably 2 to 16, and more preferably 4 to 16. When the number of fluorine-substituted carbon atoms is less than 2, the effect of fluorine may not be obtained, and when the number exceeds 16, it may cause a problem with storage stability of the ink.

Examples of the fluorochemical surfactants include perfluoroalkyl sulfonic compounds, perfluoroalkyl carboxylic compounds, perfluoroalkyl phosphoric ester compounds, perfluoroalkyl ethylene oxide adducts, and polyoxyalkylene ether polymer compounds having perfluoroalkyl ether group at side chains thereof. Of these, polyoxyalkylene ether polymer compounds having perfluoroalkyl ether group at side chains thereof are particularly preferable because they are free of foaming property.

Examples of the perfluoroalkyl sulfonic compounds include perfluoroalkyl sulfonic acids, and perfluoroalkyl sulfonic acid salts.

Examples of the perfluoroalkyl carboxylic compounds include perfluoroalkyl carboxylic acids, and perfluoroalkyl carboxylic acid salts.

Examples of the perfluoroalkyl phosphoric ester compounds include perfluoroalkyl phosphoric esters, and salts of perfluoroalkyl phosphoric acid.

Examples of the polyoxyalkylene ether polymer compound having perfluoroalkyl ether group at side chains thereof include polyoxyalkylene ether polymers having perfluoroalkyl ether group at side chains thereof, sulfate ester salts of polyoxyalkylene ether polymers having perfluoroalkyl ether group at side chains thereof, and salts of polyoxyalkylene ether polymers having perfluoroalkyl ether group at side chains thereof.

Examples of counterions of salts of the fluorochemical surfactants include Li, Na, K, $NH_4$, $NH_3CH_2CH_2OH$, $NH_2(CH_2CH_2OH)_2$, and $NH(CH_2CH_2OH)_3$.

For the fluorochemical surfactant, suitably synthesized one or a commercially available product may be used.

Examples of the commercially available fluorochemical surfactant include SURFLON S-111, S-112, S-113, S-121, S-131, S-132, S-141, and S-145 (all manufactured by Asahi Glass Co.); FRORARD FC-93, FC-95, FC-98, FC-129, FC-135, FC-170C, FC-430, and FC-431 (all manufactured by Sumitomo 3M Ltd.); MEGAFAC F-470, F-1405, and F-474 (all manufactured by Dainippon Ink and Chemicals, Inc.); ZONYL TBS, FSP, FSA, to FSN-100, FSN, FSO-100, FSO, FS-300 and UR (all manufactured by DuPont); FT-110, FT-250, FT-251, FT-400S, FT-150, and FT-400SW (all manufactured by Neos Co.), and PF-151N (manufactured by Omnova Co., Ltd.). Among these, FT-110, FT-250, FT-251, FT-400S, FT-150, and FT-400SW manufactured by Neos Co. and PF-151N manufactured by Omnova Co., Ltd. are particularly preferable.

As specific examples of the fluorochemical surfactant, compounds represented by the following structural formula are preferred.

(1) Anionic Fluorochemical Surfactant

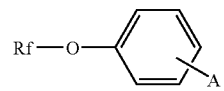

In the structural formula, Rf represents a mixture of fluorine-containing hydrophobic groups represented by the following structural formulas; A represents $—SO_3X$, $—COOX$ or $—PO_3X$ (X is a counter anion, and specific examples thereof are hydrogen atom, Li, Na, K, $NH_4$, $NH_3CH_2CH_2OH$, $NH_2(CH_2CH_2OH)_2$ or $NH(CH_2CH_2OH)_3$.

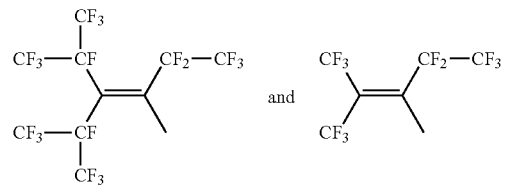

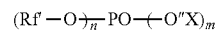

In the structural formula, Rf' represents a fluorine-containing group represented by the following structural formula; X is the same as described above in meaning; n is an integer of 1 or 2; and m is an integer of 2−n.

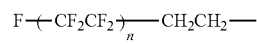

In the structural formula, n is an integer of 3 to 10.

In the structural formula, each of Rf and X is the same as described above in meaning.

In the structural formula, each of Rf and X is the same as described above in meaning.

(2) Nonionic Fluorochemical Surfactant

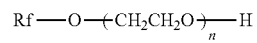

In the structural formula, Rf is the same as described above in meaning; and n is an integer of 5 to 20.

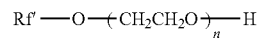

In the structural formula, Rf' is the same as described above in meaning; and n is an integer of 1 to 40.

(3) Amphoteric Surfactant

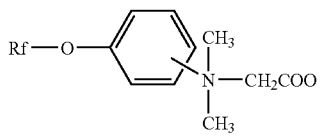

In the structural formula, Rf is the same as described above in meaning.

(4) Oligomer Type Fluorochemical Surfactant

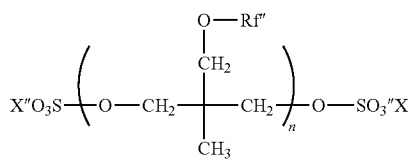

In the structural formula, Rf″ represents a fluorine-containing group represented by the following structural formula; n is an integer of 0 to 10; and X is the same as described above in meaning.

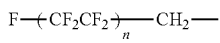

In the structural formula, n is an integer of 1 to 4.

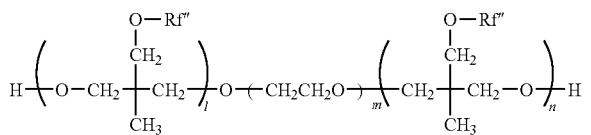

In the structural formula, Rf″ is the same as described above in meaning; l is an integer of 0 to 10; m is an integer of 0 to 10; and n is an integer of 0 to 10.

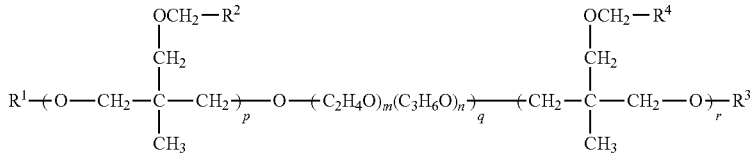

In the structural formula, each of $R^1$ and $R^3$ represents a hydrogen atom or a fluorine-containing group; each of $R^2$ and $R^4$ represents a fluorine-containing group; each of m, n, p, q, and r represents an integer; it should be noted that the fluorine-containing groups in $R^1$ to $R^4$ are the same as those described in (2) or (4).

The silicone surfactant is not particularly limited and may be suitably selected in accordance with the intended use, however, the one that has a high pH but is not decomposed is preferable. Examples thereof include side-chain-modified polydimethylsiloxane, both-ends modified polydimethylsiloxane, one-end modified polydimethylsiloxane, and side-chain/both-ends modified polydimethylsiloxane. A silicone surfactant having any of a polyoxyethylene group, a polyoxyethylene polyoxypropylene group as a modified group is particularly preferable because it exhibits favorable properties as an aqueous surfactant.

For the silicone surfactant, suitably synthesized one or commercial product may be used. Such commercial products are readily available from BYK Chemie Japan, Shin-Etsu Chemical Co., Ltd., DOW CORNING TORAY SILICONE CO., LTD., and Shin-Etsu Silicone Corp.

The polyether-modified silicone surfactant is not particularly limited and may be suitably selected in accordance with the intended use. Examples thereof include compounds in which a polyalkylene oxide structure represented by the following structural formula is introduced to Si-bonded side chains of dimethylpolysiloxane.

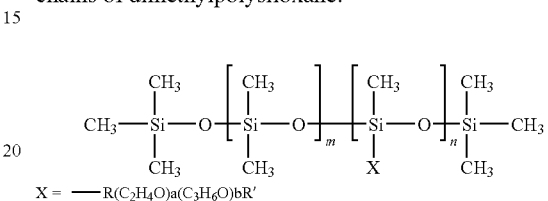

In the structural formula, each of m, n, a, and b is an integer; and each of R and R' represents an alkyl group or an alkylene group.

For the polyether-modified silicone compound, suitably synthesized one or a commercial product may be used. Examples of the commercially available product include KF-618, KF-642 and KF643 (all manufactured by Shin-Etsu Chemical Co., Ltd.).

Besides the fluorochemical surfactants and the silicone surfactants, anionic surfactants, nonionic surfactants, and amphoteric surfactants may be used as well.

Examples of the anionic surfactants include polyoxyethylene alkylether acetate salts, dodecylbenzene sulfonic acid salts, succinic acid ester sulfonic acid salts, lauryl salts, and salts of polyoxyethylene alkyl ether sulfates.

Examples of the nonionic surfactants include acetylene glycol surfactants, polyoxyethylene alkyl ethers, polyoxyethylene alkylphenyl ethers, polyoxyethylene alkyl esters, and polyoxyethylene sorbitan fatty acid ester.

Examples of the acetylene glycol surfactants include 2,4,7,9-tetramethyl-5-decin-4,7-diol, 3,6-dimethyl-4-octine-3,6-diol, and 3,5-dimethyl-1-hexine-3-ol. Examples of commercial products of the acetylene glycol surfactant include SURFINOL 104, 82, 465, 485, and TG produced by Air Products Co., Ltd.

Examples of the amphoteric surfactant include laurylamino propionic acid salts, lauryldimethylbetaine, stearyldimethylbetaine, lauryldihydroxyethyl betaine, lauryldimethylamine oxide, myristyldimethylamine oxide, stearyldimethylamine oxide, dihydroxyethyllaurylamine oxide, polyoxyethylene coconut oil alkyldimethylamine oxide, dimethylalkyl (coconut) betaine, and dimethyllaurylbetaine.

For these surfactants, commercial products are readily available from Nikko Chemicals Co., Ltd., NIHON EMULSION Co., Ltd., NIPPON SHOKUBAI CO., LTD., Toho Chemical Industry Co., Ltd., Kao Corp., Adeka Co., Ltd., Lion Corporation, Aoki Oil Industrial Co., Ltd., and Sanyo Chemical Industries, Ltd.

The surfactants are not particularly limited to those disclosed above, and they may be used alone or in combination. Even when such a surfactant cannot be readily dissolved in recording ink as singularly used, it can be dissolved and be present stably therein when mixed with other surfactants.

Of these surfactants, those represented by any one of the following Structural Formulas (1) to (5) are preferably used.

   Structural Formula (1)

In Structural Formula (1), $R^1$ represents an alkyl group that may be branched, having from 6 to 14 carbon atoms or a perfluoroalkyl group that may be branched, having from 6 to 14 carbon atoms; $R^2$ represents a hydrogen atom or an alkyl group that may be branched, having from 1 to 4 carbon atoms; and h is an integer of 5 to 20.

   Structural Formula (2)

In Structural Formula (2), $R^1$ represents an alkyl group that may be branched, having from 6 to 14 carbon atoms; $R^2$ represents a hydrogen atom or an alkyl group that may be branched, having from 1 to 4 carbon atoms; and h is an integer of 5 to 20.

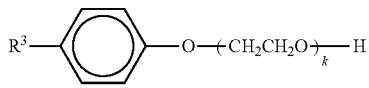

Structural Formula (3)

In Structural Formula (3), $R^3$ represents a hydrocarbon group, for example, an alkyl group that may be branched, having from 6 to 14 carbon atoms is exemplified; and k is an integer of 5 to 20.

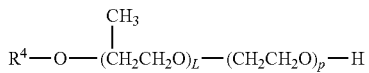

Structural Formula (4)

In Structural Formula (4), $R^4$ represents a hydrocarbon group such as an alkyl group that may be branched, having from 6 to 14 carbon atoms; L is an integer of 5 to 10; p is an integer of 5 to 20; propylene glycol chain(s) and ethylene glycol chain(s) may be polymerized in block or at random.

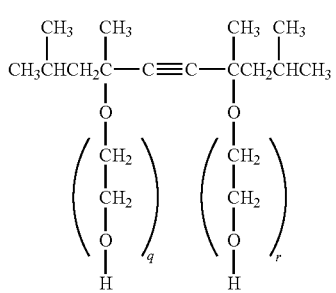

Structural Formula (5)

In Structural Formula (5), each of q and r is an integer of 5 to 20.

The amount of the surfactant contained in the recording ink is preferably 0.01% by mass to 3.0% by mass, and more preferably 0.5% by mass to 2% by mass. However, the total amount of the liquid component having a boiling point higher than that of water and being liquid in ink at 25° C. is 20% by mass or less and more preferably 15% by mass or less. When the amount of the surfactant is less than 0.01% by mass, the effect of adding the surfactant may sometimes be impaired, and when more than 3.0% by mass, the permeation property of the ink to a recording medium becomes higher than necessary, which may lead to a degradation in image density and the occurrence of ink strike-through.

<Solid Content Containing Colorant and Resin and being Solid in Ink at 25° C.>

The total amount of the resin component contained in the solid component is preferably 40% by mass or more and 95% by mass or less to the solid component containing a colorant and a resin and being solid in ink at 25° C. When the amount of the resin component is less than 40% by mass, the fixing ability and the glossiness of the colorant may be degraded. Meanwhile, to increase the image density to some extent, 5% by mass or more of the colorant is necessary to the total amount of the solid component.

The reason why the amount of the resin component is large in the solid component in this way is to improve the fixing ability, the image sharpness and the glossiness.

Here, the resin component is a polymeric solid component other than colorant molecules having color-developing groups, and includes resins that wrap around the colorant and/or make the colorant dispersed. Further, the resin component also includes a resin emulsion that is added when necessary.

It should be noted that the phrase "being solid in ink at 25° C." means that it is solid in an ink placed under the conditions of normal temperature and normal pressure (25° C., 1 atmosphere), the environment used in common inkjet printing.

—Resin—

The resin is not particularly limited and may be suitably selected in accordance with the intended use as long as it is solid in ink at 25°, however, it is preferably resin fine particles from the perspective that a large amount of resin can be added.

For the resin fine particles, resin fine particles being present as a resin emulsion, in a state of being dispersed in water as a continued phase are used in production of ink. The resin emulsion may contain a dispersant such as surfactant when necessary.

The amount of resin fine particles as the component having a dispersed phase (the amount of resin fine particles contained in the resin emulsion solution: is not the amount of resin fine particles in a produced recording ink) is preferably 10% by mass to 70% by mass.

For the particle diameter of the resin fine particles, in view of being used particularly in an inkjet recording apparatus, the volume average particle diameter thereof is preferably 10 nm to 1,000 nm, and more preferably 100 nm to 300 urn. This particle diameter is a particle diameter in a resin emulsion, however, in the case of being in a stable recording ink, it makes no difference between the particle diameter in a resin emulsion and the particle diameter in a recording ink. The larger the volume average particle diameter, the more the additive amount of the emulsion can be increased. When the volume average particle diameter is smaller than 100 nm, the additive amount of the emulsion may not sometimes be increased, and when the volume average particle diameter is larger than 300 nm, the reliability may sometimes degrade. However, a resin emulsion having a particle diameter outside the range may be possibly used. This is general tendency and does not depend upon the type of emulsion.

The volume average particle diameter can be measured using, for example, a particle size analyzer (MICROTRACK MODEL UPA9340, manufactured by NIKKISO CO., LTD.).

Specifically, an emulsion aqueous solution was diluted to within the optimum range for signal level, and the transparency was set to "Yes", and the following provisional conditions were set: refractive index—1.49; partial density: 1.19; spherical particles—Yes; and medium-water. Herein, the volume average particle diameter was set to a value of 50%.

The resin fine particles with the dispersed phase are not particularly limited and may be suitably selected in accordance with the intended use. Examples thereof include urethane resins, polyester resins, acrylic resins, vinyl acetate resins, styrene resins, butadiene resins, styrene-butadiene resins, vinyl chloride resins, acrylic styrene resins, and acrylic silicone resins.

For the resin emulsion, suitably synthesized one or a commercially available product may be used.

Examples of the commercially available resin emulsions are MICROGEL E-1002 and E-5002 (styrene-acrylic resin emulsion, manufactured by Nippon Paint Co., Ltd.), BONCOAT 4001 (acrylic resin emulsion, manufactured by Dainippon Ink and Chemicals, Inc.), BONCOAT 5454 (styrene-acrylic resin emulsion, manufactured by Dainippon Ink and Chemicals, Inc.), SAE-1014 (styrene-acrylic resin emulsion, manufactured by Nippon Zeon Company Limited), CYBINOL SK-200 (acrylic resin emulsion, manufactured by Saiden Chemical Co., Ltd.), PRIMAL AC-22 and AC-61 (acrylic resin emulsion, manufactured by Rohm & Haas Japan K.K.), NANOCRYL SBCX-2821 and 3689 (acrylic silicone resin emulsion, manufactured by Toyo Ink Mfg. Co., Ltd.), and #3070 (methyl methacrylate polymer resin emulsion, manufactured by Mikuni Color Ltd.). Of these, acrylic silicone emulsions are particularly preferable from the viewpoint of its excellence in fixing ability.

The glass transition temperature of the resin component in the acrylic silicone emulsion is preferably 25° C. or lower, and more preferably 0° C. or lower. When the glass transition temperature is higher than 25° C., the resin itself becomes brittle, resulting in a cause of degradation in fixing ability. Particularly when used on printing paper having smooth surface and hardly absorbs water, the fixing ability may possibly degrade. However, a resin component having a glass transition temperature of 25° C. or higher may be possibly used.

Here, the glass transition temperature can be measured using, for example, a differential scanning calorimeter (manufactured by Rigaku Denki Co., Ltd.). Specifically, a resin film sample piece obtained by drying a resin emulsion aqueous solution at normal temperature was heated from a temperature near −50° C., and the glass transition temperature was determined based on a temperature at which the resin film sample piece had an uneven portion.

—Colorant—

The colorant is not particularly limited as long as it is solid in an ink at 25°, and any of pigment and dye can be suitably used.

When a pigment is used as the colorant, an ink with excellence in light resistance can be obtained. The pigment is not particularly limited, and commonly pigments used for inkjet recording are used. For example, the following pigments are preferably used:

(1) pigment having a hydrophilic group on its surface
(2) polymer emulsion pigment containing a water-insoluble or substantially water-insoluble coloring material in a polymer fine particle
(3) microcapsulated pigment in which a pigment is covered with a resin having a hydrophilic group The pigment (1) is a pigment whose surface is modified so that at least one hydrophilic group is bonded to the surface directly or via other atomic group. For the surface modification, a method of chemically bonding a specific functional group (functional groups such as sulfone group and carboxyl group) to the surface, a method of subjecting the surface to a wet-process oxidation treatment using at least any one of a hypohalous acid and salt thereof, or the like may be used. Among these pigments, an embodiment is particularly preferable in which a carboxyl group is bonded to the surface of the pigment and the pigment is dispersed in water. Since the surface of the pigment is modified and a carboxyl group is bonded thereto in this way, the dispersion stability is improved. Besides, high-quality image print can be obtained and the water resistance of printed recording medium is further improved.

Since an ink according to this embodiment is excellent in re-dispersibility, it allows for performing excellent printing with simple cleaning operation, without causing the occurrence of nozzle clogging even when printing operation is stopped for a long time and the moisture content of the ink near nozzles of an inkjet head evaporates.

The volume average particle diameter of the self-dispersible type pigment in ink is preferably 0.01 μm to 0.16 μm.

For example, as a self-dispersible type carbon black, those having ionicity are preferable, and anionicly charged ones and cationicly charged ones are more suitable.

Examples of the anionic hydrophilic group are —COOM-, —SO$_3$M-, —PO$_3$HM-, —PO$_3$M$_2$-, —SO$_2$NH$_2$—, and —SO$_2$NHCOR (M represents any one of a hydrogen atom, an alkaline metal, ammonium, and organic ammonium; R represents any one of an alkyl group having 1 to 12 carbon atoms, a phenyl group that may have a substituent, and a naphthyl group that may have a substituent). Among these pigments, a color pigment with —COOM- and/or —SO$_3$M- bonded to a surface of the color pigment is preferably used.

For "M" in the hydrophilic group as the alkaline metal, lithium, and potassium are exemplified. For "M" in the hydrophilic group as the organic ammonium, monomethyl to trimethyl ammoniums, monoethyl to triethyl ammoniums, and monomethanol to trimethanol ammoniums are exemplified. With respect to the method of obtaining the anionicly charged color pigment, as a method of introducing —COONa to a surface of a color pigment, for example, a method of subjecting the color pigment to an oxidation treatment with hypochlorous soda; sulfonation method, and a method of reacting with diazonium salt are exemplified.

For the cationic hydrophilic group, quaternary ammonium group is preferable, the following quaternary ammonium groups are more preferable. In the present invention, a compound with any one of these groups is bonded to a surface of carbon black is suitably used as a coloring material.

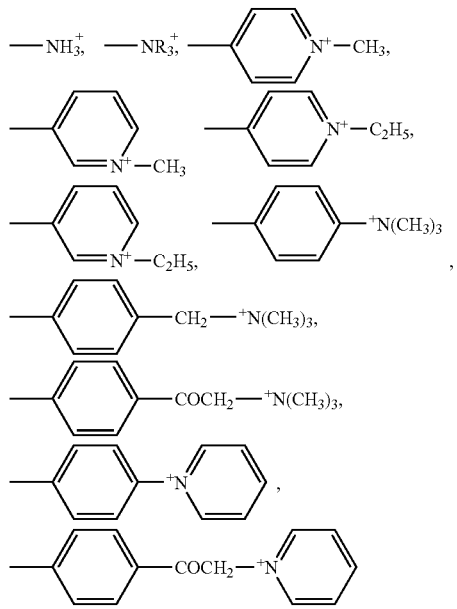

A method of producing a cationic self-dispersible type carbon black with a hydrophilic group bonded to the surface thereof is not particularly limited and may be suitably selected in accordance with the intended use. For example, as a method of bonding an N-ethylpyridyl group represented by the following Structural Formula to the surface of the carbon black, a method of treating carbon black with 3-amino-N-ethylpyridium bromide is exemplified.

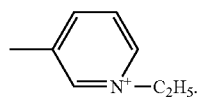

The hydrophilic group may be bonded to the surface of the carbon black via other atomic group. Examples of the other atomic group include alkyl groups having 1 to 12 carbon atoms, phenyl groups that may have a substituent or naphthyl groups that may have a substitutent. Specific example of the case where the hydrophilic group is bonded to the surface of carbon black via other atomic group are —$C_2H_4COOM$ (M represents an alkaline metal or a quaternary ammonium), -$PhSO_3M$ (Ph represents a phenyl group, M represents an alkaline metal or a quaternary ammonium), and —$C_5H_{10}NH_3^+$.

For the pigment (2), the polymer emulsion containing a coloring material means at least any one of a polymer emulsion with a pigment included in polymer fine particles and a polymer emulsion in which a pigment is adsorbed to the surface of polymer fine particles. Examples thereof include those described in Japanese Patent Application Laid-Open (JP-A) No. 2001-139849.

In this case, all the pigment particles are not necessarily included in or adsorbed to polymer fine particles, and the pigment may be dispersed in the emulsion within the range where the effects of the present invention are not impaired.

The phrase "water-insoluble or substantially water-insoluble" means that 10 parts by mass or more of the coloring material are not dissolved to 100 parts by mass of water at 20° C. The word "dissolved" means that separation of the coloring material and/or sedimentation of the coloring material is not visually observed on the surface layer of the aqueous solution or the bottom layer thereof.

The polymer constituting the polymer emulsion is not particularly limited and may be suitably selected in accordance with the intended use. Examples of the polymer include vinyl polymers, polyester polymers, polyurethane polymers, and polymers disclosed in Japanese Patent Application Laid-Open (JP-A) Nos. 2000-53897 and 2001-139849. Of these, vinyl polymers, and polyester polymers are particularly preferable.

The volume average particle diameter of polymer fine particles (colorant fine particles) containing the coloring material in the ink is preferably 0.01 μm to 0.16 μm.

When the pigment (2) is used, an ink which is excellent in light resistance and fixing ability can be obtained.

In the pigment (3), a pigment is dispersed in water by covering the pigment with a hydrophilic water-insoluble resin to make a resin layer on the surface of the pigment have hydrophilic properties. Examples thereof include those described in Japanese Patent Application Laid-Open (JP-A) No. 2002-67473.

When the pigment (3) is used, an ink which is excellent in light resistance and fixing ability can be obtained.

It is considered that the pigments (2) and (3) are similar to each other in terms that a pigment and a resin are integrated into one compound. Any one of the pigments (2) and (3) can be suitably used in the present invention.

When any of the pigments (1), (2), and (3) is made to have an ink composition ratio according to the present invention, the improvements in drying and high-color tone property are remarkably exhibited.

The color-developing component of the colorant is not particularly limited and may be suitably selected in accordance with the intended use. For example, the color-developing component may be any of an inorganic pigment and an organic pigment.

Examples of the inorganic pigment include titanium oxide, iron oxide, calcium carbonate, barium sulfate, aluminum hydroxide, barium yellow, cadmium red, chrome yellow, and carbon black. Of these, carbon black etc. are preferable. Examples of the carbon black are those produced by known methods such as the contact method, furnace method, thermal method.

Examples of the organic pigment include azo pigments, polycyclic pigments, dye chelates, nitro pigments, nitroso pigments, and aniline black. Of these, azo pigments and polycyclic pigments are more preferable. Examples of the azo pigments include azo lake, insoluble azo pigments, condensed azo pigments, and chelate azo pigments. Examples of the polycyclic pigment include phthalocyanine pigments, perylene pigments, perinone pigments, anthraquinone pigments, quinacridone pigments, dioxadine pigments, indigo pigments, thioindigo pigments, isoindolinone pigments, and quinophthalone pigments. Examples of the dye chelates include basic dye type chelates, acidic dye type chelates.

The color of the pigment is not particularly limited and may be suitably selected in accordance with the intended use. For example, pigments for black color, and pigment for color ink are exemplified. These pigments may be used alone or in combination.

Examples of the pigments for black color include carbon black (C.I. Pigment Black 7) such as furnace black, lamp black, and channel black; metal pigments such as copper and iron (C.I. Pigment Black 11), titanium oxide, etc.; and organic pigments such as aniline black (C.I. Pigment Black 1).

As the pigments for color ink, examples of yellow color pigments include C.I. Pigment Yellow 1 (Fast Yellow G), 3, 12 (Disazo Yellow AAA), 13, 14, 17, 23, 24, 34, 35, 37, and 42 (yellow iron oxide), 53, 55, 74, 81, 83 (Disazo Yellow HR), 95 97, 98, 100, 101, 104, 108, 109, 110, 117, 120, 128, 138, 150, and 153.

Examples of magenta color pigments include C.I. Pigment Red 1, 2, 3, 5, 17, 22 (Brilliant Fast Scarlet), 23, 31, 38, 48:2 (Permanent Red 2B (Ba)), 48:2 (Permanent Red 213 (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (colcothar), 104, 105, 106, 108 (cadmium red) 112, 114, 122 (dimethyl quinacridone), 123, 146, 149, 166, 168, 170, 172, 177, 178, 179, 185, 190, 193, 209, and 219.

Examples of cyan color pigments include C.I. Pigment Blue 1, 2, 15 (copper phthalocyanine blue R), 15:1, 15:2, 15:3 (phthalocyanine blue G), 15:4, 15:6 (phthalocyanine blue E), 16, 17:1, 56, 60, and 63.

Further, examples of neutral color pigments such as red, green blue colors include C.I. Pigment Red 177, 194, 224; C.I. Pigment Orange 43; C.I. Pigment Violet 3, 19, 23, 37; and C.I. Pigment Green 7, and 36.

When a dye is used as the colorant, an ink which is excellent in color tone can be obtained. Examples of the dye include oil-soluble dyes, and dispersed dyes.

In the recording ink, it is preferable that the resin component be 40% by mass to 95% by mass to the total amount of the solid component (for example, the total amount of a resin and a colorant used). Therefore, the amount of the colorant contained in the solid component is preferably 60% by mass or less. In the resin component based on the calculation at this point, the amount of resin covering the colorant used is also included. More specifically, the total amount of the resin components including resins covering the colorant used is 40% by mass or more among the total solid component that is equal to the amount of resin plus the amount of the colorant.

The other components are not particularly limited and may be suitably selected in accordance with the necessity. Examples thereof include antifoaming agent, antiseptic/antifungal agent, anti-corrosive agent, pH adjuster, specific resistivity adjuster, antioxidant, ultraviolet absorber, oxygen absorbent, light stabilizer, and viscosity adjuster.

The antifoaming agent is not particularly limited and may be suitably selected in accordance with the intended use. For example, silicone antifoaming agents, polyether antifoaming agents, fatty acid ester antifoaming agents are preferably exemplified. These antifoaming agents may be used alone or in combination. Of these, silicone antifoaming agents are preferable in terms of the excellence in foam breaking effect.

Examples of the silicone antifoaming agents include oil type silicone antifoaming agents, compound type silicone antifoaming agents, self-emulsified type silicone antifoaming agents, emulsion type silicone antifoaming agents, and modified silicone antifoaming agents. Examples of the modified silicone antifoaming agents include amino-modified silicone antifoaming agents, carbinol-modified silicone antifoaming agents, methacryl-modified silicone antifoaming agents, polyether-modified silicone antifoaming agents, alkyl-modified silicone antifoaming agents, fatty acid ester-modified silicone antifoaming agents, and alkylene oxide-modified silicone antifoaming agents. Of these, self-emulsified silicone antifoaming agents, and emulsion-type silicone antifoaming agents etc. are preferable in view of the use thereof in the recording ink, which is an aqueous medium.

For the antifoaming agent, a commercially available product may be used. Examples of the commercial product include silicone antifoaming agents manufactured by Shin-Etsu Silicone Corp. (KS508, KS531, KM72, KM85, etc.); silicone antifoaming agents manufactured by DOW CORNING TORAY SILICONE CO., LTD. (Q2-3183A, SH5510, etc.); silicone antifoaming agents manufactured by Nippon Unicar Co., Ltd. (SAG30, etc.); and antifoaming agents manufactured by Asahi Denka Co., Ltd. (ADECANATE series, etc.).

The amount of the antifoaming agent contained in the recording ink is not particularly limited and may be suitably selected in accordance with the intended use. For example, it is preferably 0.001% by mass to 3% by mass, and more preferably 0.05% by mass to 0.5% by mass.

Examples of the antiseptic/antifungal agent include 1,2-benzoisothiazoline-3-on, dehydrosodium acetate, sodium sorbate, 2-pyridinethiol-1-sodium oxide, sodium benzoate, and sodium pentachlorophenol.

Examples of the specific resistivity adjuster include mineral salts, for example, by adding an alkaline metal halide or ammonium halide (such as lithium chloride, ammonium chloride, sodium chloride) to the ink composition, it is possible to prepare a recording liquid used in an inkjet recording method where a recording ink is charged.

The pH adjuster is not particularly limited, and an arbitrarily selected material can be used as long as the pH can be adjusted to 7 or higher without adversely affecting the ink prepared. Examples thereof include amines such as diethanol amine, triethanol amine; hydroxides of alkaline metal elements such as lithium hydroxide, sodium hydroxide, and potassium hydroxide; carbonates of alkaline metals such as ammonium hydroxide, quaternary ammonium hydroxide, quaternary phosphonium hydroxide, lithium carbonate, sodium carbonate, and potassium carbonate; and aminopropanediol derivatives.

The aminopropanediol derivative is a water-soluble organic basic compound, and examples thereof include 1-amino-2,3-propanediol, 1-methylamino-2,3-propanediol, 2-amino-2-methyl-1,3-propanediol, and 2-amino-2-ethyl-1, 3-propanediol.

Examples of the anti-corrosive agent include acid sulfite salts, sodium thiosulfates, ammon thioglycolates, diisopropyl ammonium nitrites, pentaerythritol tetranitrates, and dicyclohexyl ammonium nitrites.

Examples of the antioxidant include phenol antioxidants (including hindered phenol antioxidants), amine antioxidants, sulfur antioxidants, and phosphate antioxidants.

Examples of the phenol antioxidants (including hindered phenol antioxidants) include butylated hydroxyanisole, 2,6-di-tert-butyl-4-ethylphenol, stearyl-β-(3,5-di-tert-butyl-4-hydroxyphenyl) propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2[β-(3-tert-butyl-4-hydroxy-5-methylphenyl) propionyloxy]ethyl]2,4,8,10-tetra-oxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis [methylene-3-(3',5'-di-tert-butyl-4'-hydroxyphenyl) propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl) propionate]methane, and 1,1,3-tris(2-methyl-4-hydroxy-5-tert-butylphenyl) butane.

Examples of the sulfur antioxidants include dilauryl-3,3'-thiodipropionate, distearylthiodipropionate, laurylstearylthiodipropyonate, dimyristyl 3,3'-thiodipropionate, distearyl β,β'-thiodipropionate, 2-mercaptobenzoimidazole, and dilauryl sulfide.

Examples of the phosphate antioxidants include triphenyl phosphide, octadecyl phosphide, triisodecyl phosphide, trilauryl trithiophosphide, and trisnonylphenylphosphide.

Examples of the ultraviolet absorbers include benzophenone ultraviolet absorbers, benzotriazole ultraviolet absorbers, salicylate ultraviolet absorbers, cyanoacrylate ultraviolet absorbers, and nickel complex salt ultraviolet absorbers.

Examples of the benzophenone ultraviolet absorbers include 2-hydroxy-4-n-octoxybenzophenone, 2-hydroxy-4-n-dedecyloxybenzophenone, 2,4-dihydroxybenzophenoene, 2-hydroxy-4-methoxybenzophenone, and 2,2',4,4'-tetrahydroxybenzophenone.

Examples of the benzotriazole ultraviolet absorbers include 2-(2'-hydroxy-5-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet absorbers include phenylsalicylate, p-tert-butylphenylsalicylate, and p-octylphenylsalicylate.

Examples of the cyanoacrylate ultraviolet absorbers include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of the nickel complex salt ultraviolet absorbers include nickelbis(octylphenyl) sulfide, 2,2'-thiobis(4-tert-octylphelate)-n-butylaminenickel (II), 2,2'-thiobis(4-tert-octylphelate)-2-ethylhexylaminenickel (II), and 2,2'-thiobis(4-tert-octylphelate) triethanolaminenickel (II).

The recording ink of the present invention is produced by dispersing or dissolving in an aqueous medium a solid component containing a colorant and a resin and being solid in ink at 25° C., and a liquid component having a boiling point higher than that of water and being liquid in ink at 25° C., water and other components in accordance with the necessity, and further agitating and mixing these components when necessary. It should be noted that the colorant and the resin are preliminarily dissolved or dispersed in water to prepare a solution or dispersion liquid, and the solution or dispersion liquid is used. The dispersion treatment can be carried out by means of a sand mill, homogenizer, ball mill, paint shaker, ultrasonic dispersing device, or the like. The agitation/mixing can be carried out by means of an agitator using common stirring blades, a magnetic stirrer, a high-speed dispersing device, or the like.

—Measurement Method of Solid Component Amount and Liquid Component Amount—

The amount of the solid component that is solid in ink at 25° C. and the amount of the liquid component that is liquid in ink at 25° C. can be measured by calculation, provided that the formulation of the ink has been known. When the formulation of the ink is unclear, the amounts thereof can be measured, for example, by separating only the solid component from the ink. For example, an ink sample is centrifugalized at 500,000 G or higher at room temperature (25° C.) for 24 hours to precipitate a solid component in the ink sample, thereby the separation between solid phase and liquid phase can be achieved. Further, depending on the type of colorant and the type of the water-dispersible resin used, the solid-liquid separation can be done by a salting-out method or an agglomeration method using a solvent, and the solid component separated out is then dried for use in measurement.

When a pigment is used as the colorant, the ratio between the colorant and the resin can be determined based on the reduction rate of the mass obtained by a thermal mass analysis. During the measurement, to prevent the resin and the pigment from burning, the temperature of the ink sample is increased to 500° C. at an increasing rate of 10° C./min under an inert gas atmosphere, and then a change in mass is measured. Since a slight amount of moisture content and wetting agent component still remains in the solid matter after the separation between solid phase and liquid phase, the mass of the solid matter determined at a temperature of 200° C. where almost all the moisture content and wetting agent has evaporated is defined as the total mass of the solid matter, the mass of the solid matter determined at a temperature of 500° C. where a large amount of the resin has thermally decomposed and evaporated is defined as the mass of the pigment, and the ratio between the mass of the pigment and the mass of the resin can be measured based upon the following mathematical expression.

$$\text{Mass of pigment}/(\text{total mass of solid matter} - \text{mass of pigment})$$

Further, when a certain pigment with low heat resistance such as azo pigment is used, the pigment has thermally decomposed by the time the temperature reaches 500° C., and thus it is difficult to measure the amount of the pigment. However, the amount of the pigment can be measured by making the resin component dissolved in a solvent to extract the solid matter from the solvent. Based on the mass of the ink sample before/after the extraction, the rate of the amount of the pigment contained in the solid matter is determined, and the total mass of the solid matter is determined by a thermal mass analysis. Thereafter, the mass of the pigment in the solid matter can be measured by the use of the expression, the mass of the ink sample is multiplied by the rate of the amount of the pigment.

When the molecular structure of the colorant used is clearly determined, the amount of the solid content of the colorant can be measured by the following manner. When a pigment or a dye is used as a colorant, the amount of the solid content of the colorant can be measured by a nuclear magnetic resonance analysis (NMR). When an inorganic pigment with heavy metal atom contained in its molecular frame, a metal-containing organic pigment, or metal-containing dye is used as a colorant, the amount of the solid content of the colorant can be measured by a fluorescent X-ray analysis.

The qualitative analysis and quantitative analysis on a liquid component can be carried out by gas chromatography analyses (GC, BC-AED, etc.).

Physical properties of the recording ink of the present invention are not particularly limited and may be suitably selected in accordance with the intended use. For example, the viscosity, surface tension, pH etc. are preferably within the following ranges.

The viscosity of the recording ink is preferably 10 mPa·s or less at 25° C., and more preferably 7 mPa·s or less at 25° C. When the viscosity is higher than 10 mPa·s, it may become difficult to ensure the ejection stability, and the drying property may degrade. However, such an ink having high-viscosity may be possibly used depending upon the structure of the inkjet head.

The surface tension of the recording ink at 25° C. is preferably 35 mN/m or lower, and more preferably 30 mN/m or lower. When the surface tension is higher than 35 mN/m, ink leveling is least likely to take place on a recording medium, leading to longer time required for drying.

The recording ink preferably has a pH of 7 to 10.

The color of the recording ink of the present invention is not particularly limited and may be suitably selected in accordance with the intended use. For example, yellow, magenta, cyan, black are exemplified. When recording is performed using two or more colors of them in combination, a multi-color image can be recorded, and when recording is performed using all of these colors as an ink set, a full-color image can be recorded.

The recording ink of the present invention can be suitably used in printers each equipped with an inkjet head such as a so-called "piezo-type inkjet head" in which a vibrating plate constituting the wall surface of an ink flow passage is deflected by using an piezoelectric element as a pressure generating unit that is configured to pressurize an ink contained in an ink flow passage, the volume inside the ink flow passage is changed to thereby eject ink droplets (see Japanese Patent Application Laid-Open (JP-A) No. 2-51734); a so-called "thermal-type inkjet head" in which an ink is heated with a thermal energy in an ink flow passage using a heat generating resistor to generate gas bubbles (see Japanese Patent Application Laid-Open (JP-A) No. 61-59911); and a so-called "electrostatic type inkjet head" in which a vibrating plate constituting the wall surface of an ink flow passage is placed at a position opposed to electrodes, the volume inside the ink flow passage is changed by deflecting the vibrating plate by an electrostatic force generated between the vibrating plate and the electrodes to thereby eject ink droplets (see Japanese Patent Application Laid-Open (JP-A) No. 6-71882).

The recording ink of the present invention can be to suitably used in various fields, and can be suitably used in image recording apparatuses (printers, etc.) based upon inkjet recording method. For example, the recording ink can be used in printers etc. having a function of heating paper to be recorded and the recording ink at a temperature of 50° C. to 200° C. during printing or before/after printing to thereby accelerate fixing of print to the paper, and can be particularly suitably used in the following ink cartridge, ink recorded matter, inkjet recording apparatus, and inkjet recording method of the present invention.

(Ink Cartridge)

The ink cartridge of the present invention has a container to accommodate the recording ink of the present invention and further has other members suitably selected in accordance with the necessity.

The container is not particularly limited, and the shape, structure, size, material and the like may be suitably selected in accordance with the intended use. For example, a container having at least an ink bag formed of an aluminum laminate film, a resin film, etc. is preferably exemplified.

Figure 2:
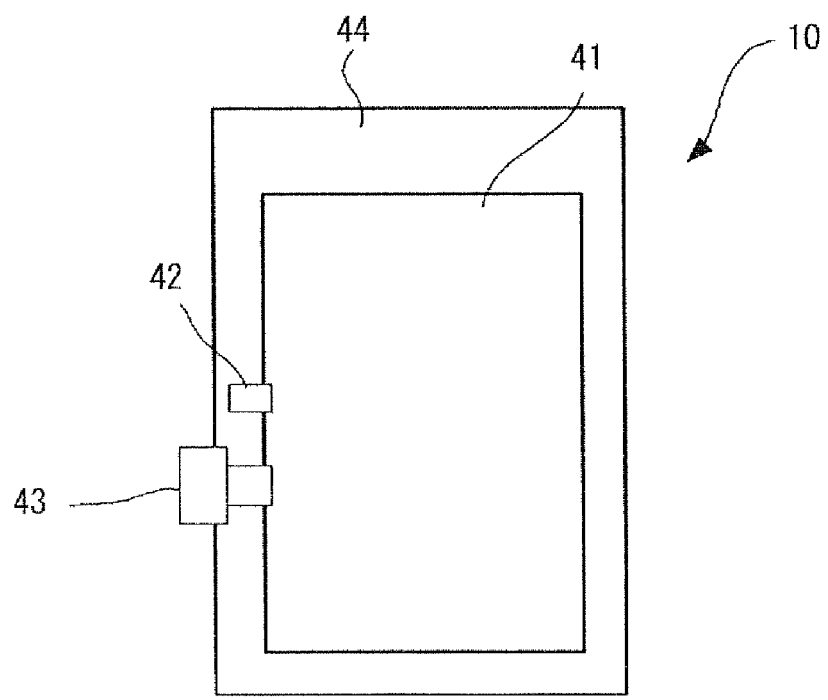
FIG. 2 is a schematic diagram exemplarily showing the ink cartridge shown in FIG. 1 with the inclusion of a case.

Hereinafter, the ink cartridge will be described with reference to FIGS. 1 and 2. FIG. 1 is a diagram showing one example of an ink cartridge 10 according to the present invention, and FIG. 2 is a diagram exemplarily showing the ink cartridge shown in FIG. 1 with the inclusion of a case (exterior case).

The ink cartridge 10 is, as shown in FIG. 1, filled with an ink from an ink inlet port 42 to an ink bag 41, the gas contained therein is evacuated, and the ink inlet port 42 is closed by heat sealing. During the use of the ink, the ink bag 41 is pricked at an ink ejection port 43 composed of a rubber member with a needle provided on the main body of a printer, thereby supplying the ink to the printer.

The ink bag 41 is formed of a wrapping member such as aluminum laminate film allowing for free air permeability. The ink bag 41 is, as shown in FIG. 2, housed in a cartridge case 44 that is usually made of plastic and is detachably mounted to various types of inkjet recording apparatuses.

(Inkjet Recording Apparatus and Inkjet Recording Method)

The inkjet recording apparatus of the present invention has at least an ink jetting unit, and further has other units suitably selected in accordance with the necessity, for example, a stimulus generating unit, a controlling unit, and the like.

The inkjet recording method of the present invention includes at least an ink jetting step, and further includes other steps suitably selected in accordance with the necessity, for example, a stimulus generating step, a controlling step, and the like.

The inkjet recording method of the present invention can be suitably carried out by the inkjet recording apparatus of the present invention. The ink jetting step can be suitably carried out by the ink jetting unit. The other steps can be suitably carried out by the other units.

—Ink Jetting Step and Ink Jetting Unit—

The ink jetting step is a step of forming an image by applying a stimulus to the recording ink of the present invention so as to jet the recording ink.

The ink jetting unit is a unit configured to jet the recording ink of the present invention by applying a stimulus to the recording ink so as to form an image. The ink jetting unit is not particularly limited and may be suitably selected in accordance with the intended use. For example, as the ink jetting unit, various types of recording heads (ink ejection heads) are exemplified. In particular, an ink jetting unit having a head provided with a plurality of nozzle rows and a sub tank to house a liquid supplied from a liquid storage tank and to supply the liquid to the head, is preferable.

The sub tank preferably has a negative pressure generating unit configured to generate a negative pressure in the sub tank, an air releasing unit configured to release air in the sub tank, and a detecting unit configured to detect the presence or absence of ink depending on a difference in electric resistivity.

The stimulus can be generated by, for example, the stimulus generating unit. The stimulus is not particularly limited and may be suitably selected in accordance with the intended use. Examples thereof include heat (temperature), pressure, vibration, and light. These may be used alone or in combination. Of these, heat, and pressure are preferred.

Examples of the stimulus generating unit include heater, pressurizer, piezoelectric element, vibration generating device, ultrasonic oscillator, and light. Specifically, as the stimulus generating unit, the following are exemplified: a piezoelectric actuator such as a piezoelectric element; a thermal actuator that uses a thermoelectric conversion element such as heat-generating resistor and employs phase transition caused by film boiling of a liquid; a shape memory alloy actuator that uses a metal phase transition caused by temperature variations, or an electrostatic actuator using electrostatic forces.

An aspect of the jetting of the recording ink is not particularly limited and varies depending on the type of the stimulus. For example, when the stimulus is "heat", there is a method in which the recording ink in the recording head is given heat energy in accordance with a recording signal by the use of a thermal head, for example, to generate air bubbles in the recording ink by the heat energy, thereby the recording ink is ejected and jetted as liquid droplets from nozzle holes of the recording head. When the stimulus is "pressure", there is a method in which a voltage is applied to a piezoelectric element which is bonded at a place called pressure chamber in the ink flow passage in a recording head, thereby the piezoelectric element bends, the inner volume of the pressure chamber is reduced, thereby the recording ink is ejected and jetted as liquid droplets from nozzle holes of the recording head.

The method of jetting a recording ink by applying a voltage to a piezoelectric element is preferred. The piezo method is advantageous in jetting an ink containing resin components, and is an effective method which causes less nozzle clogging particularly when an ink containing less amount of wetting agent is used.

Further, in order to prevent nozzles from coming off, it is preferable that a piezoelectric element be applied with a voltage having an intensity by which the ink is not ejected, and the operation of scanning the recording head be performed without ejecting an ink from the recording head. Further, it is preferable that the operation of ejecting ink droplets in an ink reservoir be performed before the recording head has performed idle scanning operation for one page.

Further, the ink jetting unit preferably has a scraping-off unit configured to scrape off an ink that adheres on an idle ejection receiver. As the scraping-off unit, any one of a wiper and a cutter is preferable.

The controlling unit is not particularly limited and may be suitably selected in accordance with the intended use, as long as it is capable of controlling the operations of the units described above. Examples of the controlling unit include instruments such as a sequencer and computer.

Here, it is preferable that in the ink jetting unit, on a plate surface of the inkjet head for jetting an ink, with ink ejection ports provided thereon, an ink repellent layer be provided.

The surface roughness (Ra) of the ink repellent layer is preferably 0.2 μm or less. By adjusting the surface roughness (Ra) of the ink repellent layer to 0.2 μm or less, unwiped portions can be reduced.

FIGS. 13, 14A to 14C are cross-sectional views of a nozzle plate used in the present invention.

In this embodiment, a nozzle plate 232, which serves as a plate base of an inkjet head, is produced by an Ni electrocasting. On a surface of the nozzle plate 232, an ink repellent layer 231 is formed, which is a silicone resin film having a thickness of 1 angstrom (0.1 nm) or more. The surface roughness (Ra) of the ink repellent layer 231 is preferably 0.2 μm or less, and the thickness of the ink repellent layer 231 is preferably 0.1 μm or more, and more preferably 0.5 μm or more.

Figure 14A:
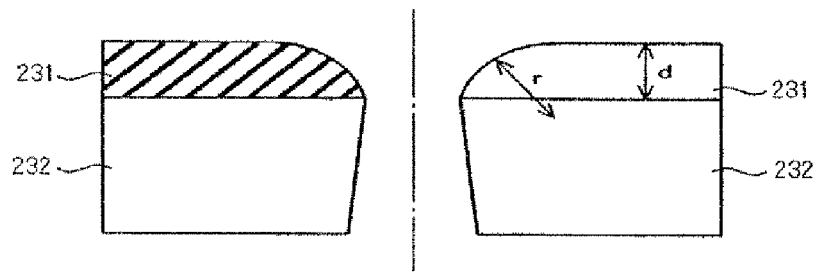
FIG. 14A is a schematic explanatory view showing another example of a nozzle plate for an inkjet head of the present invention.
Figure 14B:
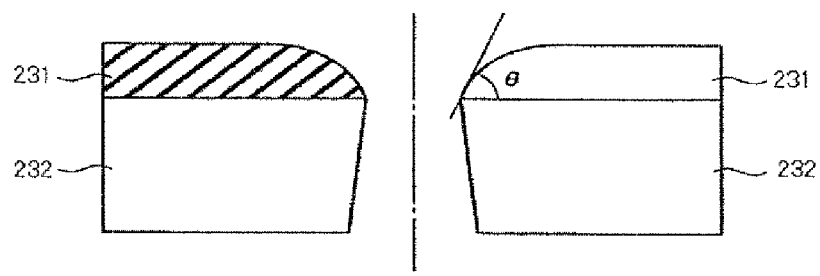
FIG. 14B is a schematic explanatory view showing still another example of a nozzle plate for an inkjet head of the present invention.
Figure 14C:
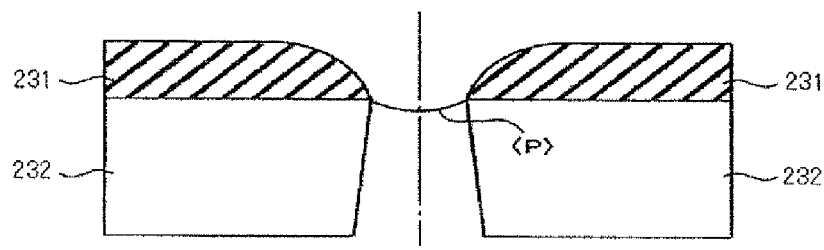
FIG. 14C is a schematic explanatory view showing still yet another example of a nozzle plate for an inkjet head of the present invention.

When the inkjet head is filled with an ink, as shown in FIG. 14C, a meniscus (liquid surface) P is formed at a boundary portion between the ink repellent layer 231 formed of a silicone resin film and the nozzle plate 232.

The ink ejection ports are formed on the inkjet head such that the cross-section area of each of the ink ejection ports measured at a plane, which is perpendicular to a center line of each of the ink ejection ports in the ink repellent layer formed near each of ink ejection ports on the plate surface on which a plurality of the ink ejection ports (nozzles) for ejecting ink are provided, gradually becomes larger with distance from the surface of the plate base.

The shape of the ink repellent layer near each of the ink ejection ports is preferably a rounded surface. Further, it is preferable that the curvature radius of a curved line of the ink repellent layer near each of the ink ejection ports, measured at a plane including the center line of each of the ink ejection ports, be larger than the thickness of the ink repellent layer.

Further, it is preferable that a curved line of the ink repellent layer, formed from the outside edge of each of the ink ejection ports of the ink repellent layer to a portion near each of to the ink ejection ports at a cross-section as a plane including the center line of each of the ink ejection ports be a substantially circular-arc curved line, and the curvature radius of the circular arc be larger than the thickness of the ink repellent layer.

Furthermore, it is preferable that a tangent line of the ink repellent layer that passes the outside edge of each of the ink ejection ports of the ink repellent layer, at the cross-section as a plane including the center line of each of the ink ejection ports be formed with an angle less than 90 degrees with respect to the surface of the nozzle member including the outside edge thereof.

Ports of the nozzle plate 232 are provided such that a cross-section thereof measured at a plane perpendicular to the center line represented with an alternate long and short dash line in FIGS. 14A to 14C is substantially circular, centering on the center line. Further, the ink repellent layer 231 formed on the ink ejection surface of the nozzle plate 232 is formed such that the cross-sectional area of each of the ports (each of the openings) measured at a plane perpendicular to the center line gradually becomes larger with distance from the nozzle plate 232.

More specifically, as shown in FIG. 14A, in each of the ports of the ink repellent layer 231, a curved line formed from the outside edge of one port (here, each of the ports is explained as one port for convenience) in the nozzle plate 232 to a portion near the port is formed in a round shape with a curvature radius "r". The curvature radius r is preferably larger than the thickness "d" of the ink repellent layer 231 other than the vicinity of the port.

The thickness d is a thickness of portions of the ink repellent layer 231 other than the round portion of the port on the ink repellent layer 231, and the thickness d is preferably the maximum thickness of the ink repellent layer.

In this way, the edge of the port provided on the ink repellent layer 231, which communicates with the port of the nozzle plate 232, is formed with a smooth curved line having no pointed portions. This configuration makes it possible to avoid such troubles that the ink repellent layer 231 delaminates from the nozzle plate 232 even when the injection head is wiped with a wiper formed of a material such as rubber is caught on such pointed portions.

Further, as shown in FIG. 14B, it is preferable that a tangent line formed so as to pass the outside edge of each of the ink ejection ports on the ink repellent layer 231 at the cross-section as a plane including the center line of one port (each of the ink ejection ports) of the nozzle plate 232 be formed with an angle θ less than 90 degrees with respect to the surface of the nozzle plate 232 including the outside edge of the port of the nozzle 232, which communicates with the outside edge of the port.

By providing an angle θ of less than 90 degrees between the tangent line at the outside edge of the port of the ink repellent layer 231 and the surface of the nozzle plate 232, it is possible to stably form a meniscus (liquid surface) P at the boundary portion between the ink repellent layer 231 and the nozzle plate 232 and to significantly reduce the possibility of forming the meniscus P at other positions. As a result, a meniscus-formed surface can be made stable, and thus excellent ink-jetting stability can be obtained when an image is formed with an image forming apparatus using the inkjet head equipped with the nozzle plate 232.

As the silicone resin used in this embodiment, a liquid silicone resin of room-temperature-curable type is preferable, and a liquid silicone resin associated with hydrolysis reaction is more preferable. In the Examples to be described hereinbelow, a silicone resin SR2411 manufactured by DOW CORNING TORAY SILICONE CO., LTD. was used.

Table 1 described below shows the edge shape formed from the outside edge of one port of nozzle plate 232 to a portion near the edge of the port, and evaluation results as to ink residue build up around the nozzle, edge delamination, and ink-jetting stability.

TABLE 1

| Shape of edge | | Ink residue | Edge delamination | Ink-jetting stability |
|---|---|---|---|---|
| With pointed portions | | Partially build up | Delaminated | Excellent |
| Without pointed portion (formed in a round shape) | $\theta \leq 90°$ | Not observed | Not observed | Excellent |
| | $\theta > 90°$ | Not observed | Not observed | Defective |
| | $r \geq d$ | Not observed | Not observed | Excellent |
| | $R < d$ | Not observed | Partially delaminated | Defective |

The results shown in Table 1 demonstrated that the use of an inkjet head in which the shape of an edge portion in an ink repellent layer 231 (near the outside edge of a port) with the inclusion of substantially-pointed portions caused ink residue build up around the nozzle and edge delamination after being wiped.

Figure 15A:
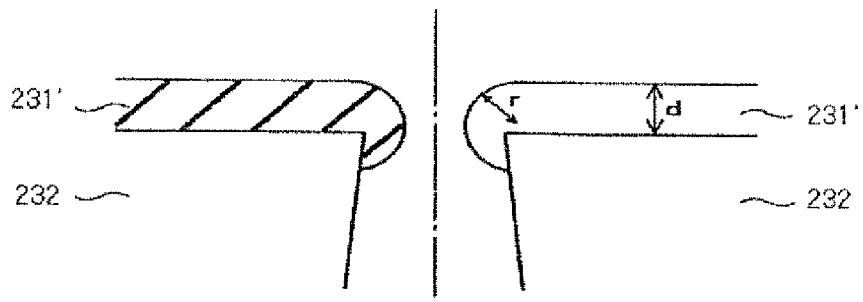
FIG. 15A is a schematic explanatory view showing nozzle plates for inkjet heads, for comparison.
Figure 15B:
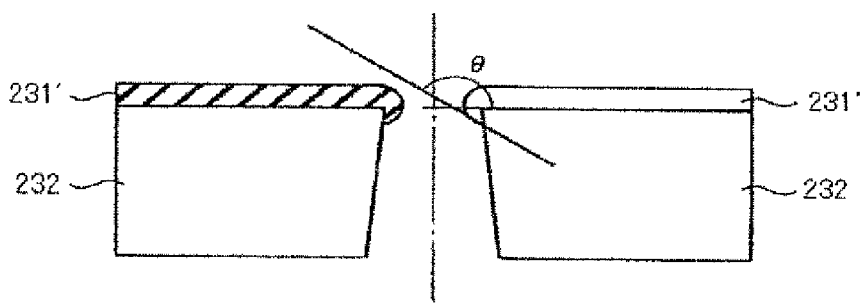
FIG. 15B is a schematic explanatory view showing nozzle plates for inkjet heads, for comparison.

The use of an inkjet head having a round port edge caused no ink residue. In comparison, the use of an inkjet head having an angle of r<d as shown in FIG. 15A caused partial edge delamination, and when an inkjet head having θ>90° as shown in FIG. 15B was used, the jetting of ink droplets was unstable.

Figure 15C:
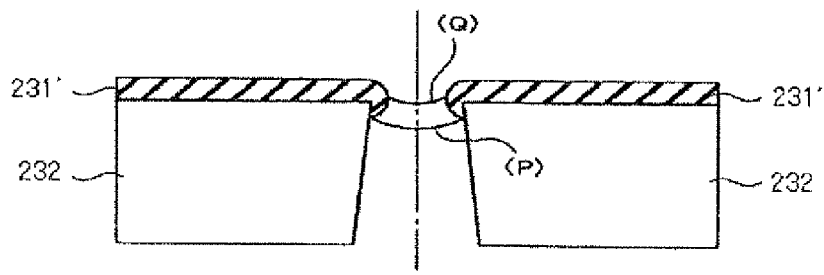
FIG. 15C is a schematic explanatory view showing nozzle plates for inkjet heads, for comparison.

Further, as shown in FIG. 15C, when an inkjet head having r<d or an inkjet head having θ>90° was used, there may be a case where a meniscus (liquid surface) P is formed at the boundary portion between an ink repellent layer 231 and a nozzle plate 232, and there may be a case where a meniscus Q is formed at a protrusion toward the center of the port in an ink repellent layer 231' (a portion at which the cross-sectional area perpendicular to the center line of the port becomes the smallest). For this reason, there is a possibility that the ink-jetting stability varies when an image is recorded in an inkjet recording apparatus using an inkjet head including the nozzle plate 232.

Next, the method of producing a nozzle member for an inkjet head according to the above-noted embodiment.

Figure 16:
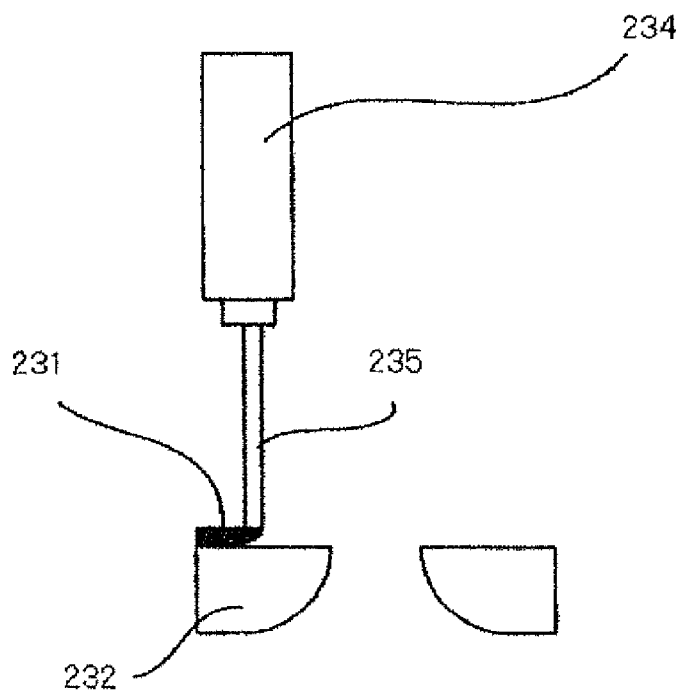
FIG. 16 is a view showing a state where a silicone resin is applied to a nozzle plate surface using a dispenser to form an ink-repellency layer.

FIG. 16 is a view showing a structure of an inkjet head in which a silicone resin is applied to a nozzle plate surface using a dispenser 234 according to this embodiment to form an ink-repellency layer 231.

Specifically, on the ink ejection side surface of a nozzle 232 produced by an Ni electrocasting, the dispenser 234 for applying a silicone solution is placed, and by performing scanning operation with the dispenser 234 while ejecting silicone from the tip of a needle 235 so that a nozzle plate 232 and the tip of the needle 235 are kept at a predetermined interval, it was possible to selectively form a silicone resin film on the ink ejection surface of the nozzle plate 232 as illustrated in FIG. 13 and FIGS. 14A to 14C.

For the silicone resin used in this embodiment, a liquid silicone resin of room-temperature-curable type SR2411 (viscosity: 10 mPa·s manufactured by DOW CORNING TORAY SILICONE CO., LTD.) was used. However, a slight amount of silicone flow into nozzle holes and onto the back surface of the nozzle plate was observed. The silicone resin film selectively formed in this way had a thickness of 1.2 µm and a surface roughness (Ra) of 0.18 µm.

Figure 17A:
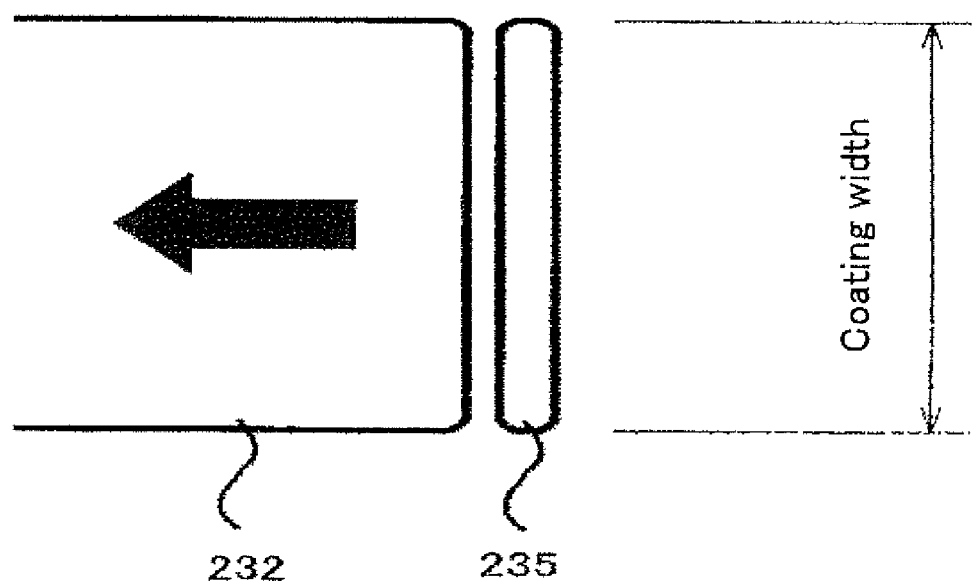
FIG. 17A is a view showing a relation between a coating port at the tip of a needle of the present invention and the coating width of a nozzle plate to be coated.
Figure 17B:
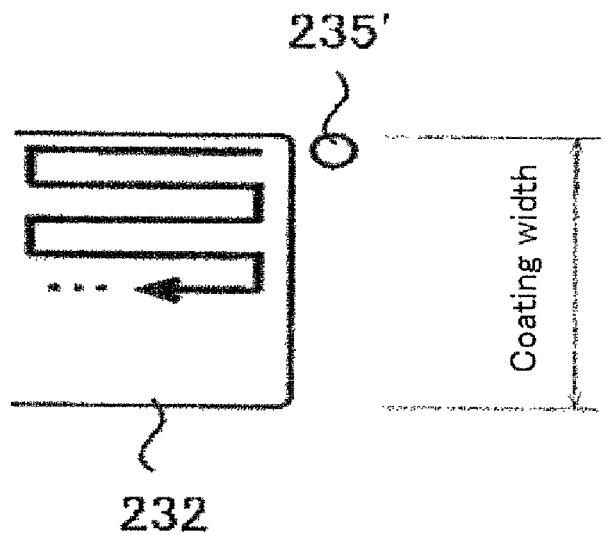
FIG. 17B is a view showing a relation between a coating port at the tip of a commonly used needle and the coating width of a nozzle plate to be coated.

In the coating hole of the tip of the needle 235 according to this embodiment, a width (coating width) required for coating a target of the nozzle plate 232, is ensured, as shown in FIG. 17A. With this configuration, the entire surface of a coating target can be completely coated by just moving a dispenser (not shown) once in a coating direction.

In other words, the moving direction of the dispenser required for the coating operation can be set to only one direction, and this configuration makes it possible to cut out the need of changing the moving direction of the dispenser and of moving it in an opposite direction.

Here, the tip of a common needle 235 is far narrower than the coating width required for coating a nozzle plate 232, which is a coating target, and therefore, in order to complete coating of the entire surface of the coating target, there is a need to change the moving direction of the dispenser by 90° for coating operation and to move the dispenser in plural directions such as in an opposite direction. Therefore, there has been a difficulty in uniformly coating the entire surface of a coating target.

According to this embodiment, the width of the coating hole of the tip of the needle 235 is ensured by only the coating width, i.e., a width required for coating the nozzle plate 232. This configuration makes it possible to uniform the thickness of a coating solution throughout the surface of a coating target and to obtain precise surface finishing.

Figure 18:
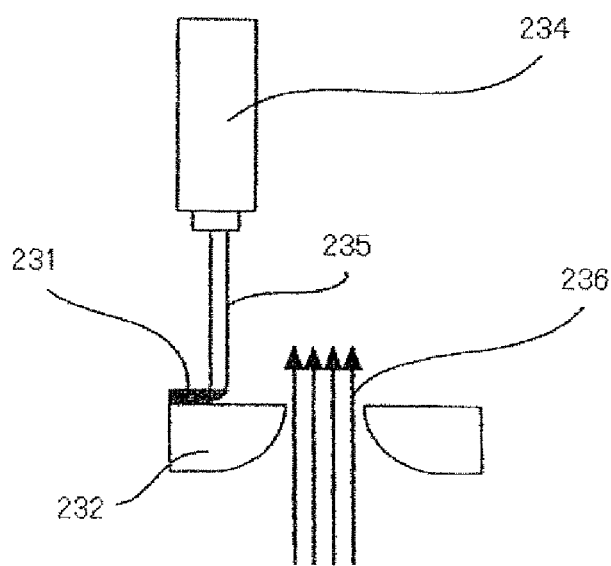
FIG. 18 is a diagram showing coating operation using a dispenser.
Figure 19:
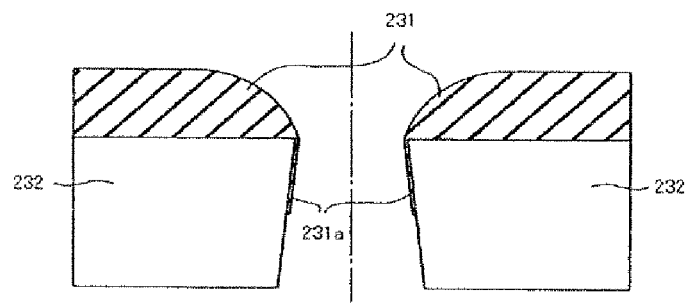
FIG. 19 is a diagram showing a state where an ink repellency layer composed of silicone resin is formed up to a desired depth of an inner wall of a nozzle.

FIG. 18 is a diagram showing coating operation using a dispenser 234 according to this embodiment. The basic configuration is similar to that shown in FIG. 11, however, a nozzle plate surface is coated with silicone while the dispenser jetting a gas 236 from a nozzle hole (port) of the nozzle plate 232. The gas 236 may be suitably selected from various gases as long as the gas is least likely to chemically react with the silicone used for coating. For example, it may be air. By coating a nozzle plate surface while jetting the gas 236 from the nozzle hole(s) in this way, a silicone resin film can be formed on only portions of the nozzle plate surface except for the nozzle hole(s) on the nozzle plate 232.

When a similar silicone resin is made to proceed to a predetermined depth by applying the silicone resin without jetting the gas 236 as mentioned above and thereafter the gas 236 is jetted from the nozzle 232, an ink repellent layer composed of the silicone resin can be formed to the predetermined depth of the nozzle wall (for example, to the depth of several micro meters or so). That is, in addition to the ink repellent layer 231 formed on the ink ejection surface side, a thin ink repellent layer 231a (an ink repellent layer formed on the inner wall of a port) can be formed to the predetermined depth from the outside edge of a port of the nozzle plate 232.

The ink repellent layer 231 formed thus on the nozzle plate is wiped using an EPDM rubber (rubber hardness: 50 degrees). As a result, the ink repellent layer 231 could keep excellent ink repellency even when wiped 1,000 times. Further, a nozzle member with such an ink repellent layer formed thereon was soaked in an ink at 70° C. for 14 days. Thereafter, the ink repellency on a same level as that in the initial stage could be maintained.

Figure 20:
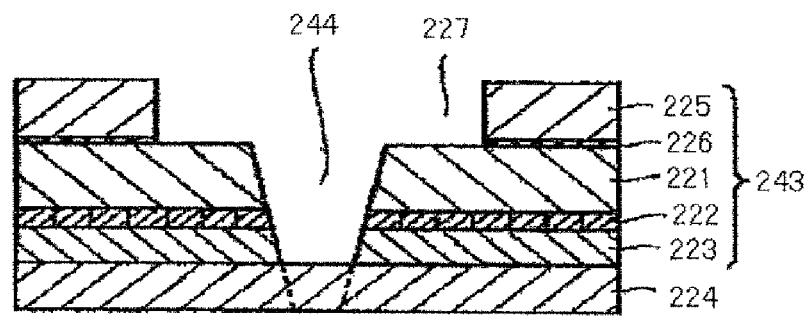
FIG. 20 is a view showing one example of an inkjet head of the present invention, and showing a state where a nozzle hole is formed by excimer laser processing.

FIG. 20 is a view showing one example of an inkjet head of the present invention, and showing a state where a nozzle hole is formed by excimer laser processing. A nozzle plate 243 is prepared by bonding a resin component 221 and a high-stiffness component 225 with a thermoplastic adhesive 226. On a surface of the resin component, on which the high-stiffness component 225 is not formed, an SiO$_2$ thin layer, a thin layer 222, and a fluorine-based water-repellent layer 223 are formed in this order. A nozzle hole 244 having a desired diameter is formed on the resin component 221, and on the high-stiffness component 225, a nozzle-communicating port 227 that communicates with the nozzle hole 244 is formed. The $SiO_2$ thin layer 222 is formed by application of a relatively small amount of heat, i.e, by a method allowing for forming a layer at a temperature within the range where the resin component is not thermally affected. Specifically, sputtering, ion beam evaporation, ion plating, CVD (Chemical Vapor Deposition), and P-CVD (Plasma-Chemical Vapor Deposition) etc. are suitably employed.

It is advantageous in terms of process step time and material cost to make the $SiO_2$ thin layer 222 have a required minimum thickness with which the adhesiveness can be ensured. This is because when the $SiO_2$ thin layer 222 is thickly formed, it will cause some trouble in nozzle hole processing with the use of an excimer Specifically, even when the resin component 221 is neatly processed in the form of a nozzle hole, part of the $SiO_2$ thin layer 222 cannot be satisfactorily processed, leaving unprocessed portions. Thus, it can be said that the thickness range of 1 angstrom to 300 angstroms (0.1 nm to 30 nm) is suitable as a thickness range where the adhesiveness thereof can be ensured and no unprocessed portion of the $SiO_2$ thin layer 222 is left at the time of processing with an excimer laser. The thickness range of 10 angstroms to 100 angstroms (1 nm to 10 nm) is more suitable. In the experimental results, the adhesiveness between the $SiO_2$ thin layer 222 and the resin component 221 was satisfactory, and there was no problem with processed results with the use of excimer laser even when the thickness of the $SiO_2$ thin layer was 30 angstroms (3 nm). When the thickness was set to 300 angstroms (30 nm), unprocessed portions were slightly observed, but this was in the usable range; and when the thickness was set to be thicker than 300 angstroms (30 nm), significantly large unprocessed portions occurred, and nozzle deformation which was on the level where no practical use is expected was observed.

For the material of the ink repellent layer, any materials can be used, as long as it is a water-shedding material. Specific examples thereof include fluorine-based water-repellent materials and silicone-based water-repellent materials.

With respect to the fluorine-based water-repellent materials, various materials have been known. Herein, required water-repellency is obtained by depositing a mixture (product name: OPTOOL DSX, manufactured by Daikin Industries, Ltd) of a perfluoropolyoxetane with a modified perfluoropolyoxetane so as to be a thickness of 1 angstrom to 30 angstroms (0.1 nm to 3 nm). In the experimental results, even when the thickness of the OPTOOL DSX was set to 10 angstroms, 20 angstroms, and 30 angstroms, there was no difference found in the water repellency, and wiping durability. Therefore, in view of cost, the thickness of the ink repellent layer is more preferably 1 angstrom to 20 angstroms (0.1 nm to 2 nm). However, from the perspective of reliability, although it depends on an ink used, the properties of the inkjet head may be maintained for a long time with the use of a thickly formed water-repellent layer. Thus, in this case, it is preferable that the thickness be set to 100 angstroms to 200 angstroms (10 nm to 20 nm). Further, on the surface of the fluorine-based water repellent layer 223, an adhesive tape 224 is affixed, the adhesive tape 224 is obtained by applying a resin film with an adhesive material and serves as an auxiliary function at the time of processing with an excimer laser. A silicone-based water repellent material can be used as well.

It is preferable that the silicone-based water repellent material be a liquid silicone resin of room temperature curable type or an elastomer; and any one of the materials be applied onto a surface of a base, and then left in the air at room temperature so as to be hardened by polymerization, thereby forming an ink repellent film (layer).

The silicone-based water repellent material may also be a liquid silicone resin of heat curable type or an elastomer; and an ink repellent film (layer) may be formed by applying any one of the materials onto a surface of a base, and heating the material so as to be cured.

Further, the silicone-based water repellent material may also be a liquid silicone resin of ultraviolet curable type or an elastomer; and an ink repellent film (layer) may be formed by applying any one of the materials onto a surface of a base, and irradiating the material with an ultraviolet ray so as to be cured.

It is preferable that the viscosity of the silicone-based water repellent material be 1,000 cp (centipoise) or less.

Figure 21:
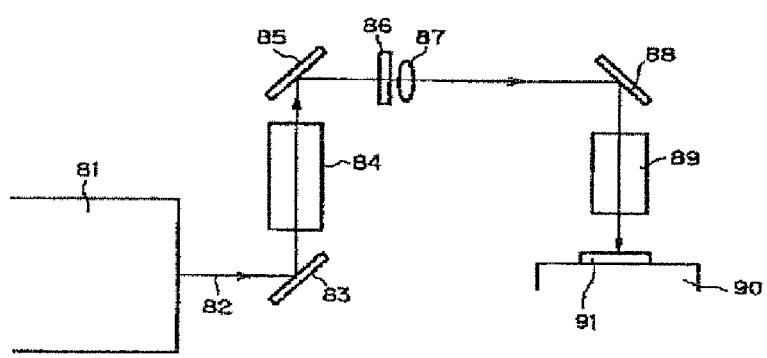
FIG. 21 is a view showing a structure of an excimer laser processor used for processing nozzle holes.

FIG. 21 is a view showing a structure of an excimer laser processor used for processing nozzle holes. An excimer laser beam 82 emitted from a laser oscillator 81 is reflected by mirrors 83, 85, and 88 so as to be led to a processing table 90. In the optical path the laser beam 82 reaches the processing table 90, a beam expander 84, a mask 86, a field lens 87, and an image forming optical system 89 are arranged at predetermined positions so that an optimum beam reaches a process target. The process target (nozzle plate) 91 is placed on the processing table 90 and is to be exposed to the laser beam 82. The processing table 90 is an XYZ table, which has been widely known, and is configured such that the process target 91 can be moved to a desired position if necessary so as to be exposed to a laser beam. Here, the laser is explained with utilization of an excimer laser, however, various types of lasers can be used, as long as it is an ultraviolet laser having a short wavelength, which allows for abrasion processing.

FIGS. 22A to 22F are views showing production steps for producing a nozzle plate in the production method of an inkjet head of the present invention.

Figure 22A:
FIG. 22 A is a view showing a base of a nozzle-forming component in a nozzle plate preparing step in a method of producing an inkjet head.
FIG. 22B is a view showing a step of forming an $SiO_2$ thin layer on a surface of a resin film.
FIG. 22C is a view showing a step of applying a fluorine-based water repellant onto the $SiO_2$ thin film.
FIG. 22D is a view showing a step of leaving the water repellency layer in the air after evaporation thereof.
FIG. 22E is a view showing a step of affixing an adhesive tape to the water repellency layer.
FIG. 22F is a view showing a step of processing a nozzle hole.

FIG. 22A shows a base of a nozzle-forming component. Here, as a resin film 221, a polyimide film, CAPTON (product name), which is free of particles, produced by Dupont Co. is used, for example. In ordinary polyimide films, particles such as $SiO_2$ (silica) are added in view of handleability (slipperiness) in apparatuses for handling roll films. When nozzle hole processing is carried out with the use of excimer laser, processability with excimer laser of $SiO_2$ (silica) particles was poor, and nozzle deformation may be caused. For this reason, in the present invention, a film with no addition of $SiO^2$ (silica) particles is used. As a base material for nozzle plate, a polyimide film, UPILEX manufactured by Ube Industries, Ltd. may be used. Since particles contained in UPILEX are very fine and do not cause troubles in processing, the film can be directly used.

Figure 22B:

FIG. 22B is a view showing a step of forming an $SiO_2$ thin layer 222 on a surface of a resin film 221. The $SiO_2$ thin layer 222 is suitably formed by sputtering in a vacuum chamber, and the thickness thereof is preferably about 1 angstrom to 300 angstroms (0.1 nm to 30 nm). In this embodiment, the $SiO_2$ thin layer 222 is formed so as to have a thickness of 10 angstroms to 100 angstroms (1 nm to 10 nm). In the sputtering method, firstly Si is sputtered, and then $O_2$ ion is applied to the Si surface, and an $SiO_2$ film (layer) is formed. By the use of this method, the adhesiveness of the $SiO_2$ layer to the resin film 221 is improved, a homogenous and dense film can be obtained, and it is more effective in improving the wiping durability of a water repellent layer.

Figure 22C:

FIG. 22C is a view showing a step of applying a fluorine-based water repellant 223a onto the $SiO_2$ thin layer. For the coating method, spin-coater, roll-coater, screen printing, spray coater can be used, however, a film deposition by vacuum evaporation is more effective because the adhesiveness of the water repellent layer can be improved. By forming the $SiO_2$ thin layer 222 in the step of FIG. 22B, and carrying out the vacuum evaporation in the same vacuum chamber with leaving the workpiece as it is, further favorable effect can be obtained. Conventionally, after forming an $SiO_2$ thin layer 222, the workpiece has been taken out once from a vacuum chamber. Thus, it is considered that the adhesiveness is impaired due to adhesion of impurities to the surface of the $SiO_2$ thin layer. For the fluorine-based water repellent material, various materials have been known, however, in this embodiment, as a fluorine amorphous compound, perfluoropolyoxetane, modified perfluoropolyoxetane or a mixture thereof is used. The use of any one of these makes possible to obtain necessary water repellency. Note that "OPTOOL DSX" manufactured by Daikin Industries, Ltd. may be referred to as "alkoxysilane terminal-modified perfluoropolyether".

Figure 22D:

FIG. 22D is a view showing a step of leaving the water repellency layer in the air after evaporation thereof. In this step, the fluorine-based water repellant 223a and the $SiO_2$ thin layer 222 are chemically bonded each other via moisture content in the air, thereby forming a fluorine-based water repellent layer 223.

Figure 22E:
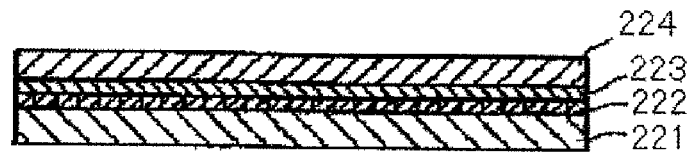

FIG. 22E is a view showing a step of affixing an adhesive tape 224 to the water repellency layer. At this point in time, it is necessary to affix the tape 224 so as not to induce air bubbles. This is because a nozzle hole which is holed at a position where air bubbles exist tends to degrade in quality due to extraneous matter induced during processing.

Figure 22F:
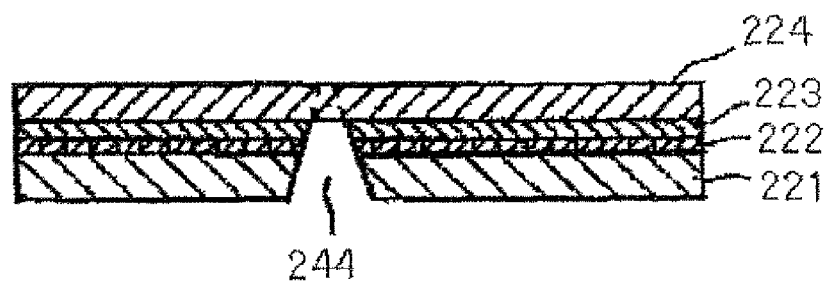

FIG. 22F is a view showing a step of processing a nozzle hole 244. In this step, an excimer laser is applied to the workpiece from the polyimide film 221 side to thereby form the nozzle hole 244. After processing the nozzle hole 244, the adhesive tape 224 is pealed off. Here, description on a high-stiffness component 225 used for improving the stiffness (rigidity) of the nozzle plate 243, which has been explained in FIG. 20, is omitted. If the high-stiffness component 225 is used in these process steps, it is advisable to form it between the step shown in FIG. 22D and the step shown in FIG. 22E.

Figure 23:
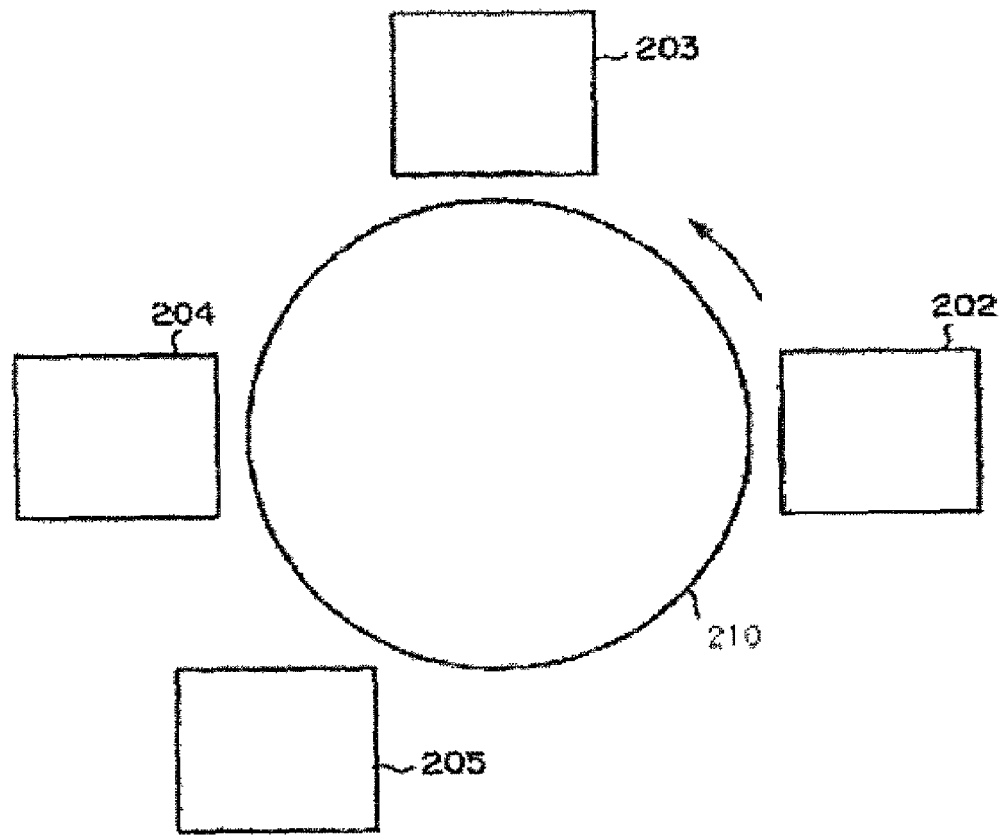
FIG. 23 is a view showing the outline of an apparatus used when an inkjet head is manufactured by a method for producing an inkjet head of the present invention.

FIG. 23 is a view showing the outline of an apparatus used when an inkjet head is manufactured by a method for producing an inkjet head of the present invention.

This apparatus is manufactured according to a process method called "Metamode process", which has been developed by OCLI (Optical Coating Laboratory Inc.) in U.S. and has been used in production of reflection preventive films and anti-fouling films for display. As shown in FIG. 23, at four locations around a drum 210, an Si sputter 202 serving as a station, an $O_2$ ion gun 203, an Nb sputter 204, and an OPTOOL deposition 205 are arranged, and all of them are in a chamber for vacuum deposition. Firstly, Si is sputtered by the Si sputter 202. Then, $O_2$ ions are applied to the Si by the use of the $O_2$ ion gun 203 to produce $SiO_2$. Subsequently, Nb and OPTOOL DSX are respectively suitably deposited by the Nb sputter 204 and the OPTOOL deposition 205. When a reflection preventive film is produced, layers of Nb and $SiO_2$ with a necessary number are stucked in a predetermined thickness and then deposited. In the present invention, the function of reflection preventive film is not necessary. Therefore, Nb is unnecessary, and it is necessary only to deposit one $SiO_2$ layer and one OPTOOL DSX layer. As described above, by using this apparatus, it is possible to carry out vacuum evaporation of OPTOOL DSX in the same vacuum chamber without moving the workpiece after forming the $SiO_2$ thin layer 122 in the vacuum chamber.

The critical surface tension of the ink repellent layer is preferably 5 mN/m to 40 mN/m, and more preferably 5 mN/m to 30 mN/m. When the critical surface tension is higher than 40 mN/m, an ink becomes excessively wet to the nozzle plate in the long-time use, and thus when printing operation is repeatedly carried out, ink ejection curve and abnormal particulation may occur, and when the critical surface tension is higher than 40 mN/m, an ink becomes excessively wet to the nozzle plate from the initial stage of printing operation, and therefore ink ejection curve and abnormal particulation may occur.

Actually, each of ink repellent materials shown in Table 2 was applied onto an aluminum base, and the applied material was heated, dried, and thereby a nozzle plate provided with an ink repellent layer was produced. The critical surface tension of the ink repellent layer was measured. Table 2 shows the measurement results.

The critical surface tension can be measured by Zisman method. Specifically, a liquid whose surface tension has been known is dropped on an ink repellent layer, a contact angle θ thereof is measured, the surface tension of the liquid is plotted along x axis, and cos θ is plotted along y axis. As a result, a decreasing straight line can be obtained (Zisman Plot). A surface tension obtained when Y is equal to 1 (θ=0) on the straight line can be calculated as a critical surface tension γc. Besides the Zisman method, the critical surface tension can be calculated by Fowkes method, Owens and Wendt method, or Van Oss method.

Similarly to the above-mentioned method for producing an inkjet head, an inkjet head was produced using the ink repellent layer-provided nozzle plate. A cyan ink stated below was used in the inkjet head, and the ink was jetted. The ink jetting process was videographed and observed. As a result, it was confirmed that the ink was normally particulated when any of the nozzle plates produced was used, and there was no problem with the ejection stability. Table 2 shows the test results.

<Cyan Ink>

In a vessel, 20.0% by mass of copper phthalocyanine pigment-containing polymer fine particle dispersion, 23.0% by mass of 3-methyl-1,3-butadiol, 8.0% by mass of glycerine, 2.0% by mass of 2-ethyl-1,3-hexanediol, 2.5% by mass of FS-300 is (produced by DuPont Co.) as a fluorochemical surfactant, 0.2% by mass of PROXEL LV (produced by Avecia) as an antiseptic/antifungal agent, 0.5% by mass of 2-amino-2-ethyl-1,3-propanediol, and an appropriate amount of ion exchange water were added so that the total amount thereof was 100% by mass. Thereafter, the mixture was filtered through a membrane filter having an average pore diameter of 0.8 μm. Through the above process, a cyan ink was produced.

TABLE 2

| | Product name | Critical surface tension | Ejection stability |
|---|---|---|---|
| DOW CORNING TORAY SILICONE CO., LTD. | SR2411 | 21.6 mN/m | Excellent |
| Shin-Etsu Chemical Co., Ltd. | KBM7803 | 16.9 mN/m | Excellent |
| Shin-Etsu Chemical Co., Ltd. | KP801M | 6.6 mN/m | Excellent |

Figure 3:
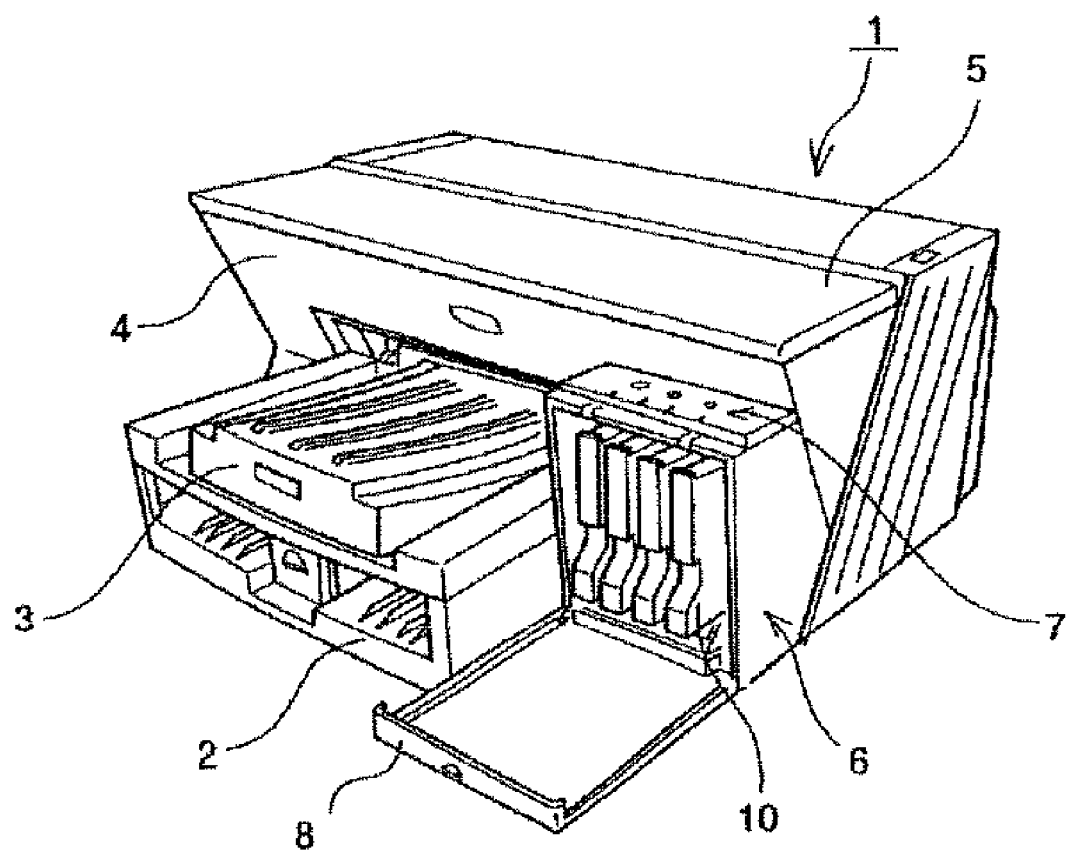
FIG. 3 is a schematic explanatory view showing one example of an inkjet recording apparatus of the present invention.

Hereinafter, one aspect of performing the ink-jet recording method of the present invention by the ink-jet recording apparatus of the present invention will be explained with reference to the drawings. FIG. 3 is a schematic explanatory view showing one example of an inkjet recording apparatus of the present invention. The ink-jet recording apparatus in FIG. 3 includes an apparatus main body 1, a paper feed tray 2 for feeding paper that is loaded thereon into the apparatus main body 1, a paper discharge tray 3 for storing paper which has been loaded into the apparatus main body 1 and on which images have been recorded (formed), and an ink cartridge loading section 6. An operation unit 7 composed of operation keys, a display and the like is placed on the upper surface of the ink cartridge loading section 6. The ink cartridge loading section 6 has a front cover 8 capable of opening and closing to attach and detach an ink cartridge 10. It should be noted that the reference numeral 5 denotes an upper cover, and the reference numeral 4 denotes the front side.

Figure 4:
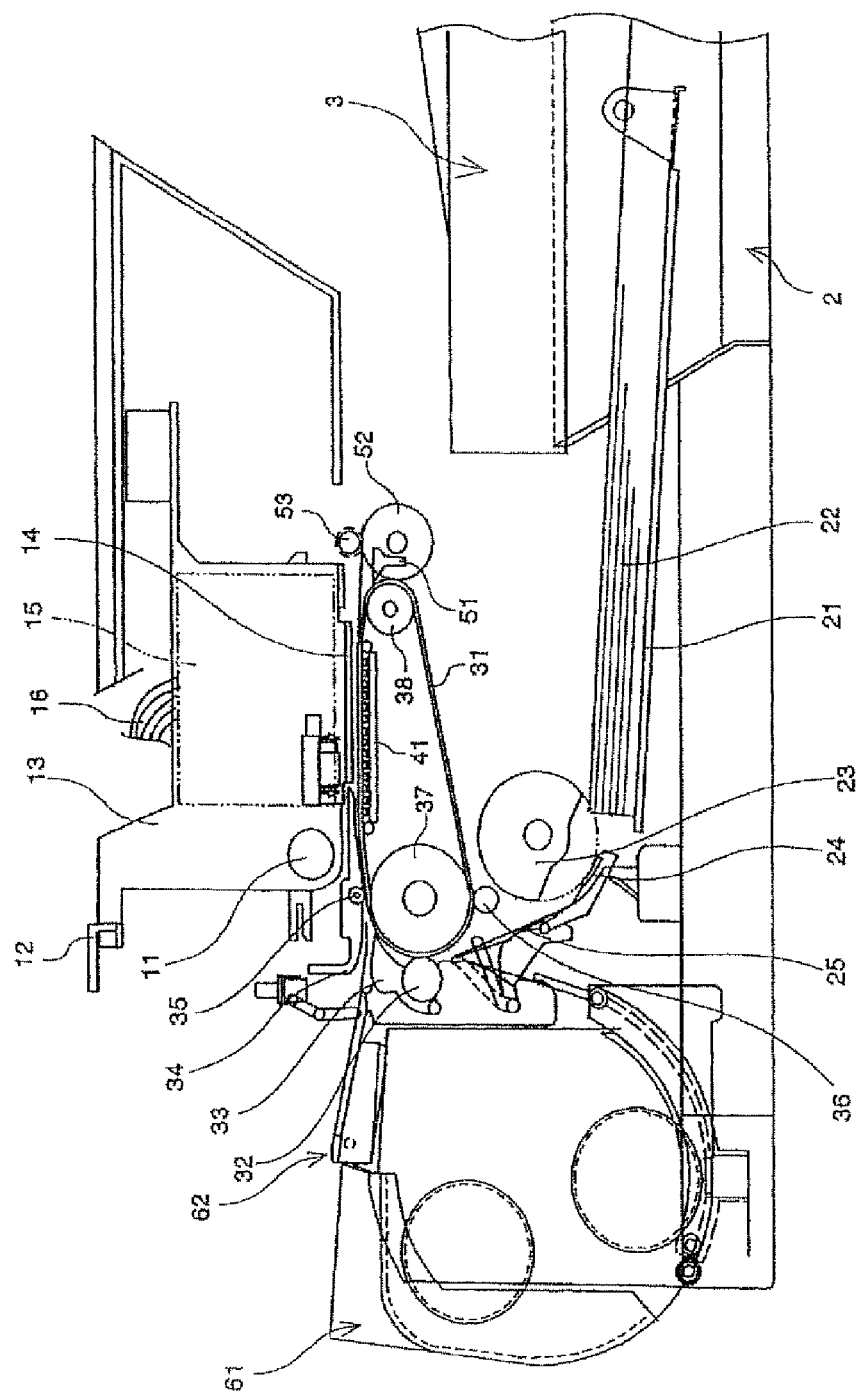
FIG. 4 is a schematic explanatory view exemplarily showing the internal structure of the inkjet recording apparatus shown in FIG. 3.
Figure 5:
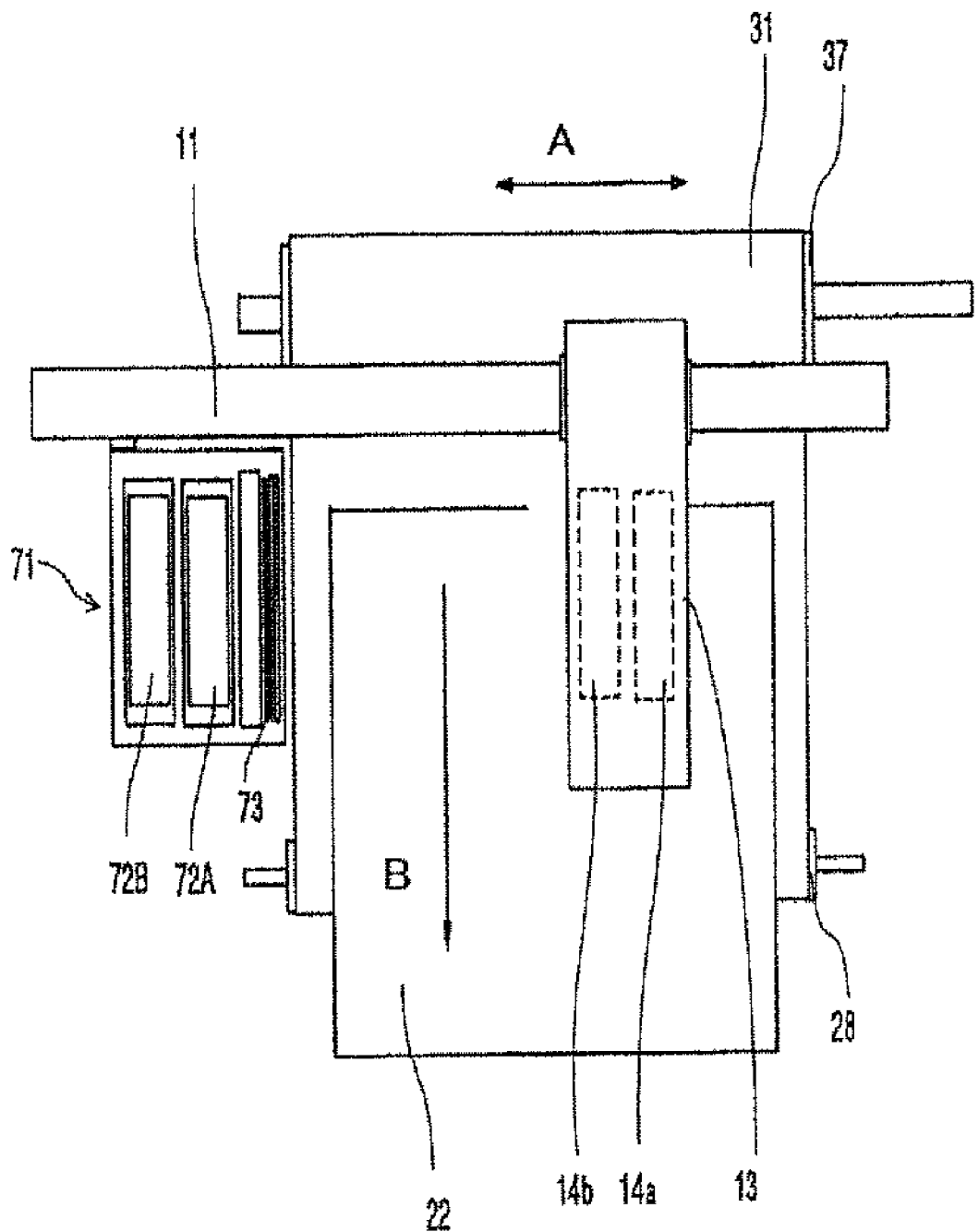
FIG. 5 is a schematic enlarged view exemplarily showing an inkjet head of the present invention.

In the apparatus main body 1, as shown in FIGS. 4 and 5, a carriage 13 is freely slidably held in the main scanning direction (indicated by the arrow A in FIG. 5) by a guide rod 11, which is a guide member laterally passed between left and right side plates (not shown), and a stay 12; and the carriage 13 is moved for scanning in the direction indicated by the arrow A in FIG. 5 by a main scanning motor (not depicted).

A recording head 14 composed of four inkjet recording heads which eject recording ink droplets of yellow (Y), cyan (C), magenta (M) and black (Bk) is installed in the carriage 13 such that a plurality of ink ejection outlets are aligned in the direction intersecting the main scanning direction and that the ink droplet ejection direction faces downward.

For each of the ink-jet recording heads composing the recording head 14, it is possible to use, for example, a head provided with any of the following actuators as a energy-generating unit for ejecting a recording ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Also, the carriage 13 incorporates sub tanks 15 of each color for supplying the inks of each color to the recording head 14. Each sub tank 15 is supplied and replenished with the recording ink from the ink cartridge 10 loaded into the ink cartridge loading section 6 shown in FIG. 3, via a recording ink supply tube (not shown).

Meanwhile, as a paper feed unit for feeding sheets of paper 22 loaded on a paper loading section (pressure plate) 21 of the paper feed tray 2, there are provided a half-moon roller (paper feed roller 23) which feeds the sheets of paper 22 one by one from the paper loading section 21, and a separation pad 24 which faces the paper feed roller 23 and is formed of a material with a large friction coefficient. This separation pad 24 is biased toward the paper feed roller 23 side.

As a conveyance unit for conveying the paper 22, which has been fed from this paper feed unit, under the recording head 14, there are provided a conveyance belt 31 for conveying the paper 22 in the conveyance direction (indicated by the arrow B in FIG. 5) by means of electrostatic adsorption; a counter roller 32 for conveying the paper 22, which is sent from the paper feed unit via a guide 25, such that the paper 22 is sandwiched between the counter roller 32 and the conveyance belt 31; a conveyance guide 33 for making the paper 22, which is sent upward in the substantially vertical direction, change its direction by approximately 90° and thusly correspond with the conveyance belt 31; and an end pressurizing roller 35 biased toward the conveyance belt 31 side by a pressing member 34. Also, there is provided a charging roller 36 as a charging unit for charging the surface of the conveyance belt 31.

The conveyance belt 31 is an endless belt and is capable of moving in circles in the belt conveyance direction, spanned between a conveyance roller 37 and a tension roller 38. On the back of the conveyance belt 31, a guide member 77 is placed correspondingly to a region where printing is carried out by the recording head 14. Additionally, as a paper discharge unit for discharging the paper 22 on which images or the like have been recorded by the recording head 14, there are provided a separation pawl 51 for separating the paper 22 from the conveyance belt 31, a paper discharge roller 52 and a paper discharge small roller 53, with the paper discharge tray 3 being placed below the paper discharge roller 52.

A double-sided paper feed unit 61 is mounted on a rear surface portion of the apparatus main body 1 in a freely detachable manner. The double-sided paper feed unit 61 takes in the paper 22 returned by rotation of the conveyance belt 31 in the opposite direction and reverses it, then refeeds it between the counter roller 32 and the conveyance belt 31. Additionally, a manual paper feed unit 62 is provided on an upper surface of the double-sided paper feed unit 61.

In the ink jet recording apparatus 1, the paper 22 is separated one by one and fed from the paper feed unit, the paper 22, which is fed upward in the substantially vertical direction, is guided by the guide 25, and conveyed such that the paper 22 is sandwiched between the conveyance belt 31 and the counter roller 32. The distal end of the paper is guided by the conveyance guide 33 and pressed against the conveyance belt 31 by end pressurizing roller 35, and the conveyance direction thereof is changed by approximately 90°.

At this point in time, the conveyance belt 31 is charged by the charging roller 36, and the paper 22 is conveyed by the conveyance belt 31 by means of electrostatic adsorption. By driving the recording head 14 according to the image signal, while moving the carriage 13, ink droplets are ejected from the recording head 14 to record information, data or an image for one line on the paper 22 which remains stationary, and then the paper 22 is conveyed a predetermined distance for recording the next line. On receipt of a recording completion signal or such a signal as indicates that the rear end of the paper 22 has reached the recording region, recording operation is finished, and the paper 22 is discharged onto the paper discharge tray 3.

Once the amount of recording ink remaining in the sub tanks 15 has been detected as too small, a required amount of recording ink is supplied from the ink cartridge 10 into the sub tanks 15.

It should be noted that although the ink-jet recording method of the present invention has been explained referring to an example in which it is applied to a serial-type (shuttle-type) ink-jet recording apparatus where a carriage performs scanning, the ink-jet recording method of the present invention can also be applied to line-type ink-jet recording apparatuses provided with line-type heads.

Figure 6:
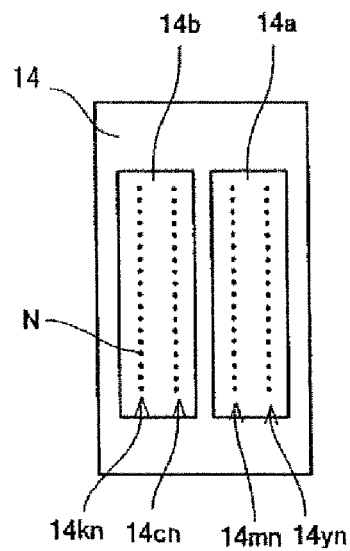
FIG. 6 is a schematic view showing rows of nozzles on an inkjet head of the present invention.

The recording head 14, which is named generically a plural recording heads) is composed, for example, as shown in FIG. 6, of a liquid droplet ejection head 14a and a liquid droplet ejection head b. The liquid droplet ejection head 14a has a nozzle column 14yn composed of a plurality of nozzles N that eject yellow (Y) ink droplets and a nozzle column 14 nm composed of a plurality of nozzles N that eject magenta (M) ink droplets. The liquid droplet ejection head b has a nozzle column 14cn composed of a plurality of nozzles N that eject cyan (C) ink droplets and a nozzle column 14kn composed of a plurality of nozzles N that eject black (Bk) ink droplets.

It should be noted that FIG. 6 illustrates an example that two color inks are supplied from two different sub tanks to one recording head, i.e., four color inks of yellow (Y), magenta (M), cyan (C), and black (Bk) are supplied from four different sub tanks to two recording heads, thereby allowing for four-color printing. However, the following configuration may be employed: four recording heads each having two nozzle columns are prepared, and each different-color sub tank is allocated to each of the four recording heads, in other words, with the use of four recording heads each having two nozzle columns and four sub tanks, thereby allowing for four-color printing of four color inks of yellow (Y), magenta (M), cyan (C), and black (Bk).

The example shown in FIG. 6 depicts an inkjet printer (IPSIO G505, manufactured by Richo Company Ltd.) where nozzles ejecting different color inks are arranged in columns on one recording head.

In an inkjet printer (IPSIO G707, manufactured by Richo Company Ltd.), which is not illustrated in the drawings, four recording heads having the same structure as above are provided, and each color inks of yellow ink, magenta, cyan and black is supplied to each of the four recording heads.

It is possible to prevent a nozzle section from coming off by performing idle scanning, in which a piezoelectric element is applied with a voltage having an intensity by which the ink is not ejected, and to prevent nozzles from coming off by frequently performing so-called idle ejection, in which ink droplets are ejected in an ink reservoir. It is preferable to perform idle ejection of ink droplets once during a time for printing at least one page.

For each of the ink-jet recording heads composing the recording head 14, it is possible to use, for example, a head provided with any of the following actuators as a energy-generating unit for ejecting a recording ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force. It should be noted that in Examples, which will be described hereinbelow, inkjet recording heads each using a piezoelectric actuator (a piezoelectric element) as an energy generation unit are employed.

The carriage 13 incorporates a sub tank 15 (when the color inks are differentiated from each other, reference numerals 15*y*, 15*m*, 15*c* and 15*k* are used so as to correspond to each of the nozzle columns), which is a container for supplying the inks of each color to each nozzle columns of 14*yn*, 14*mn*, 14*cn* and 14*kn* of the recording head 14. Each of the sub tanks 15 is replenished and supplied with each of the color inks from the main tank (ink cartridge) 10 which houses each of the color inks (when the color inks are differentiated from each other, reference numerals 10*y*, 10*m*, 10*c* and 10*k* are used so as to correspond to each of the nozzle columns) via ink supply tubes 16. Specifically, the main tank 10 houses the inks of each color of yellow (Y), cyan (C), magenta (M), and black (Bk), however, the main tank 10*k* accommodates a much larger amount of ink than in the main tanks 10*y*, 10*m* and 10*c* which accommodate the color inks other than black color ink.

Figure 7:
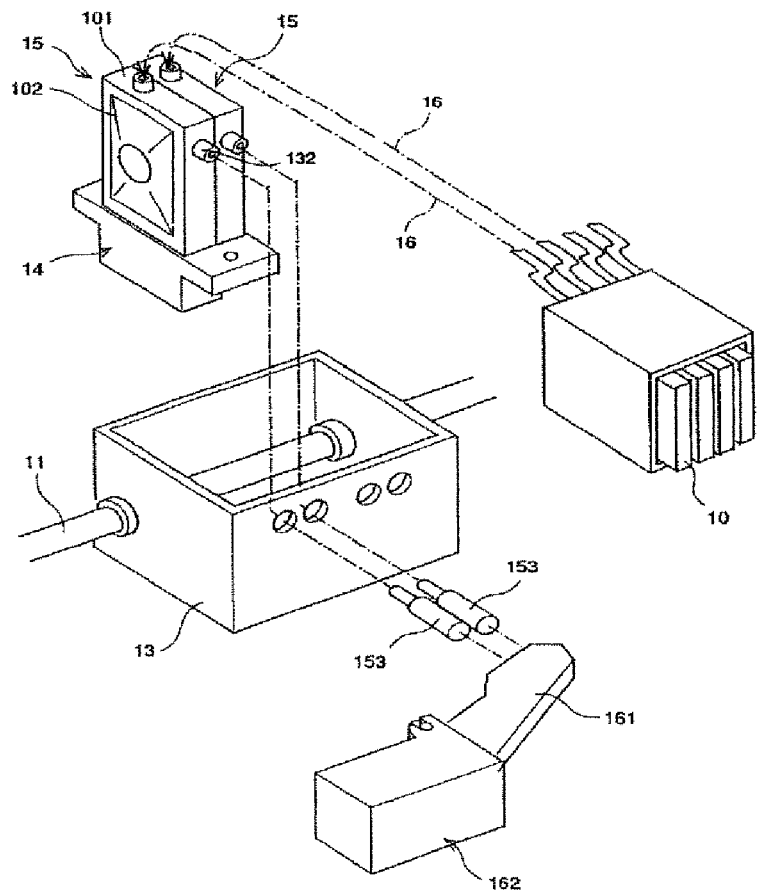
FIG. 7 is an exploded perspective view showing a liquid supply device in an inkjet recording apparatus of the present invention.
Figure 8:
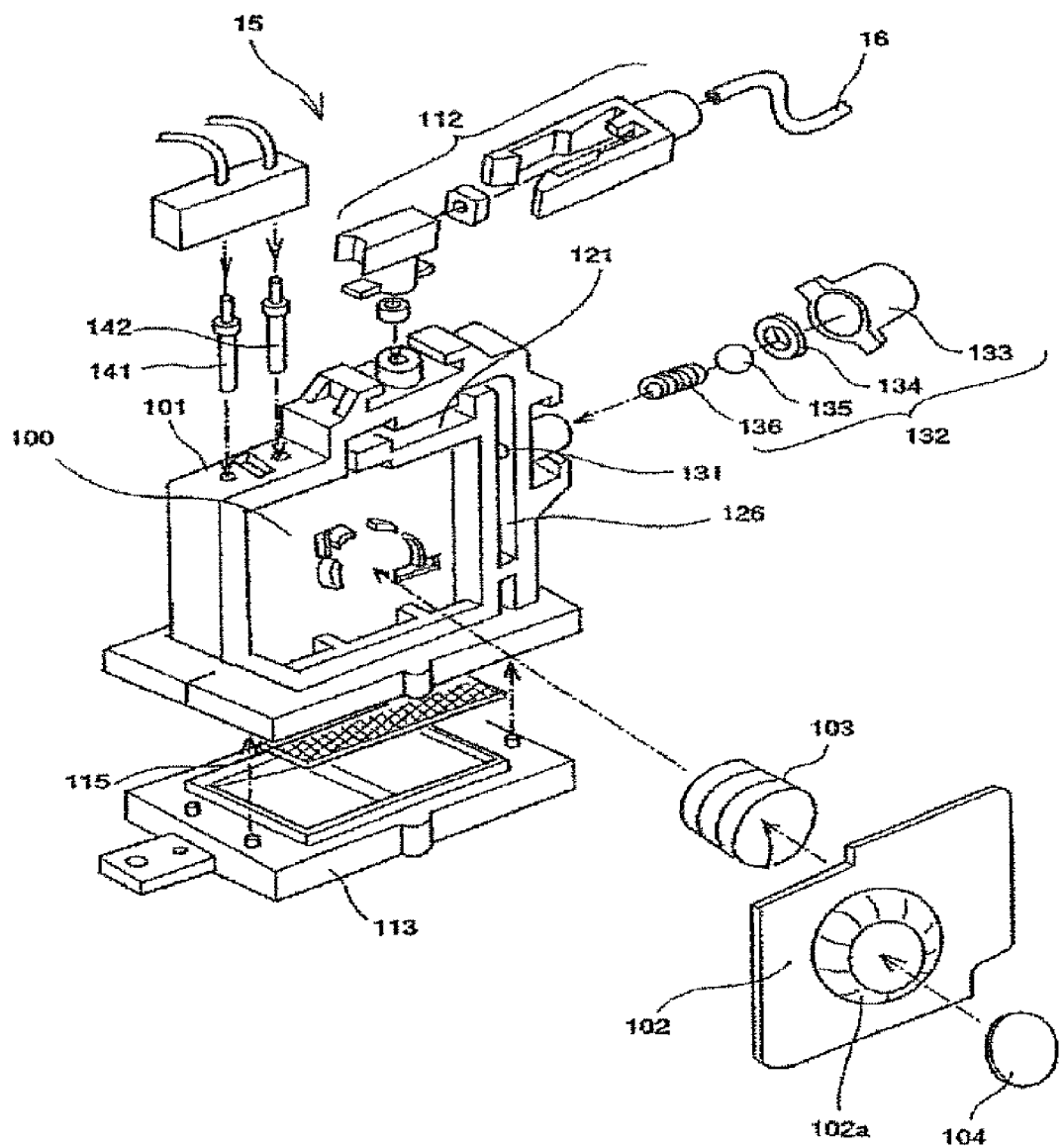
FIG. 8 is an enlarged exploded perspective view of the liquid supply device shown in FIG. 7.
Figure 9:
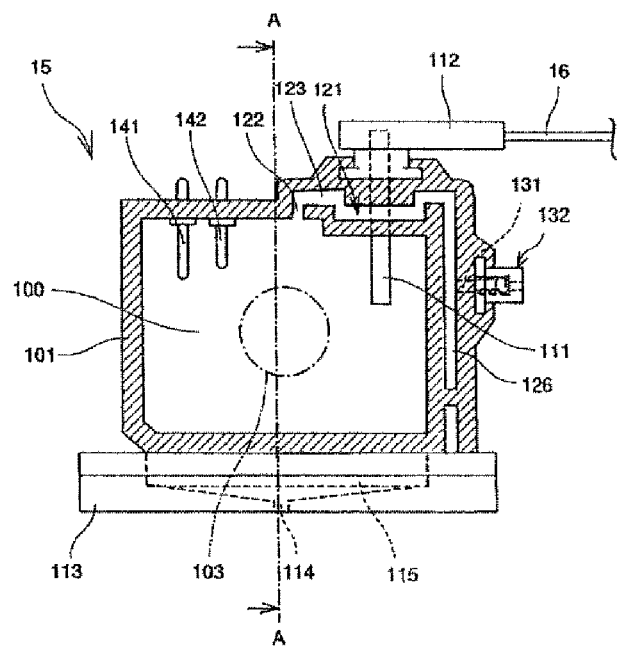
FIG. 9 is an explanatory side view showing a sub tank.

Hereinafter, the details of an ink supply device being a liquid supply device in the above-noted recording apparatus will be explained with reference to FIGS. 7 to 9. FIG. 7 is an exploded perspective view showing a liquid supply device. FIG. 8 is an enlarged exploded perspective view of the liquid supply device shown in FIG. 7. FIG. 9 is an explanatory side view showing one of the sub tanks.

The ink supply device is composed of subtanks 15 which are liquid supply containers for supplying inks to the recording head 14 (14*a*, 14*b*) with being installed to the carriage 13, as described above, and main tanks (ink cartridges) 10 for supplying and replenishing the sub tanks 15 with the inks via supply tubes 16.

In one of the sub tanks 15, to a container main body (case main body) 101 forming an ink housing 100 for housing an ink, a film component having flexibility (flexible film component) 102 for sealing an opening (one face of the subtank 15) of the ink housing 100 is affixed with an adhesive or by welding. Further, inside of the ink housing 100, a spring 103, which is an elastic component for biasing the film component 102 outward, is provided between the case main body 101 and the film component 102.

Figure 10A:
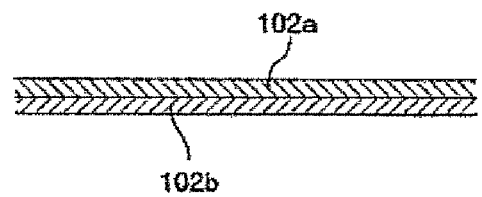
FIG. 10A is a schematic cross-sectional view separated at an A-A line shown in FIG. 9.
Figure 10B:
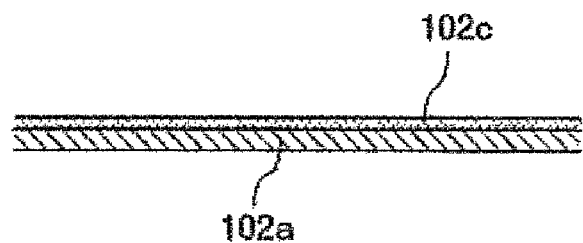
FIG. 10B is another schematic cross-sectional view separated at an A-A line shown in FIG. 9.

The film component 102 may have a single layer structure, however, as shown in FIG. 10A, may have a two-layer structure where a first layer 102*a* and a second layer 102*b* composed of different types of materials are laminated, for example, it may have a laminate structure where film components of polyethylene and nylon are laminated, or as shown in FIG. 10B, it may have a structure where a silica deposition layer 102*c* is formed as the first layer 102*a*. With such a structure, the liquid resistance to ink can be assuredly ensured. Also, the inclusion of a silica deposition layer in the film component 102 makes it possible to improve the liquid resistance to ink to be housed.

The thickness of the film component 102 is preferably 10 μm to 100 μm. When the thickness is less than 10 μm, damage attributable to deterioration with time is like to occur, and when the thickness is more than 100 μm, the flexibility thereof degrades and it may be difficult to efficiently generate negative pressure.

On the film component 102, a bulge 102*a* being a convex along the spring 103 is formed, and a reinforcing member 104 is further affixed to the exterior surface of the film component 102, corresponding to the bulge portion. By providing the convex on the flexible film component 102, the elastic component (spring) 103 can be held in a stable manner. In this case, it is possible to readily form a convex on the flexible film component 102 by forming a convex on a sheet film component.

Further, to the case main body 101, an ink introduction path section 111 is provided to supply ink, and a connection unit 112 for connecting the ink introduction path section 111 to the ink supply tube 16, which is connected to the ink cartridge 10, is detachably mounted.

Between the ink cartridge 10 and the sub tank 15, a liquid sending pump as described below is provided so as to pressure-send the ink from the ink cartridge 10 to the sub tank 15.

Further, a connecting member 113 is attached to the downside of the case main body 101 so as to supply the ink from the ink housing 100 to the recording head 14. On the connecting member 113, an ink supply paths 114 are formed from the recording head 14, and a filter 115 is provided between the connecting member 113 and the ink housing 100.

In addition, the upper part of the case main body 101, an air flow passage 121 for discharging air from the ink housing 100 is formed. The air flow passage 121 includes an inlet flow passage part 122 whose port faces the ink housing 100 and a flow passage part 123 (referred to as "orthogonal flow passage part") led from the inlet flow passage part 122. The air flow passage 121 is communicated with an air release hole 131 provided to the case main body 101 at the downstream side, and at the place downstream the air release hole 131, in a state of use, a storage section 126 is formed in continuation of the air release hole 131.

In the air release hole 131, an air release valve mechanism 132 for switching between a sealed state and an air released state of inside the sub tank 15 is provided. The air release valve mechanism 132 is structured such that a valve seat 134, a ball 135 serving as a valving element and a spring 136 for biasing the ball 135 toward the valve seat 134 are housed in a holder 133.

Hereinafter, the function of the storage section 126 will be explained. When the main body of the liquid supply device is tilted or swung, an ink is highly likely to intrude into the air flow passage 121. Then, the storage section 126 is structured such that the ink entered from the air flow passage 121 can be stored therein, thereby preventing the air release valve mechanism 132 from causing defective operation. For example, even when the liquid supply device is dropped during transportation and ink intrudes into the air flow passage, the ink is to intrude into the air release hole 131 and into the air release valve mechanism 132 configured to open and close the air release hole 131 and to set therein.

On the top of the case main body 101, two detection electrodes 141 and 142 for detecting that the amount of ink remaining in the sub-tanks 15 has been too small (this state is called "ink near-end") are mounted. A conduction state between the detection electrodes 141 and 142 changes depending on a difference between a state where both the detection electrodes 141 and 142 are soaked in an ink and a state where at least one of them is not soaked in the ink, thereby the state of "ink near-end" can be detected.

Figure 11:
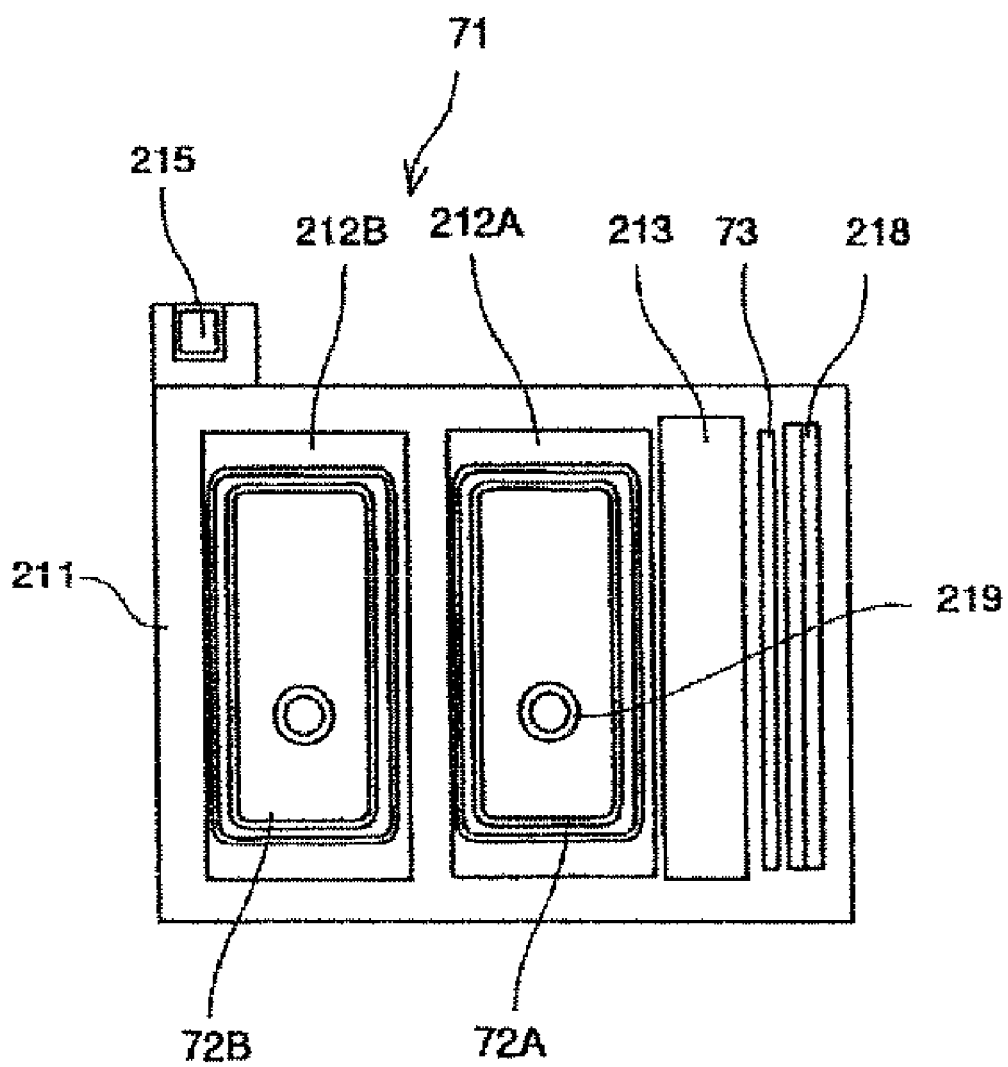
FIG. 11 is a top view of units for maintaining an inkjet printer of the present invention.
Figure 12:
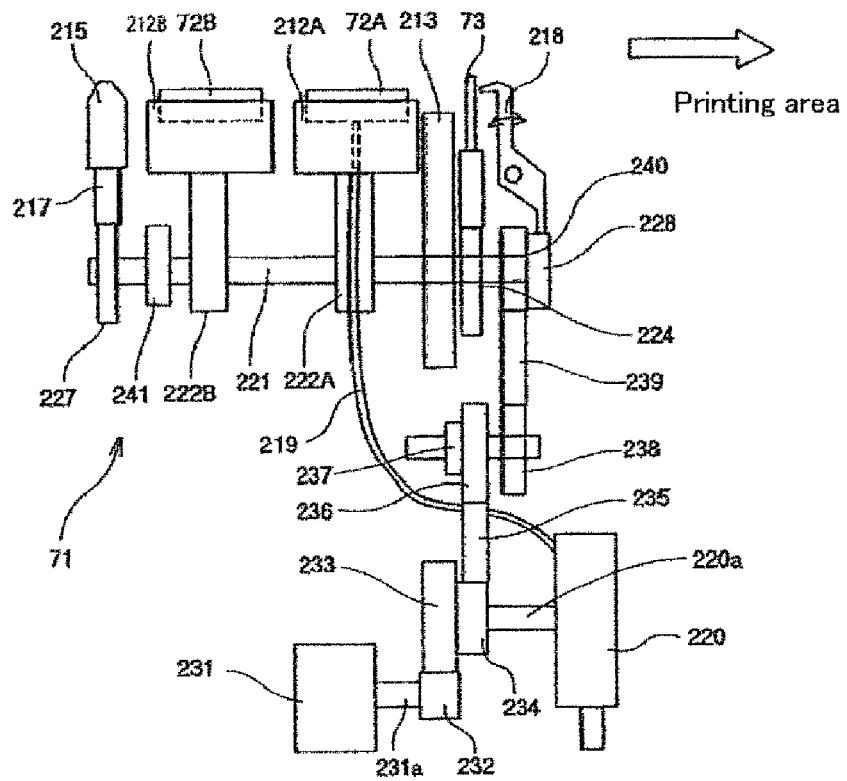
FIG. 12 is a schematic explanatory view showing one example of units for maintaining an inkjet printer of the present invention.
Figure 13:
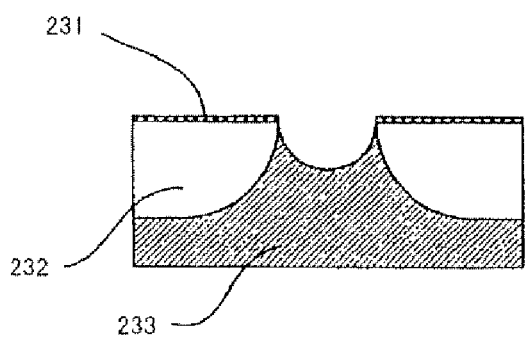
FIG. 13 is a schematic cross-sectional view showing one example of a nozzle plate for an inkjet head of the present invention.

The inkjet recording apparatus of the present invention is, as shown in FIGS. 11 and 12, equipped with a nozzle condition maintenance/recovery mechanism (hereinafter, may be referred to as "sub-system") 71 which maintains and recovers the nozzle condition of the recording head 14 and is placed in a non-printing area, which is one side (or both sides) of the scanning direction of the carriage 13. FIG. 11 is a top view of the condition maintenance/recovery mechanism, and FIG. 12 is a schematic explanatory view showing one example of units for maintaining the inkjet recording apparatus. The sub-system 71 is equipped with capping member 72A and 72B for capping each of nozzle surfaces of recording heads 14a and 14b, a wiper blade for wiping the nozzle surfaces. An idle ejection receiver is provided between the capping members 72A and the wiper blade 73 at the time when an ink is ejected. The idle ejection receiver is structured so that ink is ejected therein and flows downstream to a waste liquid tank. Because ink is likely to adhere to the place where ink is ejected, a wiper is provided so as to automatically scrape off adhered ink.

Hereinbelow, the condition maintenance/recovery mechanism 71 relating to the inkjet recording apparatus of the present invention will be further described in detail.

As shown in FIGS. 11 and 12, when a motor 231 normally rotates, a pump gear 233, an intermediate gear 234, an intermediate gear 235 and an intermediate gear 236 are driven to rotate, and a tube pump 220 is activated to suck the inside of the rightmost cap (on the side of recording area) which is connected with the pump 220 and a tube 219. Gears other than those mentioned above are not activated because a one-direction clutch 237 as an operating thereof is disconnected.

When the motor 231 rotates in a reverse direction, the one-direction clutch 237 is connected, functions connected from the motor to a cam shaft rotate. Although the tube pump 220 rotates in a reverse direction, it is configured so that it is not actuated as a pump.

To a cum shaft 221, a carriage lock-cum 227, cap-cums 222B and 222A, a wiper cum 224, a wiper cleaner cum 228 and a home position sensor cum 241 are mounted so as to integrally rotate.

A carriage lock 215 is biased upward (in the locking direction) by a compression spring (not shown). The carriage lock 215 is moved up and down by a carriage lock arm 217 that makes contact with the cum surface of the carriage lock-cum 227.

Caps 72A and 72B and a cap holder 212A are moved up and down by the cap-cums 222a and 222B.

A wiper 73 is moved up and down by the wiper cum 224.

A wiper cleaner 218 is biased in a direction away from the wiper 73 by a spring and moves in the wiping direction by the wiper cleaner cum 228. The wiper 73 descends down while being sandwiched by the wiper cleaner 218 and the idle ejection receiver, thereby the ink adhering to the wiper 73 is scraped off into the idle ejection receiver.

To the main body of the condition maintenance/recovery unit, a sensor (photo-interruptor/not shown) is fixed, and the unit is configured such that when the caps come to the lowest end by the home position sensor cum 241, an HP lever is made to work, the sensor is in an open state to thereby detect the home position of a motor (except for the motor of the pump).

When the power source is on, the caps 72A and 72B are moved up and down irrespective of the positions of the cap holders 212A and 212B (the positions are not detected until the movement starts), the home positions of the caps 72A and 72B are detected (during ascending), subsequently, they move a predetermined distance toward the lowest end. Thereafter, the carriage moves left and right to detect the positions of the caps, then comes back to the place where the caps are positioned, and then capped.

As the sequential order of the motor when it rotates in the reverse direction, the caps ascend (the carriage lock ascends at a substantially same timing), the caps descend (the carriage lock descends at a substantially same timing), the home position sensor is opened, the wipe ascends, the wiper cleaner starts its operation (to press the wiper against the idle ejection receiver), the wiper descends (to stroke the wiper with the wiper cleaner), and the wiper cleaner returns to the initial position. The series of the operations are repeated.

The inkjet recording apparatus and the inkjet recording method of the present invention can be used in various fields of recording based on inkjet recording method, and can be particularly suitably used, for example, in inkjet recording printers, facsimiles, copiers, printer/facsimile/copier complex apparatuses.

(Ink Media Set)

An ink media set of the present invention includes the recording ink of the present invention and a recording medium and further includes other components in accordance with the necessity.

<Recording Medium>

The recording medium has a support, and a coating layer applied onto at least one surface of the support and further has other layers in accordance with the necessity.

In the recording medium, the amount of purified water transferred to the recording medium for a contact period of 100 ms measured by a dynamic scanning absorptometer is 2 mL/m$^2$ to 35 mL/m$^2$, and more preferably 2 mL/m$^2$ to 10 mL/m$^2$.

When the amount of pure water transferred to the recording medium for a contact period of 100 ms is too small, ink beading is likely to occur, and the transfer amount is too large, the ink dot diameter after recorded may become too smaller than the desired dot diameter.

The amount of pure water transferred to the recording medium for a contact period of 400 ms measured by a dynamic scanning absorptometer is 3 mL/m² to 40 mL/m², and more preferably 3 mL/m² to 10 mL/m².

When the transfer amount for a contact period of 400 ms is too small, spur trace is likely to occur, and the transfer amount is too large, the glossiness of image portions that have been dried is liable to degrade.

Here, the dynamic scanning absorptometer (DSA, Japan TAPPI Journal, vol. 48, May 1994, pp. 88-92, Shigenori Kuga) is an apparatus which can precisely measure the amount of liquid absorbed in a very short period of time. The dynamic scanning absorptometer automatically conducts the measurement by a method in which the rate of liquid absorption is directly read on the basis of the transfer of a meniscus in a capillary, a sample is shaped like a disc, a liquid absorption head is spirally moved for scanning on the sample, the scanning rate is automatically changed in accordance with a preset pattern, and measurement is repeated according to the required number of points per sample. A head for supplying liquid to a paper sample is connected to the capillary via a Teflon (trademark) tube, and the position of the meniscus in the capillary is automatically read by an optical sensor. Specifically, the amount of purified water transferred was measured using a dynamic scanning absorptometer (K350 series, type D, manufactured by Kyowaseiko Corporation). The transfer amount for a contact period of 100 ms and the transfer amount for a contact period of 400 ms can be calculated by means of interpolation based upon the measurement values of the transfer amounts at contact periods close to the above-mentioned contact periods.

—Support—

The support is not particularly limited and may be suitably selected in accordance with the intended use. Examples thereof include paper made mainly from wood fiber, and sheet-like materials such as unwoven fabrics made mainly from wood fiber and synthetic fiber.

The paper is not particularly limited and may be suitably selected from known materials in accordance with the intended use. For instance, wood pulp or recycled pulp is used therefor. Examples of the wood pulp include leaf bleached kraft pulp (LBKP), needle bleached kraft pulp (NBKP), NBSP, LBSP, GP and TMP.

Examples of the raw material for the recycled pulp include articles shown in the "Used Paper Standard Quality Specification List" released by Paper Recycling Promotion Center, such as high-quality white paper, white paper with lines and marks, cream-colored paper, card, medium-quality white paper, low-quality white paper, simili paper, white-colored paper, Kent paper, white art paper, medium-quality colored paper, low-quality colored paper, newspaper and magazine. Specific examples thereof include used paperboards and used papers of the following papers: printer papers such as uncoated computer paper, thermosensitive paper and pressure-sensitive paper that are related to information; OA (office automation) related papers such as paper for PPC (plain paper copier); coated papers such as art paper, coated paper, finely coated paper and matte paper; and uncoated papers such as high-quality paper, high color quality paper, notebook, letter paper, packing paper, fancy paper, medium-quality paper, newspaper, woody paper, super wrapping paper, simili paper, pure white roll paper and milk carton. More specific examples thereof include chemical pulp paper and high-yield pulp-containing paper. Each of these may be used alone or in combination.

The recycled pulp is generally produced by a combination of the following four steps.

(1) Defibration: used paper is treated with mechanical force and chemicals using a pulper and thusly fiberized, and printing ink is separated from the fiber.
(2) Dust removal: foreign matter (plastic, etc.) and dust contained in the used paper is removed by a screen, a cleaner or the like.
(3) Ink removal: the printing ink that has been separated from the fiber using a surfactant is removed from the system by a flotation method or washing method.
(4) Bleaching: the whiteness of the fiber is enhanced utilizing oxidation or reduction.

When the recycled pulp is mixed with other pulp, it is desirable that the mixture ratio of the recycled pulp in the whole pulp be 40% or less so as to prevent curl after recording.

For an internally added filler used in the support, a conventionally known pigment as a white pigment is used, for instance. Examples of the white pigment include white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate and magnesium hydroxide; and organic pigments such as styrene-based plastic pigments, acrylic plastic pigments, polyethylene, microcapsules, urea resins and melamine resins. Each of these may be used alone or in combination.

Examples of an internally added sizing agent used in producing the support include neutral rosin sizing agents used in neutral papermaking, alkenyl succinic anhydrides (ASA), alkyl ketene dimers (AKD) and petroleum resin sizing agents. Among these, neutral rosin sizing agents and alkenyl succinic anhydrides are particularly suitable. Although any of the alkyl ketene dimers only needs to be added in small amounts due to its strong sizing effect, it may be unfavorable in terms of conveyance at the time of ink-jet recording because the friction coefficient of a recording paper (medium) surface decreases and the surface easily becomes slippery.

—Coating Layer—

The coating layer includes a pigment and a binder, and further includes a surfactant and other components in accordance with the necessity.

For the pigment, an inorganic pigment or a combination of an inorganic pigment and an organic pigment can be used.

Examples of the inorganic pigment include kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorites. Among these, kaolin is particularly preferable in that it is superior in gloss developing property and makes it possible to yield a texture which approximates that of paper for offset printing.

Examples of the kaolin include delaminated kaolin, calcined kaolin, and engineered kaolin produced by surface modification or the like. In view of gloss developing property, it is desirable that 50% by mass or more of the whole kaolin be occupied by kaolin having a particle size distribution in which 80% by mass or more of the particles are 2 μm or less in diameter.

The amount of the kaolin added is preferably 50 parts by mass or more based on 100 parts by mass of the binder. When the amount is less than 50 parts by mass, sufficient effectiveness may not be obtained with respect to glossiness. Although the maximum value of the amount is not particularly limited, it is desirable in terms of coating suitability that the amount be 90 parts by mass or less, in view of the kaolin's fluidity, especially thickening properties in the presence of high shearing force.

Examples of the organic pigment include water-soluble dispersions containing styrene-acrylic copolymer particles, styrene-butadiene copolymer particles, polystyrene particles, polyethylene particles, etc. Each of these organic pigments may be used in combination.

The amount of the organic pigment added is preferably 2 parts by mass to 20 parts by mass based on 100 parts by mass of the whole pigment of the coating layer. The organic pigment is superior in gloss developing property and smaller in specific gravity than an inorganic pigment, thereby making it possible to obtain a coating layer which is bulky, highly glossy and excellent in surface coating property. When the amount is less than 2 parts by mass, such effects cannot be obtained. When it is greater than 20 parts by mass, the fluidity of a coating solution degrades, which leads to decrease in coating operationality and which is economically unfavorable as well.

Examples of the form of the organic pigment include dense type, hollow type and doughnut type. However, in light of a balance among the gloss developing property, the surface coating property, and the fluidity of the coating solution, it is desirable that the average particle diameter be 0.2 μm to 3.0 μm, and it is further desirable to employ a hollow type with a void ratio of 40% or more.

For the binder, an aqueous resin is preferably used.

For the aqueous resin, at least either a water-soluble resin or a water-dispersible resin can be suitably used. The water-soluble resin is not particularly limited and may be suitably selected in accordance with the intended use. Examples thereof include polyvinyl alcohol and modified products of polyvinyl alcohol such as anion-modified polyvinyl alcohol, cation-modified polyvinyl alcohol and acetal-modified polyvinyl alcohol; polyurethane; polyvinylpyrrolidone and modified products of polyvinylpyrrolidone such as copolymers of polyvinylpyrrolidone and vinyl acetate, copolymers of vinylpyrrolidone and dimethylaminoethyl methacrylate, copolymers of quaternized vinylpyrrolidone and dimethylaminoethyl methacrylate and copolymers of vinylpyrrolidone and methacrylamide propyl trimethyl ammonium chloride; celluloses such as carboxymethyl cellulose, hydroxyethyl cellulose and hydroxypropyl cellulose; modified products of cellulose such as cationated hydroxyethyl cellulose; synthetic resins such as polyester, polyacrylic acid (ester), melamine resins, modified products thereof, and copolymers of polyester and polyurethane; and poly(meth) acrylic acid, poly(meth)acrylamide, oxidized starch, phosphoric acid-esterified starch, self-modifying starch, cationated starch, various types of modified starch, polyethylene oxide, sodium polyacrylate and sodium alginate. Each of these may be used alone or in combination.

Among these, polyvinyl alcohol, cation-modified polyvinyl alcohol, acetal-modified polyvinyl alcohol, polyester, polyurethane, copolymers of polyester and polyurethane, and the like are particularly preferable in terms of ink absorption.

The water-dispersible resin is not particularly limited and may be suitably selected in accordance with the intended use. Examples thereof include polyvinyl acetate, ethylene-vinyl acetate copolymers, polystyrene, styrene-(meth)acrylic acid ester copolymers, (meth)acrylic acid ester polymers, vinyl acetate-(meth)acrylic acid (ester) copolymers, styrene-butadiene copolymers, ethylene-propylene copolymers, polyvinyl ethers and silicone-acrylic copolymers. Also, the water-dispersible resin may contain a crosslinking agent such as methylolated melamine, methylolated urea, methylolated hydroxypropylene urea or isocyanate or may be a copolymer with self-crosslinking ability that includes N-methylolacrylamide or other unit. A plurality of these aqueous resins can be used at the same time.

The amount of the aqueous resin added is preferably 2 parts by mass to 100 parts by mass, more preferably 3 parts by mass to 50 parts by mass, based on 100 parts by mass of the pigment. The amount of the aqueous resin added is determined such that the liquid absorption properties of the recording medium are within a desired range.

When a water-dispersible colorant is used as the colorant, a cationic organic compound is not necessarily required, and a cationic organic compound is not particularly limited and may be suitably selected in accordance with the intended use. Examples thereof include monomers, oligomers and polymers of primary to tertiary amines that form insoluble salts by reacting with functional groups such as sulfonic acid group, carboxyl group and amino group in direct dye or acid dye present in water-soluble ink; and monomers, oligomers and polymers of quaternary ammonium salts. Among these, oligomers and polymers are preferable.

Examples of the cationic organic compound include dimethylamine-epichlorhydrin polycondensates, dimethylamine-ammonia-epichlorhydrin condensates, poly(trimethylaminoethyl methacrylate-methylsulfate), diallylamine hydrochloride-acrylamide copolymers, poly(diallylamine hydrochloride-sulfur dioxide), polyallylamine hydrochloride, poly(allylamine hydrochloride-diallylamine hydrochloride), acrylamide-diallylamine copolymers, polyvinylamine copolymers, dicyandiamide, dicyandiamide-ammonium chloride-urea-formaldehyde condensates, polyalkylene polyamine-dicyandiamide ammonium salt condensates, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivatives), acrylamide-diallyldimethylammonium chloride copolymers, acrylate-acrylamide-diallylamine hydrochloride copolymers, polyethylenimine, ethylenimine derivatives such as acrylamine polymers, and modified products of polyethylenimine alkylene oxides. Each of these may be used alone or in combination.

Among these, any one of low-molecular cationic organic compounds such as dimethylamine-epichlorhydrin polycondensates and polyallylamine hydrochloride and any one of relatively high-molecular cationic organic compounds such as poly(diallyldimethylammonium chloride) are preferably combined together. The combination makes it possible to increase image density more than in the case of independent use and further reduce feathering.

The cation equivalent of the cationic organic compound measured in accordance with a colloid titration method (using potassium polyvinyl sulfate and toluidine blue) is preferably 3 meq/g to 8 meq/g. When the cation equivalent is in this range, a favorable result can be obtained with respect to the range of the amount of the cationic organic compound dried and attached.

Here, in the measurement of the cation equivalent in accordance with the colloid titration method, the cationic organic compound is diluted with distilled water such that the solid content stands at 0.1% by mass, and pH adjustment is not made.

The amount of the cationic organic compound dried and attached is preferably 0.3 g/m$^2$ to 2.0 g/m$^2$. When the amount of the cationic organic compound dried and attached is less than 0.3 g/m², such effects as sufficient increase in image density and reduction in feathering may not be obtained.

The surfactant is not particularly limited and may be suitably selected in accordance with the intended use, and any one of an anionic surfactant, a cationic surfactant, an amphoteric surfactant and a nonionic surfactant can be used therefor. Among these, a nonionic surfactant is particularly preferable. By addition of the surfactant, the water resistance of images improves, image density increases, and bleeding can be reduced.

Examples of the nonionic surfactant include higher alcohol ethylene oxide adducts, alkylphenol ethylene oxide adducts, fatty acid ethylene oxide adducts, polyhydric alcohol fatty acid ester ethylene oxide adducts, higher aliphatic amine ethylene oxide adducts, fatty acid amide ethylene oxide adducts, ethylene oxide adducts of fats, polypropylene glycol ethylene oxide adducts, fatty acid esters of glycerol, fatty acid esters of pentaerythritol, fatty acid esters of sorbitol and sorbitan, fatty acid esters of sucrose, alkyl ethers of polyhydric alcohols, and fatty acid amides of alkanolamines. Each of these may be used alone or in combination.

The polyhydric alcohols are not particularly limited and may be suitably selected in accordance with the intended use. Examples thereof include glycerol, trimethylolpropane, pentaerythrite, sorbitol and sucrose. As to the ethylene oxide adducts, ones in which an alkylene oxide, for example propylene oxide or butylene oxide, is substituted for part of ethylene oxide to such an extent that their water solubility can be maintained are also effective. The substitution ratio is preferably 50% or less. The HLB (hydrophile-lipophile balance) of the nonionic surfactant is preferably 4 to 15, more preferably 7 to 13.

The amount of the surfactant added is preferably 0 parts by mass to 10 parts by mass, more preferably 0.1 parts by mass to 1.0 part by mass, based on 100 parts by mass of the cationic organic compound.

Further, other components may be added to the coating layer in accordance with the necessity, to such an extent that the object and effects of the present invention are not impaired. Examples of the other components include additives such as alumina powder, a pH adjuster, an antiseptic agent and an antioxidant.

The method for forming the coating layer is not particularly limited and may be suitably selected in accordance with the intended use. For instance, a method in which the support is impregnated or coated with a coating layer solution can be employed. The method of impregnating or coating the support with the coating layer solution is not particularly limited and may be suitably selected in accordance with the intended use. For instance, the impregnation or the coating can be carried out using a coating machine such as a conventional size press, gate roll size press, film transfer size press, blade coater, rod coater, air knife coater, curtain coater or the like. Among these, in view of cost, the support is preferably impregnated or coated with the coating layer solution using a conventional size press, gate roll size press, film transfer size press, etc. installed in a papermaking machine, and finished using an on-machine coater.

The amount of the coating layer solution applied is not particularly limited and may be suitably selected in accordance with the intended use. It is preferably 0.5 g/m² to 20 g/m², more preferably 1 g/m² to 15 g/m², as a solid content.

If necessary, the coating layer solution may be dried after the impregnation or the coating, in which case the drying temperature is not particularly limited and may be suitably selected in accordance with the intended use, however, the range of approximately 100° C. to 250° C. is preferable.

The recording medium may further include a back layer formed on the back surface of the support, and other layers formed between the support and the coating layer and between the support and the back layer. It is also possible to provide a protective layer on the coating layer. Each of these layers may be composed of a single layer or a plurality of layers.

Commercially available coated paper for offset printing, commercially available coated paper for gravure printing, or the like may be used for the recording medium, besides media for ink-jet recording, provided that its liquid absorption properties are within the above-mentioned ranges of the present invention.

(Ink Recorded Matter)

An ink recorded matter on which an image, information or data is recorded by means of the inkjet recording apparatus and the inkjet recording method of the present invention is an ink recorded matter of the present invention. The ink recorded matter has an image that has been formed on a recording medium using the recording ink of the present invention.

The recording medium is not particularly limited and may be suitably selected in accordance with the intended use. Examples thereof include regular paper, coated paper for printing, glossy paper, specific paper, fabrics, films, and OHP sheets. These may be used alone or in combination. Among these recording media, at least any one of regular paper and coated paper for printing is preferable.

Regular papers are advantageous in their inexpensiveness. Coat papers for printing are advantageous in that they are relatively inexpensive as compared to glossy papers and can give a smooth and glossy image, but the drying property thereof is poor and it has been difficult to use with a commonly used ink. However, the drying property of coated paper has become able to improve by using the recording ink of the present invention.

The coated papers for printing are recording media each of which has a support and a coating layer applied onto at least one surface of the support, in which the amount of pure water transferred to the recording medium for a contact period of 100 ms measured by a dynamic scanning absorptometer is 2 mL/m² to 35 mL/m², and the amount of pure water transferred to the recording medium for a contact period of 400 ms is 3 mL/m² to 40 mL/m². These transfer amounts are low as compared to those of commercially available conventional inkjet papers. In other words, the liquid absorbability of the coated paper for printing is lower than those of the conventional inkjet papers.

Of these coated papers for printing, it is particularly effective to use the recording ink of the present invention on a recording medium which has a relatively high liquid absorbability. Specifically, the amount of pure water transferred to the recording medium for a contact period of 100 ms measured by a dynamic scanning absorptometer is 7 mL/m² to 20 mL/m², and the amount of pure water transferred to the recording medium for a contact period of 400 ms is 9 mL/m² to 30 mL/m².

When the transfer amount of a liquid for a contact period of 100 ms is lower than the above noted range, ink beading is likely to occur, and when the transfer amount is higher than the above noted range, the ink dot diameter after recorded may become too smaller than the desired dot diameter. The transfer amount of liquid for a contact period of 400 ms is lower than the above noted range, spur trace is likely to occur due to insufficient drying property, and the glossiness of image portions that have been dried is liable to degrade. Note that these phenomena relates to the drying time, and the recording ink of the present invention in which the amount of the liquid component having a high boiling point is within an appropriate range can exhibit an effect in improving the drying property to some extent even when recorded on paper of which the transfer amount of a liquid is lower than the above noted range. These papers having low liquid absorbability are commercially available as coated paper for gravure printing.

The ink, recorded matters have high image quality, cause less ink bleeding, are excellent in stability with time, and can be suitably used for various applications, as documents with various printed letters (characters) or images recorded on their surfaces thereof.

EXAMPLES

Hereinafter, the present invention will be further described in detail referring to specific Examples, however, the present invention is not limited to the disclosed Examples. On the contrary, the present invention is intended to cover various modifications and equivalent arrangements included within the spirit and scope of the appended claims.

Production Example 1

—Preparation of Polymer Solution A—

The inside atmosphere of a 1 L flask equipped with a mechanical stirrer, a thermometer, a nitrogen gas inlet tube, a reflux tube, and a dropping funnel was sufficiently substituted with a nitrogen gas. Thereafter, 11.2 g of styrene, 2.8 g of acrylic acid, 12.0 g of lauryl methacrylate, 4.0 g of polyethylene glycol methacrylate, 4.0 g of a styrene macromer (product name: AS-6, produced by TOAGOSEI CO., LTD.), 0.4 g of mercapto ethanol were added to the flask, mixed and then the temperature of the mixture was raised to 65° C.

Next, a mixed solution of 100.8 g of styrene, 25.2 g of acrylic acid, 108.0 g of lauryl methacrylate, 36.0 g of polyethylene glycol methacrylate, 60.0 g of hydroxylethyl methacrylate, 36.0 g of a styrene macromer (product name: AS-6, produced by TOAGOSEI CO., LTD.), 3.6 g of mercapto ethanol, 2.4 g of azobis-methylvaleronitrile, and 18 g of methylethylketone was delivered by drops into the flask in 2.5 hours. After the dropping, a mixed solution of 0.8 g of azobis-methyl valeronitrile and 18 g of methylethylketone was delivered by drops into the flask in 0.5 hours. The mixture in the flask was aged at 65° C. for 1 hour, and then 0.8 g of azobis-methyl valeronitrile was added thereto, and the mixture was further aged for 1 hour. Upon completion of the reaction, 364 g of methylethylketone was added to the flask, thereby preparing 800 g of a polymer solution A with a concentration of 50% by mass.

Production Example 1-1

—Production of Copper Phthalocyanine Pigment-containing Polymer Fine Particle Dispersion—

Next, 46 g of the thus obtained polymer solution A, 33 g of a copper phthalocyanine pigment, 13.6 g of 1 mol/L potassium hydroxide, 20 g of methylethylketone, and 13.6 g of ion exchange water were sufficiently stirred and then kneaded using a roll mill to thereby obtain a paste. The obtained paste was placed in 200 g of pure water, sufficiently stirred, and then methylethylketone and water contained therein were distilled away by the use of an evaporator. Thereafter, glycerine was added to the reaction product, thereby producing a copper phthalocyanine pigment-containing polymer fine particle dispersion of Production Example 1-1 containing 10.9% by mass of pigment, 7.5% by mass of resin (solid content 18.4% by mass) and 9.1% by mass of glycerine.

Production Example 1-2

—Production of Aqueous Dispersion of Magenta Pigment Polymer Fine Particles—

An aqueous dispersion of magenta pigment polymer fine particles of Production Example 1-2 was produced in a manner similar to the process of Production Example 1-1, except that C.I. Pigment Red 122 was used in place of the copper phthalocyanine pigment. The aqueous dispersion of magenta pigment polymer fine particles of Production Example 1-2 contained 13.6% by mass of pigment, 4.5% by mass of resin (solid content: 18.1% by mass), and 9.1% by mass of glycerine.

Production Example 1-3

—Production of Aqueous Dispersion of Yellow Pigment Polymer Fine Particles—

An aqueous dispersion of yellow pigment polymer fine particles of Production Example 1-3 was produced in a manner similar to the process of Production Example 1-1, except that C.I. Pigment Yellow 74 was used in place of the copper phthalocyanine pigment. The aqueous dispersion of yellow pigment polymer fine particles of Production Example 1-3 contained 10.9% by mass of pigment, 7.5% by mass of resin (solid content: 18.4% by mass), and 9.1% by mass of glycerine.

Production Example 2

—Preparation of Surface Treated Black Pigment Dispersion Liquid—

Ninety grams of a carbon black having a CTAB specific surface area of 150 m$^2$/g, a DBP oil absorption of 100 mL/100 g was added to 3,000 mL of 2.5 N sodium sulfate, and the components were oxidatively-treated by stirring at 60° C. and 300 rpm for 10 hours so as to react each other. The reaction liquid was filtered, the filtered-out carbon black was neutralized with a sodium hydroxide solution and then subjected to ultrafiltration. The obtained carbon black was washed with water, dried, and then dispersed in pure water so as to contain 20% by mass of pigment (solid content: 20% by mass), thereby producing a surface treated black pigment dispersion liquid of Production Example 2.

Production Example 3

—Preparation of Acrylic Silicone Fine Particle Dispersion B—

The inside atmosphere of a 1 L flask equipped with a mechanical stirrer, a thermometer, a nitrogen gas inlet tube, a reflux tube, and a dropping funnel was sufficiently substituted with a nitrogen gas. Thereafter, 8.0 g of LATEMUL S-180 (reactive emulsifier having unsaturated carbon atoms, produced by Kao Corporation), and 350 g of ion exchange water were added to the flask, mixed, and then the temperature of the mixture was raised to 65° C. After raising the temperature, 3.0 g of t-butylperoxobenzoate serving as a reaction initiator, and 1.0 g of sodium isoascorbate were added thereto, and five minutes later, 45 g of methyl methacrylate, 160 g of ethylhexyl methacrylate, 5 g of acrylic acid, 45 g of butyl methacrylate, 30 g of cyclohexyl methacrylate, 15 g of vinyltriethoxysilane, 8.0 g of LATEMUL S-180 (reactive emulsifier having unsaturated carbon atoms, produced by Kao Corporation), and 340 g of ion exchange water were mixed. Then the mixture was delivered by drops into the flask in 3 hours. Thereafter, the mixture was heated and aged at 80° C. for 2 hours, then cooled to normal temperature, and the pH of the reaction product was adjusted with sodium hydroxide to 7 to 8. The ethanol contained therein was distilled away by the use of an evaporator, and the moisture content was adjusted, thereby producing 730 g of an acrylic silicone fine particle dispersion B solution of Production Example 3, which had a solid content of 40% by mass.

Example 1

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-contianing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 11.17% by mass |
| 1,3 butanediol as a wetting agent | 13.95% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 30.90% by mass. These constituents correspond to a liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to a solid component being solid in ink at 25° C. Thus, a ratio (C/B) of the total amount of the liquid component (C) contained in the recording ink to the total amount of the solid component (B) contained in the recording ink was 30.90/11.62, i.e. 2.66.

Further, a ratio (A/B) of the total amount of the water-soluble organic solvent having a high boiling point of 280° C. or higher (A) (in this Example, glycerine) in the liquid component to the total amount of the solid component (B) was (11.17+2.78)/11.62, i.e. 1.20.

Note that the resin component used herein includes the resin used from the copper phthalocyanine pigment-containing polymer fine particle dispersion, and the same applies to the following Examples and Comparative Examples.

Example 2

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 11.17% by mass |
| 1,3 butanediol as a wetting agent | 9.78% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 26.73% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 2.30.

Further, a ratio (A/B) of the total amount of the water-soluble organic solvent having a high boiling point of 280° C. or higher (A) (in this Example, glycerine) in the liquid component to the total amount of the solid component (B) was 1.20.

Example 3

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 13.49% by mass |
| 1,3 butanediol as a wetting agent | 7.46% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 26.73% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 2.30.

Further, a ratio (A/B) of the total amount of the water-soluble organic solvent having a high boiling point of 280° C. or higher (A) (in this Example, glycerine) in the liquid component to the total amount of the solid component (B) was 1.40.

Example 4

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 26.27% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine which was used as a wetting agent being liquid at normal temperature (25° C.), 2-ethyl-1,3-hexanediol used as a penetrant being liquid at normal temperature (25° C.) and the surfactant contained was 32.05% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 2.76.

Further, a ratio (A/B) of the total amount of the water-soluble organic solvent having a high boiling point of 280° C. or higher (A) (in this Example, glycerine) in the liquid component to the total amount of the solid component (B) was 2.50.

Example 5

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |

| | |
|---|---|
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 10.00% by mass |
| 1,3 butanediol as a wetting agent | 10.95% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 26.73% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 2.30.

Further, a ratio (A/B) of the total amount of the water-soluble organic solvent having a high boiling point of 280° C. or higher (A) (in this Example, glycerine) in the liquid component to the total amount of the solid component (B) was 1.10.

Example 6

—Production of Recording Ink—

An ink composition having the following formulation was prepared. After the pH of the composition was adjusted, the composition was filtered through a membrane filter having an average pore diameter of 5 μm, thereby producing a recording ink.
<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 29.20% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 8% by mass |
| glycerine as a wetting agent | 7.62% by mass |
| 1,3 butanediol as a wetting agent | 6.43% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 19.71% by mass. These constituents correspond to the liquid component having a boiling point higher than that of water and being liquid in ink.

The amount of a colorant being solid at normal temperature (25° C.) contained in the ink composition was 3.18% by mass.

The total amount of the resin component composed of a resin used from the copper phthalocyanine pigment-containing polymer fine particle dispersion and a resin used from the acrylic silicone emulsion, contained in the ink composition was 5.39% by mass. Thus, the total amount of the colorant and the resin component contained in the ink composition was 8.57%. These constituents correspond to the solid component being solid in ink at 25° C. Thus, a ratio (C/B) of the total amount of the liquid component (C) contained in the recording ink to the total amount of the solid component (B) contained in the recording ink was 2.30.

Further, a ratio (A/B) of the total amount of the water-soluble organic solvent having a high boiling point of 280° C. or higher (A) (in this Example, glycerine) in the liquid component to the total amount of the solid component (B) was 1.20.

Example 7

—Production of Recording Ink—

An ink composition having the following formulation was prepared. After the pH of the composition was adjusted, the composition was filtered through a membrane filter having an average pore diameter of 5 μm, thereby producing a recording ink.
<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 11.17% by mass |
| 1,3 butanediol as a wetting agent | 4.55% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |

| | |
|---|---|
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 21.50% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 1.85.

Further, a ratio (A/B) of the total amount of the water-soluble organic solvent having a high boiling point of 280° C. or higher (A) (in this Example, glycerine) in the liquid component to the total amount of the solid component (B) was 1.20.

Example 8

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 11.17% by mass |
| 1,3 butanediol as a wetting agent | 19.07% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 36.02% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 3.10.

Further, a ratio (A/B) of the total amount of the water-soluble organic solvent having a high boiling point of 280° C. or higher (A) (in this Example, glycerine) in the liquid component to the total amount of the solid component (B) was 1.20.

Comparative Example 1

—Production of Recording Ink—

An ink composition having the following formulation was prepared. After the pH of the composition was adjusted, the composition was filtered through a membrane filter having an average pore diameter of 5 thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 29.76% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine which was used as a wetting agent being liquid at normal temperature (25° C.), 2-ethyl-1,3-hexanediol used as a penetrant being liquid at normal temperature (25° C.) and the surfactant contained was 35.54% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 2.80.

Further, a ratio (A/B) of the total amount of the water-soluble organic solvent having a high boiling point of 280° C. or higher (A) (in this Example, glycerine) in the liquid component to the total amount of the solid component (B) was 3.06.

Comparative Example 2

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 4.77% by mass |
| 1,3 butanediol as a wetting agent | 16.18% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 26.73% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 2.30.

Further, a ratio (A/B) of the total amount of the water-soluble organic solvent having a high boiling point of 280° C. or higher (A) (in this Example, glycerine) in the liquid component to the total amount of the solid component (B) was 0.65.

Comparative Example 3

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 10.00% by mass |
| 1,3 butanediol as a wetting agent | 21.40% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 37.18% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 3.20.

Further, a ratio (A/B) of the total amount of the water-soluble organic solvent having a high boiling point of 280° C. or higher (A) (in this Example, glycerine) in the liquid component to the total amount of the solid component (B) was 1.10.

Comparative Example 4

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 28.00% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 5% by mass |
| glycerine as a wetting agent | 6.03% by mass |
| 1,3 butanediol as a wetting agent | 6.43% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 18.01% by mass. These constituents correspond to the liquid component having a boiling point higher than that of water and being liquid in ink.

The amount of a colorant being solid at normal temperature (25° C.) contained in the ink composition was 3.05% by mass.

The total amount of the resin component composed of a resin used from the copper phthalocyanine pigment-containing polymer fine particle dispersion and a resin used from the to acrylic silicone emulsion, contained in the ink composition was 4.10% by mass. Thus, the total amount of the colorant and the resin component contained in the ink composition was 7.15%. These constituents correspond to the solid component being solid in ink at 25° C. Thus, a ratio (C/B) of the total amount of the liquid component (C) contained in the recording ink to the total amount of the solid component (B) contained in the recording ink was 2.52.

Further, a ratio (A/B) of the total amount of the water-soluble organic solvent having a high boiling point of 280° C. or higher (A) (in this Example, glycerine) in the liquid component to the total amount of the solid component (B) was 1.20.

Comparative Example 5

—Production of Recording Ink—

An ink composition having the following formulation was prepared. After the pH of the composition was adjusted, the composition was filtered through a membrane filter having an average pore diameter of 5 μm, thereby producing a recording ink.

<Ink Composition>

| | |
|---|---|
| copper phthalocyanine pigment-containing polymer fine particle dispersion of Production Example 1-1 [pigment: 10.9% by mass, resin: 7.5% by mass (solid content: 18.4% by mass), glycerine: 9.1% by mass, and rest of the content thereof: water] | 30.55% by mass |
| acrylic silicone emulsion of Production Example 3 [solid content: 40% by mass, rest of the content thereof: water; volume average particle diameter: 150 nm, glass transition temperature of resin component: −15° C. (initial rise of differential thermal) −6° C. (inflexion point)] | 15% by mass |
| glycerine as a wetting agent | 11.17% by mass |
| 1,3 butanediol as a wetting agent | 3.39% by mass |
| 2-ethyl-1,3-hexanediol as a penetrant | 2% by mass |
| fluorochemical surfactant (FS-300, produced by DuPont Co., effective ingredient: 40% by mass) | 2.5% by mass |
| antiseptic/antifungal agent (PROXEL LV (produced by Avecia) | 0.05% by mass |
| pH adjuster (triethanol amine) | 0.3% by mass |
| silicone emulsion antifoaming agent (KM-72F, produced by Shin-Etsu Chemical Co., Ltd.) | 0.1% by mass |
| water | rest of the amount of the composition |

In the above ink composition, the total amount of glycerine and 1,3 butanediol each of which was used as a wetting agent being liquid at normal temperature (25° C.), 2-ethyl-1,3-hexanediol used as a penetrant being liquid at normal temperature (25° C.) and the surfactant contained was 20.34% by mass. These constituents correspond to the liquid component having a boiling point higher than that of water and being liquid in ink.

The amount of a colorant being solid at normal temperature (25° C.) contained in the ink composition was 3.33% by mass.

The total amount of the resin component composed of a resin used from the copper phthalocyanine pigment-containing polymer fine particle dispersion and a resin used from the acrylic silicone emulsion, contained in the ink composition was 8.29% by mass. Thus, the total amount of the colorant and the resin component contained in the ink composition was 11.62%. These constituents correspond to the solid component being solid in ink at 25° C. Thus, a ratio (C/B) of the total amount of the liquid component (C) contained in the recording ink to the total amount of the solid component (B) contained in the recording ink was 1.75.

Further, a ratio (A/B) of the total amount of the water-soluble organic solvent having a high boiling point of 280° C. or higher (A) (in this Example, glycerine) in the liquid component to the total amount of the solid component (B) was 1.20.

Next, the surface tension, pH and viscosity of the recording inks obtained in each of Examples 1 to 8 and Comparative Examples 1 to 5 were measured as described below. Table 3 shows the measurement results.

<Measurement of pH>

The pH of each of the recording inks was measured at 23° C. by means of a pH meter (Model HM3A, manufactured by To a Denpa Kogyo K.K.).

<Measurement of Viscosity>

The viscosity of each of the recording inks was measured using a viscometer (Model RE500, manufactured by TOKI SANGYO CO., LTD.) using a cone 34×R24, at 180 rpm, at the timing of 3 minutes later of the start of the measurement, at a temperature of 25° C.

<Measurement of Surface Tension>

The surface tension of each of the recording inks is a static surface tension measured by a surface tension measuring device (CBVP-Z, manufactured by Kyowa Interface Science Co., Ltd.), with the use of a platinum plate at a temperature of 25° C.

TABLE 3

|  | Viscosity (mP · s) | Surface tension (mN/m) | pH |
|---|---|---|---|
| Ex. 1 | 4.95 | 24.5 | 9.64 |
| Ex. 2 | 4.83 | 24.6 | 9.66 |
| Ex. 3 | 4.85 | 24.8 | 9.62 |
| Ex. 4 | 4.98 | 25.0 | 9.54 |
| Ex. 5 | 4.62 | 24.3 | 9.65 |
| Ex. 6 | 4.25 | 24.6 | 9.54 |
| Ex. 7 | 4.42 | 24.4 | 9.68 |
| Ex. 8 | 8.06 | 24.5 | 9.58 |
| Compara. Ex. 1 | 7.96 | 25.2 | 9.63 |
| Compara. Ex. 2 | 4.78 | 24.5 | 9.75 |
| Compara. Ex. 3 | 8.23 | 24.4 | 9.60 |
| Compara. Ex. 4 | 4.15 | 24.2 | 9.62 |
| Compara. Ex. 5 | 4.30 | 24.4 | 9.69 |

Next, an inkjet printing test was carried out according to the following manner using each of the recording inks of Examples 1 to 8 and Comparative Examples 1 to 5.

<Inkjet Printing Test>

Each of the recording inks obtained was jet-printed using an inkjet printer (GX5000, manufactured by Ricoh Company Ltd.). On a nozzle plate surface of the inkjet printer, a silicone resin film (room temperature-curable silicone resin, SR2411, produced by DOW CORNING TORAY SILICONE CO., LTD.) was provided, the thickness of the resin film was 1.2 μm, the surface roughness (Ra) was 0.18 μm, and the critical surface tension was 21.6 mN/m. The inkjet printing was carried out at a temperature of 23° C., a relative humidity of 50%, with the use of high-grade regular paper/fine mode. The drive waveform of an inkjet head was adjusted so that the amount of each ink ejected became constant.

As a recording medium, the after-mentioned coated paper for gravure printing was used. The amount of pure water transferred to the paper for gravure printing (to the recording medium) measured by a dynamic scanning absorptometer for a contact time of 100 ms was 8.5 mL/m$^2$, and the amount of pure water transferred to the recording medium measured by a dynamic scanning absorptometer for a contact time of 400 ms was 14.8 mL/m$^2$. The transfer amount of pure water was measured at 23° C. and 50% RH.

<Production of Coated Paper for Gravure Printing>

Hydroxyether derived from potato starch (SOLVICOTE 100, produced by Avebe Inc.) was gelatinized to prepare a starch solution with a concentration of 13%, and a no-sized, acid-free pressed paper having a basis weight of 76 g/m$^2$ and an ash content of 13% was coated with the starch solution of 60° C. on both sides thereof using a transfer-type roll coater so that the amount of the solid content adhered was 0.3 g/m$^2$.

This size-pressed paper was dried, followed by a super-calender treatment in which the front surface and back surface of the size-pressed paper were coated with a coating solution by means of a blade coater to form a coat layer so that the dried solid content for each of the coat layers was 12 g/m$^2$. The coating solution was prepared so that 2 parts of starch (MS-4600, produced by Nihon Shokuhin Kako Co., Ltd.) and 7 parts of a latex (L-1457, produced by Asahi Kasei. Corporation) with 100 parts of a pigment.

Subsequently, beading, image drying property, ejection stability in inkjet printing test, and inkjet printing test results after long-time stoppage of printing operation of each of obtained image prints were evaluated in accordance with the following manner. Table 4 shows the evaluation results.

<Evaluation of Beading>

The presence or absence of beading in a cyan or green-color solid image portion was visually observed and evaluated based on the following criteria.

[Evaluation Criteria]

A: No beading occurred, and thus a uniform print was obtained.

B: A slight tendency of beading was observed.

C: The occurrence of beading was clearly observed.

D: The occurrence of beading in a considerable amount of beading was observed.

E: The occurrence of beading in a substantial amount was observed.

<Evaluation of Image Drying Property>

A cyan-color solid image of 12 cm square was printed, and 10 seconds later, a filter paper was applied to the solid image portion, and the amount of the cyan ink transferred to the filter paper was evaluated based on the following levels of the drying property.

[Level of Drying Property]

Level 1 . . . A large amount of the ink was transferred to a filter paper.

Level 2 . . . A relatively large amount of the ink was transferred to a filter paper.

Level 3 . . . A small amount of the ink was transferred to a filter paper.

Level 4 . . . A slightly amount of the ink was transferred to a filter paper when observed closely.

Level 5 . . . The ink was not transferred at all to a filter paper.

<Evaluation of Ejection Stability (Intermittent Ejection Stability) in Inkjet Printing Test (Evaluation of Short-term Reliability)>

Under the environment of a temperature of 25° C. and a relative humidity of 20%, each of the recording inks of Examples and Comparative Examples was set at an inkjet printer (GX5000, manufactured by Ricoh Company Ltd.) and then the intermittent ejection stability of each of the inks was evaluated. Firstly, a nozzle check pattern was recorded, and it was confirmed that no nozzle clogging was caused. Then, an idle scanning operation of the carriage was executed without ejecting the ink for 30 seconds. After that, the ink was dropped and printed on an inkjet matte coated paper while jetting 20 droplets of the ink from each of all nozzles, and then a recovery operation was carried out (purged 50 droplets). A series of the above operations was repeated 10 times, thereby evaluating the ejection stability of each of the recording inks. Enlarged photographs of dots formed by 20 droplets, in particular, a dot formed by a first droplet dropped, were taken during printing. The obtained photographs were visually observed, and the jetting state (presence or absence of ejected ink, inkjet direction) was evaluated based on the following criteria.

[Criteria for Judgment in Evaluation of Inkjet Direction of Dot Formed by First Droplet]

A . . . There was no change in the orbit of the ejected ink and nozzles were arranged in a row.

B . . . The orbit of the ejected ink slightly changed, and a dot formed by a first droplet did not overlap a dot formed by a secondarily dropped droplet.

C . . . A dot formed by a first droplet crossed the line of a dot formed by a secondarily dropped droplet.

D . . . . No ejected ink was found.

<Inkjet Printing Test after Stoppage of Long-term Printing Operation (Evaluation of Nozzle Clogging)>

Under the environment of a temperature of 25° C. and a relative humidity of 20%, each of the recording inks of Examples and Comparative Examples was set at an inkjet printer (GX5000, manufactured by Ricoh Company Ltd.) and it, was confirmed that no nozzle clogging was caused. Thereafter, the inkjet recording head was uncapped by pulling down a cap unit (in a state where nozzles were likely to dry, acceleration test), and then the nozzles were left intact for 24 hours. Thereafter, a nozzle check pattern was recorded, and the extent of nozzle clogging was determined and evaluated based on the following criteria.

[Evaluation Criteria]

A: There was no nozzle clogging (non-ejection of ink) observed.

B: Nozzle clogging was observed in one nozzle to less than 10 nozzles.

C: Nozzle clogging was observed in ten nozzles to less than 30 nozzles.

D: Nozzle clogging was observed in 30 nozzles to less than 100 nozzles.

E: Nozzle clogging was observed in 100 or more nozzles.

also made it possible to obtain printed images having image sharpness and quality close to those of printed matters.

Industrial Applicability

A recording ink of the present invention allows for obtaining a high quality image that is close in quality to recorded matters produced by commercial printing and printed matters, without substantially causing problems with drying time. Therefore, the recording ink can be suitably used in ink media sets, ink cartridges, ink recorded matters, inkjet recording apparatuses, and inkjet recording methods.

An inkjet recording apparatus and an inkjet recording method of the present invention can be used in various fields of recording based on inkjet recording method, and can be particularly suitably used, for example, in inkjet recording printers, facsimiles, copiers, printer/facsimile/copier complex apparatuses.

The invention claimed is:

1. A recording ink comprising:
a solid component containing a colorant and a resin, and being solid in ink at 25° C.,
a liquid component having a boiling point higher than that of water and being liquid in ink at 25° C., and
water,
wherein the total amount of the solid component contained in the recording ink is equal to 8.5% by mass or higher and less than 15% by mass, a ratio (A/B) of the total amount of a water-soluble organic solvent (A), which is contained in the liquid component and has a high-boiling point of 280° C. or higher (A), to the total amount of the solid component (B) contained in the recording ink is 1.1 to 2.5, and a ratio (C/B) of the total amount of the

TABLE 4

|  | Total amount of solid component contained (% by mass) | Ratio: A/B *1 | Ratio: C/B *2 | Beading in cyan solid image portion | Drying property of image | Ejection stability | Nozzle clogging |
|---|---|---|---|---|---|---|---|
| Ex. 1 | 11.62 | 1.20 | 2.66 | C | 3 | A | B |
| Ex. 2 | 11.62 | 1.20 | 2.30 | B | 3.5 | A | B |
| Ex. 3 | 11.62 | 1.40 | 2.30 | B | 3 | A | A |
| Ex. 4 | 11.62 | 2.50 | 2.76 | C | 3 | A | A |
| Ex. 5 | 11.62 | 1.10 | 2.30 | B | 3.5 | A | C |
| Ex. 6 | 8.57 | 1.20 | 2.30 | A | 4 | A | B |
| Ex. 7 | 11.62 | 1.20 | 1.85 | A | 5 | B | C |
| Ex. 8 | 11.62 | 1.20 | 3.10 | C | 3 | A | B |
| Compara. Ex. 1 | 11.62 | 2.80 | 3.06 | C | 2 | B | A |
| Compara. Ex. 2 | 11.62 | 0.65 | 2.30 | B | 4 | B | E |
| Compara. Ex. 3 | 11.62 | 1.20 | 3.20 | D | 2 | A | B |
| Compara. Ex. 4 | 7.15 | 1.20 | 2.52 | B | 3 | C | B |
| Compara. Ex. 5 | 11.62 | 1.20 | 1.75 | A | 5 | C | C |

*1 Ratio A/B = Organic solvent having a boiling point of 280° C. or higher (A)/Solid content (B)
*2 Ratio C/B = Liquid component (C)/Solid component (B)

When the recording ink of Comparative Example 4 was used, abrasion and cockling were observed on the filter paper surface.

The results shown in Table 4 demonstrate that the use of each of the recording inks of Examples 1 to 8 made it possible to obtain printed images hardly causing color stain (ink stain) even when grazed within one minute after being printed, without substantially causing problems with drying time, and liquid component (C) in the recording ink to the total amount of the solid component (B) in the recording ink is 1.85 to 3.10.

2. The recording ink according to claim 1, wherein the liquid component comprises a wetting agent, and the wetting agent is at least one selected from glycerine, 1,3-butanediol, 3-methyl-1,3-butanediol, 2-pyrrolidone, and N-methyl-2-pyrrolidone.

3. The recording ink according to claim 1, wherein the liquid component comprises a penetrant, and the penetrant is a polyol compound having 8 to 11 carbon atoms.

4. The recording ink according to claim 1, wherein the liquid component comprises a surfactant, and the surfactant comprises a fluorochemical surfactant.

5. The recording ink according to claim 1, wherein the resin comprises resin fine particles.

6. The recording ink according to claim 5, wherein the resin fine particles comprise an acrylic silicone resin, and the acrylic silicone resin has a glass transition temperature of 25° C. or lower.

7. The recording ink according to claim 5, wherein the resin fine particles have a volume average particle diameter of 10 nm to 1,000 nm in a resin emulsion.

8. The recording ink according to claim 1, wherein the colorant is a polymer emulsion pigment in which a water-insoluble or substantially water-insoluble coloring material is contained in polymer fine particles.

9. The recording ink according to claim 1, wherein the colorant is a pigment which has an anionic hydrophilic group on its surface.

10. The recording ink according to claim 1, having a surface tension of 35 mN/m or lower at 25° C.

11. An ink media set comprising:
a recording ink, and
a recording medium having a support and a coating layer applied onto at least one surface of the support,
wherein the amount of pure water transferred to the recording medium for a contact period of 100 ms measured by a dynamic scanning absorptometer is 2 mL/m² to 35 mL/m², and the amount of pure water transferred to the recording medium for a contact period of 400 ms is 3 mL/m² to 40 mL/m²,
wherein the recording ink comprises a solid component containing a colorant and a resin, and being solid in ink at 25° C. a liquid component having a boiling point higher than that of water, and being liquid in ink at 25° C., and water, and
wherein the total amount of the solid component contained in the recording ink is equal to 8.5% by mass or higher and less than 15% by mass a ratio (A/B) of the total amount of a water-soluble organic solvent (A), which is contained in the liquid component and has a high-boiling point of 280° C. or higher (A), to the total amount of the solid component (B) contained in the recording ink is 1.1 to 2.5, and a ratio (C/B) of the total amount of the liquid component (C) in the recording ink to the total amount of the solid component (B) in the recording ink is 1.85 to 3.10.

12. An ink cartridge comprising:
a container to accommodate a recording ink,
wherein the recording ink comprises a solid component containing a colorant and a resin, and being solid in ink at 25° C., a liquid component having a boiling point higher than that of water, and being liquid in ink 25° C., and water, and
wherein the total amount of the solid component contained in the recording ink is equal to 8.5% by mass or higher and less than 15% by mass, a ratio (A/B) of the total amount of a water-soluble organic solvent (A), which is contained in the liquid component and has a high-boiling point of 280° C. or higher (A), to the total amount of the solid component (B) contained in the recording ink is 1.1 to 2.5, and a ratio (C/B) of the total amount of the liquid component (C) in the recording ink to the total amount of the solid component (B) in the recording ink is 1.85 to 3.10.

\* \* \* \* \*